US012766922B2

(12) United States Patent
Maeda et al.

(10) Patent No.: US 12,766,922 B2
(45) Date of Patent: Oct. 20, 2026

(54) THERMAL MANAGEMENT SYSTEM

(71) Applicant: DENSO CORPORATION, Kariya-city (JP)

(72) Inventors: Takahiro Maeda, Kariya-city (JP); Shota Terachi, Kariya-city (JP); Kenshiro Matsui, Kariya-city (JP); Takeshi Yoshinori, Kariya-city (JP); Shinya Kasamatsu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 503 days.

(21) Appl. No.: 18/356,355

(22) Filed: Jul. 21, 2023

(65) Prior Publication Data

US 2023/0364969 A1 Nov. 16, 2023

Related U.S. Application Data

(63) Continuation of application No. PCT/JP2021/045094, filed on Dec. 8, 2021.

(30) Foreign Application Priority Data

Jan. 25, 2021 (JP) ................................ 2021-009652

(51) Int. Cl.
*B60H 1/00* (2006.01)
*B60H 1/14* (2006.01)

(52) U.S. Cl.
CPC ..... *B60H 1/00921* (2013.01); *B60H 1/00278* (2013.01); *B60H 1/143* (2013.01);
(Continued)

(58) Field of Classification Search
CPC ........... B60H 1/00921; B60H 1/00278; B60H 1/143; B60H 1/00885; B60H 1/32284;
(Continued)

(56) References Cited

U.S. PATENT DOCUMENTS 6,148,632 A * 11/2000 Kishita ................ F25B 41/335 62/196.4
6,332,496 B1 12/2001 Takano et al.
(Continued)

FOREIGN PATENT DOCUMENTS

JP S59145453 A 8/1984
JP H11278045 A 10/1999
(Continued)

*Primary Examiner* — Tho V Duong
(74) *Attorney, Agent, or Firm* — Harness, Dickey & Pierce, P.L.C.

(57) ABSTRACT

A thermal management system includes refrigeration cycle equipment and a heating medium circuit. The heating medium circuit includes a high-temperature-side circuit connecting with the heating medium channel of the high-temperature-side water-refrigerant heat exchange portion, a low-temperature-side circuit connecting with a heating medium channel of a low-temperature-side water-refrigerant heat exchange portion, and a heat transfer portion connecting the high-temperature-side circuit and the low-temperature-side circuit. The low-temperature-side circuit includes a first heat exchange portion, a second heat exchange portion, a heating medium bypass channel, and a low-temperature-side circuit switching portion. While the heat transfer portion is transferring heat, the low-temperature-side circuit switching portion switches a circuit configuration of the low-temperature-side circuit to a circuit configuration that circulates the heating medium between the first heat exchange portion and the heating medium bypass channel.

14 Claims, 16 Drawing Sheets

(52) U.S. Cl.
CPC .............. *B60H 2001/00307* (2013.01); *B60H 2001/00928* (2013.01)

(58) Field of Classification Search
CPC ...... B60H 1/00485; B60H 2001/00307; B60H 2001/00928; H01M 10/613; H01M 10/617; H01M 10/625; H01M 10/6556; H01M 10/6569; H01M 10/667; F25B 1/00
See application file for complete search history.

(56) References Cited

U.S. PATENT DOCUMENTS

| | | | | |
|---|---|---|---|---|
| 6,467,291 | B1 | 10/2002 | Takano et al. | |
| 2016/0082810 | A1 | 3/2016 | Suzuki | |
| 2017/0158081 | A1 | 6/2017 | Kim et al. | |
| 2019/0070924 | A1* | 3/2019 | Mancini | B60H 1/32281 |
| 2019/0359030 | A1* | 11/2019 | Kim | B60H 1/00907 |
| 2019/0366800 | A1* | 12/2019 | Durrani | B60H 1/00921 |
| 2020/0164719 | A1* | 5/2020 | Shiratori | B60H 1/143 |
| 2020/0198443 | A1* | 6/2020 | Kato | B60H 1/00278 |
| 2021/0101450 | A1* | 4/2021 | Kobayashi | B60L 3/0023 |
| 2022/0032732 | A1 | 2/2022 | Makihara et al. | |
| 2022/0234416 | A1* | 7/2022 | Suzuki | F25B 5/02 |
| 2023/0082212 | A1* | 3/2023 | Tanabe | B60H 1/32284<br>165/202 |
| 2023/0382195 | A1* | 11/2023 | Yamada | B60H 1/143 |
| 2024/0083216 | A1* | 3/2024 | Nomura | F25B 47/02 |

FOREIGN PATENT DOCUMENTS

| | | | |
|---|---|---|---|
| JP | 2006132800 | A | 5/2006 |
| JP | 2012006514 | A | 1/2012 |
| JP | 2012183905 | A | 9/2012 |
| JP | 2013103522 | A | 5/2013 |
| JP | 2014226979 | A | 12/2014 |
| JP | 2017105425 | A | 6/2017 |
| JP | 2019026111 | A | 2/2019 |
| JP | 2019043262 | A | 3/2019 |
| JP | 2020178469 | A | 10/2020 |

* cited by examiner

QUICK CHARGING AND COOLING MODE

THERMAL MANAGEMENT SYSTEM

CROSS REFERENCE TO RELATED APPLICATION

The present application is a continuation application of International Patent Application No. PCT/JP2021/045094 filed on Dec. 8, 2021, which designated the U.S. and claims the benefit of priority from Japanese Patent Application No. 2021-009652 filed on Jan. 25, 2021. The entire disclosures of all of the above applications are incorporated herein by reference.

TECHNICAL FIELD

The present disclosure relates to a thermal management system.

BACKGROUND

Conventionally, a vehicle has been equipped with a thermal management system that manages thermal conditions in the vehicle.

SUMMARY

According to an aspect of the present disclosure, a thermal management system includes a refrigeration cycle equipment and a heating medium circuit.

DETAILED DESCRIPTION

Figure 1:
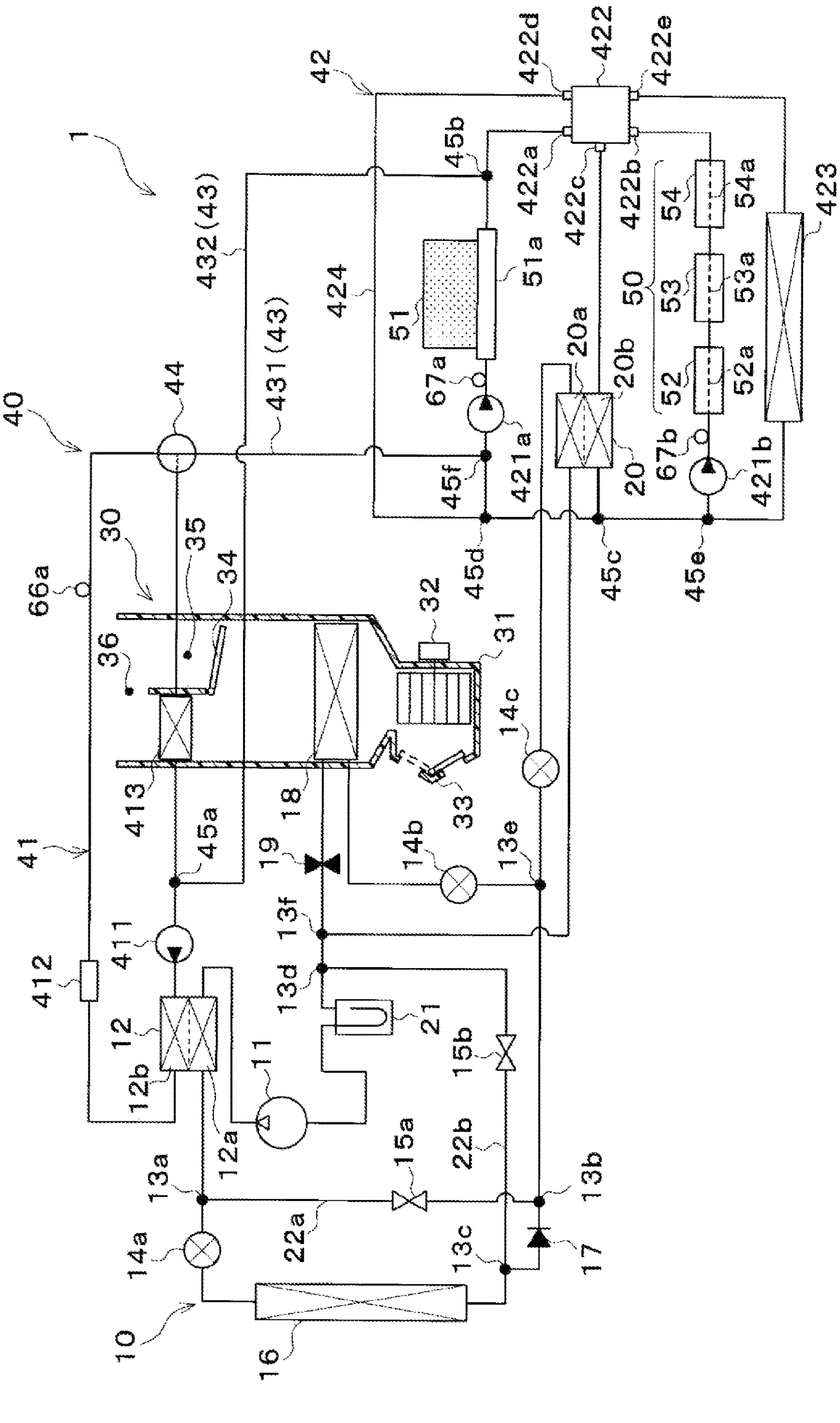
FIG. 1 is an overall schematic configuration diagram illustrating the thermal management system according to a first embodiment.

Hereinafter, examples of the present disclosure will be described.

According to an example of the present disclosure, a thermal management system for a vehicle performs air-conditioning of vehicle compartments and regulates temperatures of multiple temperature adjustment targets. Temperature adjustment targets in the thermal management system, for example, include a battery to supply power to in-vehicle units and the in-vehicle devices such as inverters and motor generators that generate heat during operation.

The thermal management system, for example, includes vapor-compression refrigeration cycle equipment and a heating medium circuit. The refrigeration cycle equipment regulates the temperature of the air supplied to a passenger compartment and the temperature of a heating medium. The heating medium circuit circulates a heating medium that is temperature-regulated by the refrigeration cycle equipment. The heating medium circuit connects with a cooling water channel for the battery and a cooling water channel for the in-vehicle unit.

The thermal management system, for example, cools the battery and the onboard unit. When the passenger compartment is heated, a chiller of the refrigeration cycle equipment performs heat exchange between the heating medium, flowing out of the cooling water channel for the battery and the cooling water channel for the onboard unit, and a low-pressure refrigerant for the refrigeration cycle equipment. The heating medium cooled by the chiller is forced to flow again into the cooling water channel for the battery and the cooling water channel for the onboard unit, thereby cooling the battery and the onboard unit.

The refrigeration cycle equipment uses the chiller to compress the low-pressure refrigerant that absorbs waste heat from the battery and the in-vehicle unit. A high-pressure refrigerant, compressed by the compressor, is used as a heat source to heat the blown air. The thermal management system cools the battery and the onboard unit and simultaneously recovers waste heat from the battery and the onboard unit and uses the waste heat as a heat source for heating in operation mode to heat the vehicle compartment.

According to an example, the circuit configuration of the heating medium circuit allows the temperature of the heating medium, flowing into the cooling water channel for the battery, to be equal to the temperature of the heating medium flowing into the cooling water channel for the in-vehicle unit. Therefore, the thermal management system can regulate the battery and the in-vehicle unit to the same temperature but hardly regulates the battery and the in-vehicle unit to different temperatures.

Generally, however, there is a difference between the proper temperature zone capable of appropriately operating the battery and the proper temperature zone capable of appropriately operating the in-vehicle unit. Therefore, there may be an operating condition of warming up the battery and concurrently cooling the other in-vehicle units.

Assumably, the thermal management system according to an example cannot warm up the battery and concurrently cool the other in-vehicle units. In other words, the thermal management system may not be effectively used as a heat source for heating, for example, in such a manner as warming up the battery and concurrently recovering the heat generated from the other onboard units.

According to an example of the present disclosure, a refrigeration cycle equipment includes a high-temperature-side water-refrigerant heat exchange portion and a low-temperature-side water-refrigerant heat exchange portion. The high-temperature-side water-refrigerant heat exchange portion is configured to perform heat exchange between high-pressure refrigerant and heating medium. The low-temperature-side water-refrigerant heat exchange portion is configured to perform heat exchange between low-pressure refrigerant and the heating medium.

The heating medium circuit circulates the heating medium. The heating medium circuit includes a high-temperature-side circuit, a low-temperature-side circuit, and a heat transfer portion. The high-temperature-side circuit connects with the heating medium channel of the high-temperature-side water-refrigerant heat exchange portion. The low-temperature-side circuit connects with the heating medium channel of the low-temperature-side water-refrigerant heat exchange portion. The heat transfer portion transfers heat between the heating medium flowing through the high-temperature-side circuit and the heating medium flowing through the low-temperature-side circuit.

The low-temperature-side circuit includes a first heat exchange portion, a second heat exchange portion, a heating medium bypass channel, and a low-temperature-side circuit switching portion. The first heat exchange portion performs heat exchange between the first temperature adjustment target and the heating medium. The second heat exchange portion performs heat exchange between the second temperature adjustment target and the heating medium. The heating medium bypass channel allows the heating medium, flowing out of the first heat exchange portion or the second heat exchange portion, to bypass the low-temperature-side water-refrigerant heat exchange portion and returns the heating medium toward a heating medium inlet of the first heat exchange portion or the second heat exchange portion. The low-temperature-side circuit switching portion switches the circuit configuration of the low-temperature-side circuit.

The heat transfer portion transfers the heat of the heating medium flowing out of the high-temperature-side water-refrigerant heat exchange portion to the heating medium flowing into the first heat exchange portion.

While the heat transfer portion is transferring heat, the low-temperature-side circuit switching portion switches the circuit configuration of the low-temperature-side circuit to a circuit configuration that circulates the heating medium between the first heat exchange portion and the heating medium bypass channel.

The heat transfer portion can transfer the heat of the heating medium, heated in the high-temperature-side water-refrigerant heat exchange portion of the high-temperature-side circuit, to the heating medium flowing into the first heat exchange portion of the low-temperature-side circuit. Therefore, the first temperature adjustment target can be heated.

When the heat transfer portion is transferring heat, the temperature of the heating medium flowing into the low-temperature-side water-refrigerant heat exchange portion is not affected by the temperature of the heating medium that circulates between the first heat exchange portion and the heating medium bypass channel.

The low-temperature-side water-refrigerant heat exchange portion performs heat exchange, as needed, between the heating medium flowing out of the second heat exchange portion and the low-pressure refrigerant, thereby enabling the low-pressure refrigerant to absorb the heat of the second temperature adjustment target. It is possible to cool the heating medium flowing into the second heat exchange portion and cool the second temperature adjustment target.

In the refrigeration cycle equipment, the high-temperature-side water-refrigerant heat exchange portion can heat the heating medium flowing through the high-temperature-side circuit by using a heat source, that is, the waste heat recovered by the low-pressure refrigerant in the low-temperature-side water-refrigerant heat exchange portion.

The thermal management system according to one aspect of the present disclosure can heat the first temperature adjustment target, meanwhile recover the heat from the second temperature adjustment target, if necessary, and use the recovered heat as a heat source to heat the heating medium that flows through the high-temperature-side circuit. It is possible to fully effectively use the heat generated by the temperature adjustment target.

The description below explains embodiments for carrying out the present disclosure by reference to the drawings. The same reference numerals are given to parts in each embodiment similar to those described in the preceding embodiment and a redundant description may be omitted for simplicity. If only part of a configuration in each embodiment is described, other parts in the configuration may conform to those described in the preceding embodiment. Each embodiment may contain parts that are explicitly described to be capable of combination. In addition, the embodiments can be partially combined, if available, even if the partial combination is not explicitly described to be possible.

First Embodiment

The description below explains the first embodiment of a thermal management system 1 according to the present disclosure by reference to FIGS. 1 to 12. The thermal management system 1 according to the present embodiment is applied to an electric vehicle. An electric vehicle represents a vehicle that acquires a driving force for running from an electric motor. In the electric vehicle, the thermal management system 1 air-conditions the vehicle compartment as a target space for air conditioning and adjusts the temperature of the in-vehicle unit as a temperature adjustment target.

In the thermal management system 1, in-vehicle units as temperature adjustment targets specifically include a battery 51, an inverter 52, a motor generator 53, and a controller 54 for the advanced driver assistance system (ADAS).

The battery 51 represents a secondary battery that stores electric power to be supplied to an electric in-vehicle unit such as the inverter 52. The battery 51 represents an assembled battery formed by electrically connecting multiple packed battery cells in series or parallel. The battery cell according to the present embodiment is a lithium ion battery.

The battery 51 generates heat during operation (charging and discharging). The battery 51 has such traits as easily decreasing outputs at a low temperature and progressively deteriorating at a high temperature. Therefore, the temperature of the battery 51 needs to be maintained within an appropriate temperature zone (higher than or equal to 15° C. and lower than or equal to 55° C. according to the present embodiment). The thermal management system 1 assumes the battery 51 to be the first temperature adjustment target.

The inverter 52 is a power converter that converts frequencies of power supplied from the battery 51 to the motor generator 53 and converts the AC power generated by the motor generator 53 into DC power and outputs the DC power to the battery 51. The motor generator 53 functions as an electric motor supplied with electric power to output a driving force for traveling and functions as a power-generating unit to generate regenerative power when a vehicle is decelerating or traveling downhill. The advanced driver assistance system supports the driver's driving operations.

The inverter 52, the motor generator 53, and the controller 54 for ADAS all generate heat during operation. The inverter 52, the motor generator 53, and the controller 54 for ADAS may easily degrade the electric circuits at high temperatures. Therefore, it is necessary to keep the temperature lower than the standard heat-resisting temperature (130° C. according to the present embodiment) capable of protecting the electric circuits.

The thermal management system 1 assumes the inverter 52, the motor generator 53, and the ADAS controller 54 to be second temperature adjustment targets. Where appropriate, the following description may use a high-voltage instrument 50 as a generic term for the inverter 52, the motor generator 53, and the ADAS controller 54 as the second temperature adjustment targets.

The thermal management system 1 according to the present embodiment does not ensure complete coincidence between an appropriate temperature zone for the first temperature adjustment target capable of properly operating the first temperature adjustment target and an appropriate temperature zone for the second temperature adjustment target capable of properly operating the second temperature adjustment target. That is, the appropriate temperature zone for the first temperature adjustment target differs from the appropriate temperature zone for the second temperature adjustment target.

As illustrated in the overall configuration diagram in FIG. 1, the thermal management system 1 includes a refrigeration cycle equipment 10, an interior air-conditioning unit 30, and a heating medium circuit 40, for example.

The description below explains the refrigeration cycle equipment 10. The refrigeration cycle equipment 10 cools or heats the air supplied into the vehicle compartment and the heating medium circulating through the heating medium circuit 40, for air conditioning in the vehicle compartment and temperature adjustment of the onboard units. Furthermore, the refrigeration cycle equipment 10 is configured to be able to switch between refrigerant circuits according to various operation modes (described later), for air conditioning in the vehicle compartment and temperature adjustment of the onboard units.

The refrigeration cycle equipment 10 uses HFO refrigerant (such as R1234yf) as a refrigerant. The refrigeration cycle equipment 10 provides a vapor-compression subcritical refrigeration cycle at which the pressure of the refrigerant discharged from a compressor 11 does not exceed the critical pressure of the refrigerant. The refrigerant contains refrigerant oil to lubricate the compressor 11. The refrigerator oil is available as PAG oil that is compatible with liquid-phase refrigerants. The refrigerating machine oil partially circulates through the cycle along with the refrigerant.

The compressor 11 draws, compresses, and discharges the refrigerant in the refrigeration cycle equipment 10. The compressor 11 is placed in a drive unit chamber toward the front of the vehicle compartment. The driving device room forms a space to place at least part of the instruments (such as the motor generator 53) used to generate driving force for vehicle travel.

The compressor 11 is an electric compressor that uses an electric motor to drive a fixed-capacity compression mechanism whose discharge capacity is fixed. The compressor 11 is controlled in terms of rotation speeds (or refrigerant discharge capability) by control signals output from a controller 60 for system control (described later).

The outlet of the compressor 11 connects with the inlet side of the refrigerant channel of a water-refrigerant heat exchanger 12. The water-refrigerant heat exchanger 12 includes a refrigerant channel **12*a* and a heating medium channel 12*b*. The refrigerant channel 12*a* circulates the high-pressure refrigerant discharged from the compressor 11. The heating medium channel 12*b* circulates the heating medium at the high-temperature-side circuit 41 of the heating medium circuit 40**.

The water-refrigerant heat exchanger 12 is a high-temperature-side water-refrigerant heat exchange portion that provides heat exchange between the high-pressure refrigerant flowing through the refrigerant channel **12*a* and the heating medium flowing through the heating medium channel 12*b*. The water-refrigerant heat exchanger 12** allows the heat of the high-pressure refrigerant to radiate to the heating medium to heat the heating medium.

The inlet side of the first refrigerant joint portion **13*a* is connected to the outlet of the refrigerant channel 12*a* of the water-refrigerant heat exchanger 12. The first refrigerant joint portion 13*a* is a three-way joint having three inlets/outlets communicating with each other. The first refrigerant joint portion 13*a*** may use a joint member that is formed by joining multiple pipes or is formed by providing a metal or resin block with multiple refrigerant channels.

As described later, the refrigeration cycle equipment 10 includes second through sixth refrigerant joint portions **13*b* through 13*f*. The basic configuration of the second through sixth refrigerant joint portions 13*b* through 13*f* is similar to that of the first refrigerant joint portion 13*a***.

One outlet of the first refrigerant joint portion **13*a* connects with the inlet side of a heating expansion valve 14*a*. The other outlet port of the first refrigerant joint portion 13*a* connects with one inlet side of the second refrigerant joint portion 13*b* via a dehumidification channel 22*a***.

The dehumidification channel **22*a* forms a channel through which the refrigerant flows during a parallel dehumidification heating mode (described later). The dehumidification channel 22*a* includes an on-off dehumidification valve 15*a*. The on-off dehumidification valve 15*a* is a solenoid valve that opens and closes the dehumidification channel 22*a*. Operations of the on-off dehumidification valve 15*a* are controlled by a control voltage output from the controller 60**.

As described later, the refrigeration cycle equipment 10 includes an on-off heating valve **15*b* The basic configuration of the on-off heating valve 15*b* is similar to that of the on-off dehumidification valve 15*a*. The on-off dehumidification valve 15***a* and the on-off heating valve 15*b* can switch the refrigerant circuit of the refrigeration cycle equipment 10 by opening and closing the refrigerant channel. Therefore, the on-off dehumidification valve 15*a* and the on-off heating valve 15*b* provide refrigerant circuit switching portions that switch the refrigerant circuits.

The heating expansion valve 14*a* is a heating decompression portion that decompresses the high-pressure refrigerant flowing out of the refrigerant channel 12*a* of the water-refrigerant heat exchanger 12 and adjusts the flow rate (mass flow rate) of the refrigerant flowing downstream in a heating mode (described later), for example.

The heating expansion valve 14*a* is an electric variable throttle mechanism including a valve body portion to vary throttle openings and an electric actuator (such as a stepping motor) to displace the valve body portion. Operations of the heating expansion valve 14*a* are controlled by control pulses output from the controller 60.

The heating expansion valve 14*a* has a full opening function to function simply as a refrigerant channel by fully opening the valve while scarcely providing any refrigerant decompression action and flow rate adjustment action. In addition, the heating expansion valve 14*a* has a full closing function to close the refrigerant channel by fully closing the valve.

As described later, the refrigeration cycle equipment 10 includes a cooling expansion valve 14*b* and a cooling expansion valve 14*c*. The basic configuration of the cooling expansion valve 14*b* and the cooling expansion valve 14*c* is similar to that of the heating expansion valve 14*a*.

The heating expansion valve 14*a*, the cooling expansion valve 14*b*, and the cooling expansion valve 14*c* can switch the refrigerant circuits of the refrigeration cycle equipment 10 based on the above-described full closing function. Therefore, the heating expansion valve 14*a*, the cooling expansion valve 14*b*, and the cooling expansion valve 14*c* also function as the refrigerant circuit switching portions.

The heating expansion valve 14*a*, the cooling expansion valve 14*b*, and the cooling expansion valve 14*c* may be formed by combining an on-off valve and a variable throttle mechanism devoid of the full closing function. In this case, the on-off valve provides the refrigerant circuit switching portion.

The outlet of the heating expansion valve 14*a* connects with the refrigerant inlet side of the outdoor heat exchanger 16. The outdoor heat exchanger 16 is an outdoor heat exchange portion that provides heat exchange between the refrigerant flowing from the heating expansion valve 14*a* and the outside air supplied by a cooling fan (not shown). The outdoor heat exchanger 16 is placed toward the front inside the drive unit chamber. The outdoor heat exchanger 16 can be exposed to the outdoor air when the vehicle is traveling.

The refrigerant outlet of the outdoor heat exchanger 16 connects with the inlet side of a third refrigerant joint portion 13*c*. One outlet port of the third refrigerant joint portion 13*c* connects with one inlet side of a fourth refrigerant joint portion 13*d* via a heating channel 22*b*. The heating channel 22*b* forms a channel allowing the refrigerant to flow in a heating mode (described later), for example. The heating channel 22*b* includes the on-off heating valve 15*b* to open and close the heating channel 22*b*.

The other outlet of the third refrigerant joint portion 13*c* connects with the other outlet side of the second refrigerant joint portion 13*b*. A check valve 17 is provided for the refrigerant channel connecting the other outlet of the third refrigerant joint portion 13*c* and the other outlet of the second refrigerant joint portion 13*b*. The check valve 17 allows the refrigerant to flow from the third refrigerant joint portion 13*c* to the second refrigerant joint portion 13*b* and prevents the refrigerant from flowing from the second refrigerant joint portion 13*b* to the third refrigerant joint portion 13*c*.

The outlet of the second refrigerant joint portion 13*b* connects with the inlet side of a fifth refrigerant joint portion 13*e*. One outlet of the fifth refrigerant joint portion 13*e* connects with the inlet side of the cooling expansion valve 14*b*. The other outlet port of the fifth refrigerant joint portion 13*e* connects with the inlet side of the cooling expansion valve 14*c*.

The cooling expansion valve 14*b* is a cooling decompression portion that decompresses the refrigerant and adjusts the flow rate of the refrigerant flowing downstream in cooling mode (described later).

The cooling expansion valve 14*b* connects with the refrigerant inlet side of an interior evaporator 18. The interior evaporator 18 is placed in an air-conditioning case 31 of the interior air-conditioning unit 30 (described later). The interior evaporator 18 is a cooling heat exchanger that provides heat exchange between the low-pressure refrigerant decompressed by the cooling expansion valve 14*b* and the air supplied into the vehicle compartment. The interior evaporator 18 cools the supplied air by evaporating the low-pressure refrigerant to activate an endothermic reaction.

The refrigerant outlet of the interior evaporator 18 connects with the inlet side of an evaporation pressure adjustment valve 19. The evaporation pressure adjustment valve 19 is a variable throttle mechanism that varies valve openings to keep the refrigerant evaporation pressure in the interior evaporator 18 to be higher than or equal to a predetermined pressure so that the interior evaporator 18 is prevented from being frosted. More specifically, the evaporation pressure adjustment valve 19 is configured as a mechanical mechanism that increases the valve opening according to an increase in the refrigerant pressure on the inlet side. The outlet of the evaporation pressure adjustment valve 19 connects with one inlet of the sixth refrigerant joint portion 13*f*.

The cooling expansion valve 14*c* is a cooling decompression portion that decompresses the refrigerant and adjusts the flow rate of the refrigerant flowing downstream in B1C1 mode (described later), for example.

The outlet of the cooling expansion valve 14*c* connects with the inlet side of the refrigerant channel 20*a* of the chiller 20. The chiller 20 includes a refrigerant channel 20*a* and a heating medium channel 20*b*. The refrigerant channel 20*a* allows a flow of the low-pressure refrigerant decompressed by cooling expansion valve 14*c*. The heating medium channel 20*b* allows a flow of the heating medium at the low-temperature-side circuit 42 of the heating medium circuit 40. The chiller 20 is a low-temperature-side water-refrigerant heat exchange portion that provides heat exchange between the low-pressure refrigerant flowing through the refrigerant channel 20*a* and the heating medium flowing through the heating medium channel 20*b*. The chiller 20 cools the heating medium by evaporating the low-pressure refrigerant to activate an endothermic reaction.

The outlet of the refrigerant channel 20*a* of the chiller 20 connects with the other inlet side of the sixth refrigerant joint portion 13*f*. The outlet of the sixth refrigerant joint portion 13*f* connects with the other inlet side of the fourth refrigerant joint portion 13*d*.

The outlet of the fourth refrigerant joint portion 13*d* connects with the inlet side of the accumulator 21. The accumulator 21 is a low-pressure-side gas-liquid separator that separates the gas-liquid from the refrigerant flowing inside and stores an excess liquid-phase refrigerant in the cycle. A gas-phase refrigerant outlet of the accumulator 21 connects with the suction port side of the compressor 11.

The description below explains the heating medium circuit 40. The heating medium circuit 40 is a heating medium circuit that circulates the heating medium. The heating medium circuit 40 uses an ethylene glycol aqueous solution as the heating medium. The heating medium circuit 40 includes a high-temperature-side circuit 41, a low-temperature-side circuit 42, a connection channel 43, and a three-way valve 44, for example.

The high-temperature-side circuit 41 includes a high-temperature-side pump 411, an electric heater 412, and a heater core 413, for example. The high-temperature-side circuit 41 connects with the heating medium channel 12*b* of the water-refrigerant heat exchanger 12 and the three-way valve 44, for example.

The high-temperature-side pump 411 is a high-temperature-side heating-medium pumping portion that pumps the heating medium to the inlet side of the heating medium channel 12*b* of the water-refrigerant heat exchanger 12. The high-temperature-side pump 411 is comparable to an electric pump whose rotation speed (or pumping capability) is controlled by the control voltage output from the controller 60.

As will be described later, the heating medium circuit 40 includes a first low-temperature-side pump 421*a* and a second low-temperature-side pump 421*b* at the side of the low-temperature-side circuit 42. The basic configuration of the first low-temperature-side pump 421*a* and the second low-temperature-side pump 421*b* is similar to that of the high-temperature-side pump 411.

An electric heater 412 is provided on the outlet side of the heating medium channel 12*b* of the water-refrigerant heat exchanger 12. The electric heater 412 is a heating portion that heats the heating medium flowing from the water-refrigerant heat exchanger 12. According to the present embodiment, the electric heater 412 uses a PTC heater including a PTC element that generates heat when supplied with power. The amount of heat generated by the electric heater 412 is controlled by the control voltage output from the controller 60.

The inlet side of the three-way valve 44 is connected to the electric heater 412 at the downstream side of the flowing heating medium. The three-way valve 44 is a three-way flow control valve that allows the heating medium flowing from the water-refrigerant heat exchanger 12 to flow into the inside and allows the heating medium to flow toward at least either the heater core 413 or an inlet-side connection channel 431 (described later).

The three-way valve 44 is configured to be able to continuously adjust the flow ratio between the flow rate of the heating medium flowing into the heater core 413 and the flow rate of the heating medium flowing into the inlet-side connection channel 431. The three-way valve 44 can thereby adjust the flow rate of the heating medium flowing through the inlet-side connection channel 431.

In addition, the three-way valve 44 adjusts the flow ratio and thereby enables the total flow of the heating medium flowing from the water-refrigerant heat exchanger 12 to be directed to either the heater core 413 or the inlet-side connection channel 431. Therefore, the three-way valve 44 also functions as a high-temperature-side circuit switching portion that switches the circuit configuration of the high-temperature-side circuit 41. Operations of the three-way valve 44 are controlled by the control signal output from the controller 60.

The heater core 413 is placed in the air-conditioning case 31 of the interior air-conditioning unit 30. The heater core 413 is a heating heat exchange portion that provides heat exchange between the heating medium heated by the water-refrigerant heat exchanger 12, for example, and the supplied air supplied into the vehicle compartment. The heater core 413 radiates the heat of the heating medium to the supplied air to heat the supplied air. Therefore, the supplied air is comparable to a fluid to be heated in the thermal management system 1.

The heating medium outlet of the heater core 413 connects with the suction port side of the high-temperature-side pump 411 via a first heating medium joint portion 45*a*. The first heating medium joint portion 45*a* is a three-way joint for the heating medium.

As will be described later, the heating medium circuit 40 includes second through sixth medium joint portions 45*b* through 45*f* at the side of the low-temperature-side circuit 42. The basic configuration of the first through sixth heating medium joint portions 45*a* through 45*f* is similar to that of the first refrigerant joint portion 13*a* of the refrigeration cycle equipment 10, for example.

The low-temperature-side circuit 42 includes the first low-temperature-side pump 421*a*, the second low-temperature-side pump 421*b*, a cooling water channel 51*a* for the battery 51, a five-way valve 422, and a low-temperature-side radiator 423, for example. The low-temperature-side circuit 42 connects with the heating medium channel 20*b* of the chiller 20.

The first low-temperature-side pump 421*a* is a battery-side heating-medium pumping portion that pumps the heating medium to the cooling water channel 51*a* of the battery 51. The cooling water channel 51*a* of the battery 51 is formed in a dedicated case that accommodates multiple battery cells configuring the battery 51. The cooling water channel 51*a* of the battery 51 is comparable to a first heat exchange portion that provides heat exchange between the multiple battery cells forming the battery 51 and the heating medium.

The outlet of the cooling water channel 51*a* of the battery 51 connects with the five-way valve 422 at the battery-side inlet 422*a* via the second heating medium joint portion 45*b*.

The second low-temperature-side pump 421*b* is a high-voltage instrument-side heating-medium pumping portion that pumps the heating medium to cooling water channels 52*a* through 54*a* of the high-voltage instrument 50. The cooling water channels 52*a* through 54*a* of the high-voltage instrument 50 are formed in the housing or the case configuring an outer shell of each high-voltage instrument 50. Each of the cooling water channels 52*a* through 54*a* of the high-voltage instrument 50 is a second heat exchange portion that provides heat exchange between the high-voltage instrument 50 and the heating medium.

According to the present embodiment, the cooling water channels 52*a* through 54*a* of the high-voltage instrument 50 specifically correspond to the cooling water channel 52*a* of the inverter 52, the cooling water channel 53*a* of the motor generator 53, and the cooling water channel 54*a* of the ADAS controller 54. The heating medium pumped from the second low-temperature-side pump 421*b* flows through the cooling water channel 52*a* of the inverter 52, the cooling water channel 53*a* of the motor generator 53, and the cooling water channel 54*a* of the ADAS controller 54 in this order.

The outlet of the cooling water channels 52a through 54a of the high-voltage instrument 50 (that is, the outlet of the cooling water channel 54a of the ADAS controller 54) connects with the five-way valve 422 at the high-voltage instrument-side inlet 422b.

The five-way valve 422 is a low-temperature-side circuit switching portion that switches the circuit configuration of the low-temperature-side circuit 42. The five-way valve 422 includes a battery-side inlet 422a and a high-voltage instrument-side inlet 422b as inlets for the heating medium. The five-way valve 422 includes a chiller-side outlet 422c, a bypass-channel-side outlet 422d, and a radiator-side outlet 422e as outlets for the heating medium. The detailed configuration of the five-way valve 422 will be described later.

The chiller-side outlet 422c of the five-way valve 422 connects with the inlet side of the heating medium channel 20b of the chiller 20. The outlet of the heating medium channel 20b of the chiller 20 connects with the inlet side of a third heating medium joint portion 45c. One outlet of the third heating medium joint portion 45c connects with one inlet side of a fourth heating medium joint portion 45d. The other outlet of the third heating medium joint portion 45c connects with one inlet side of a fifth heating medium joint portion 45e.

The outlet of the fourth heating medium joint portion 45d connects with the suction port side of the first low-temperature-side pump 421a via the sixth heating medium joint portion 45f. A bypass-channel-side outlet 422d of the five-way valve 422 connects with the inlet side of a heating medium bypass channel 424. The outlet side of the heating medium bypass channel 424 connects with the other inlet of the fourth heating medium joint portion 45d.

The heating medium bypass channel 424 forms a flow channel where the heating medium flowing out of the cooling water channel 51a of the battery 51 bypasses the chiller 20 and the low-temperature-side radiator 423 and returns to the inlet side of the cooling water channel 51a of the battery 51.

The outlet port of the fifth heating medium joint portion 45e connects with the suction port side of the second low-temperature-side pump 421b. The radiator-side outlet 422e of the five-way valve 422 connects with the heating medium inlet side of the low-temperature-side radiator 423. The low-temperature-side radiator 423 is a low-temperature-side outdoor air heat exchange portion that provides heat exchange between the outdoor air and the heating medium flowing from the radiator-side outlet 422e of the five-way valve 422. The heating medium outlet of the low-temperature-side radiator 423 connects with the other inlet side of the fifth heating medium joint portion 45e.

The connection channel 43 is a heating medium flow channel that connects the high-temperature-side circuit 41 and the low-temperature-side circuit 42. The connection channel 43 includes the inlet-side connection channel 431 and an outlet-side connection channel 432. The inlet-side connection channel 431 forms a flow channel that guides the heating medium flowing through the high-temperature-side circuit 41 to the low-temperature-side circuit 42. The outlet-side connection channel 432 forms a flow channel that guides the heating medium flowing through the low-temperature-side circuit 42 to the high-temperature-side circuit 41.

The entry of the inlet-side connection channel 431 is connected to one outlet side of the three-way valve 44. The exit of the inlet-side connection channel 431 is connected to one inlet of the sixth heating medium joint portion 45f. The entry of the outlet-side connection channel 432 is connected to one outlet of the second heating medium joint portion 45b. The exit of the outlet-side connection channel 432 is connected to one inlet of the first heating medium joint portion 45a.

The inlet-side connection channel 431 can guide the heating medium, being heated by the water-refrigerant heat exchanger 12 of the high-temperature-side circuit 41 and upstream of the heater core 413, to the suction port side of the first low-temperature-side pump 421a of the low-temperature-side circuit 42. The outlet-side connection channel 432 can guide the heating medium, flowing from the cooling water channel 51a of the battery 51, to the suction port side of the high-temperature-side pump 411, downstream of the heater core 413 in the high-temperature-side circuit.

The three-way valve 44 flows the heating medium through the inlet-side connection channel 431 and the outlet-side connection channel 432 as the connection channel 43, making it possible to mix the heating medium flowing through the high-temperature-side circuit 41 and the heating medium flowing through the low-temperature-side circuit 42. Heat can be transferred between the heating medium flowing through the high-temperature-side circuit 41 and the heating medium flowing through the low-temperature-side circuit 42. Therefore, the connection channel 43 is comparable to a heat transfer portion.

The three-way valve 44 regulates the flow rate of the heating medium flowing through the inlet-side connection channel 431, making it possible to adjust the heat transfer amount between the heating medium flowing through the high-temperature-side circuit 41 and the heating medium flowing through the low-temperature-side circuit 42. Therefore, the three-way valve 44 is a heat transfer amount adjusting portion that adjusts the heat transfer amount in the connection channel 43.

Figure 2:
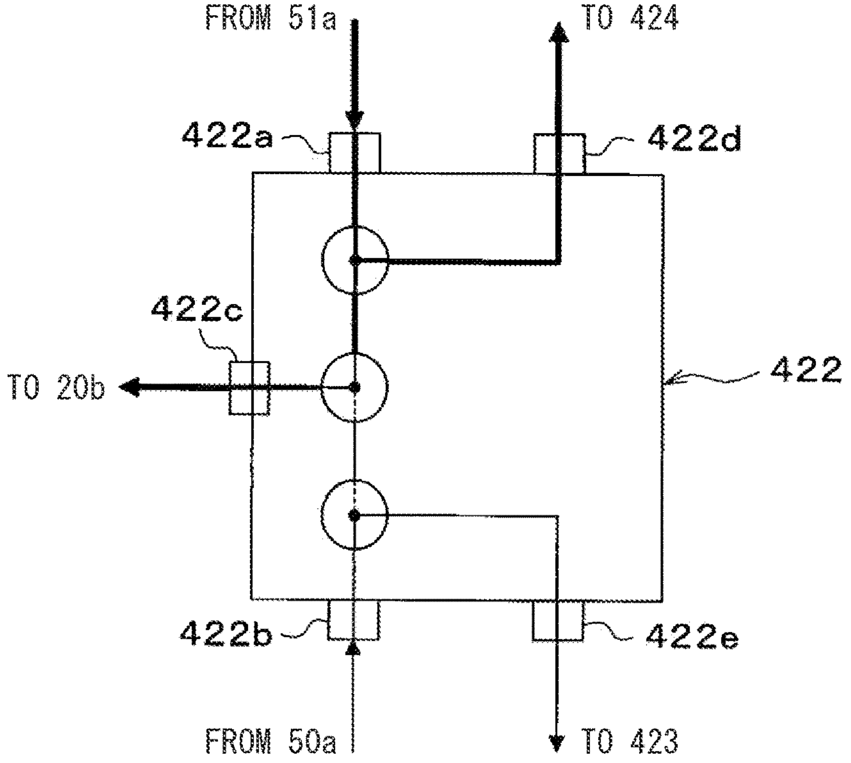
FIG. 2 is an explanatory diagram illustrating an operation mode of a five-way valve according to the first embodiment.
Figure 3:
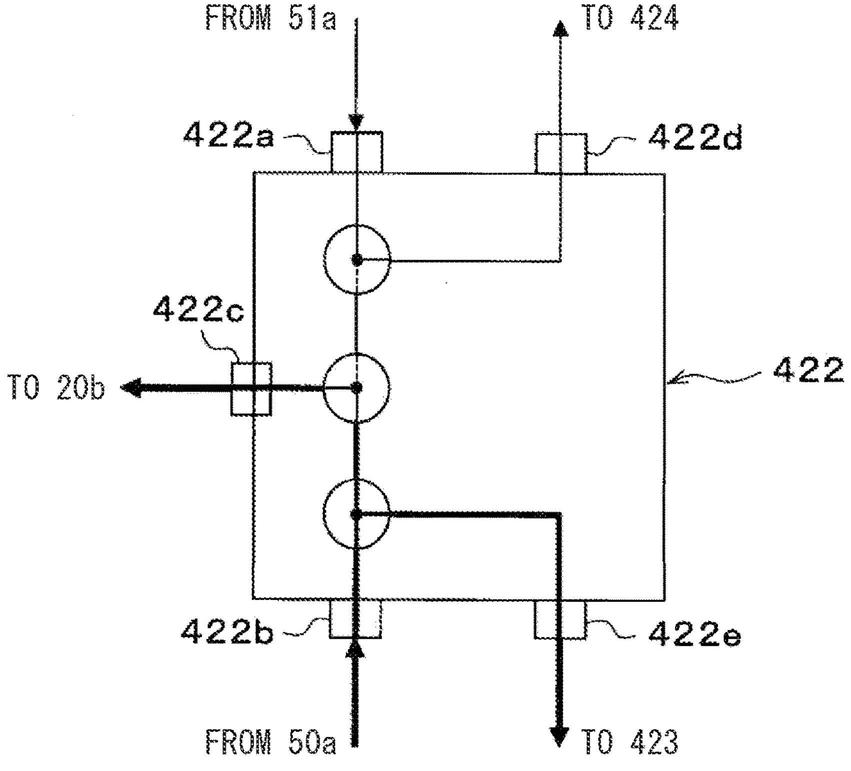
FIG. 3 is an explanatory diagram illustrating another operation mode of the five-way valve according to the first embodiment.
Figure 4:
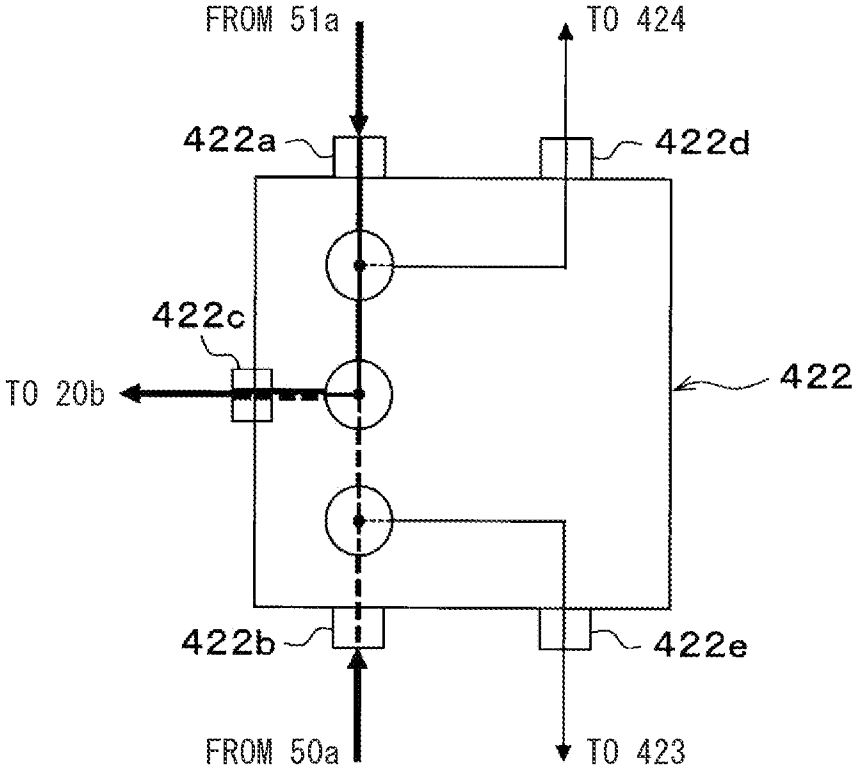
FIG. 4 is an explanatory diagram illustrating yet another operation mode of the five-way valve according to the first embodiment.

The description below explains the detailed configuration of the five-way valve 422 by reference to FIGS. 2 through 4. As illustrated in FIGS. 2 through 4, the five-way valve 422 allows the heating medium to flow inside from the battery-side inlet 422a and the high-voltage instrument-side inlet 422b. Furthermore, the heating medium flowing inside is forced to flow from at least one of the chiller-side outlet 422c, the bypass-channel-side outlet 422d, and the radiator-side outlet 422e.

As illustrated in the explanatory diagrams of FIGS. 2 through 4, the five-way valve 422 can be formed by combining multiple three-way flow control valves, for example.

As indicated by the thick solid line in the explanatory diagram of FIG. 2, the five-way valve 422 allows the battery-side inlet 422a to flow inside the heating medium flowing from the cooling water channel 51a of the battery 51. Then, the heating medium flowing inside through the battery-side inlet 422a can flow to at least either the heating medium bypass channel 424 or the heating medium channel 20b of the chiller 20.

The five-way valve 422 is configured to be able to continuously adjust the flow ratio between the flow rate of the heating medium flowing into the heating medium bypass channel 424 and the flow rate of the heating medium flowing into the heating medium channel 20b of the chiller 20. By adjusting the flow ratio, the five-way valve 422 can also allow the total flow of the heating medium flowing from the cooling water channel 51a of the battery 51 to be directed to either the heating medium bypass channel 424 or the heating medium channel 20b of the chiller 20.

The five-way valve 422 can thereby switch circuits, that is, the circuit connecting the outlet side of the cooling water channel 51a of the battery 51 with the inlet side of the heating medium bypass channel 424 and the circuit connecting the outlet side of the cooling water channel 51*a* of the battery 51 with the inlet side of the heating medium channel 20*b* of the chiller 20.

As indicated by the thick solid line in the explanatory diagram of FIG. 3, the five-way valve 422 allows the high-voltage instrument-side inlet 422*b* to flow inside the heating medium flowing from the cooling water channels 52*a* through 54*a* of the high-voltage instrument 50. The refrigerant flowing into the interior through the high-voltage instrument-side inlet 422*b* can flow out to at least either the low-temperature-side radiator 423 or the heating medium channel 20*b* of the chiller 20.

The five-way valve 422 is configured to be able to continuously adjust the flow ratio between the flow rate of the heating medium flowing into the low-temperature-side radiator 423 and the flow rate of the heating medium flowing into the heating medium channel 20*b* of the chiller 20. By adjusting the flow ratio, the five-way valve 422 can also allow the total flow of the heating medium flowing from the cooling water channels 52*a* through 54*a* of the high-voltage instrument 50 to be directed to either the low-temperature-side radiator 423 or the heating medium channel 20*b* of the chiller 20.

The five-way valve 422 can thereby switch circuits, that is, the circuit connecting the outlet side of the cooling water channels 52*a* through 54*a* of the high-voltage instrument 50 with the inlet side of the heating medium of the low-temperature-side radiator 423 and the circuit connecting the outlet side of the cooling water channels 52*a* through 54*a* of the high-voltage instrument 50 with the inlet side of the heating medium channel 20*b* of the chiller 20.

As indicated by the thick solid and dashed lines in the explanatory diagram of FIG. 4, the five-way valve 422 can allow the heating medium to flow inside, that is, at least the heating medium flowing from the cooling water channel 51*a* of the battery 51 or the heating medium flowing from the cooling water channels 52*a* through 54*a* of the high-voltage instrument 50, and can allow the heating medium to flow out to the heating medium channel 20*b* of the chiller 20.

The five-way valve 422 is configured to be able to continuously adjust the flow ratio between the flow rate of the heating medium flowing from the cooling water channel 51*a* of the battery 51 and the flow rate of the heating medium flowing from the cooling water channels 52*a* through 54*a* of the high-voltage instrument 50 under the condition that the heating medium flows into the heating medium channel 20*b* of the chiller 20.

By adjusting the flow ratio, the five-way valve 422 can ensure that the total flow of the heating medium, flowing into the heating medium channel 20*b* of the chiller 20, corresponds to either the heating medium flowing from the cooling water channel 51*a* of the battery 51 or the heating medium flowing from the cooling water channels 52*a* through 54*a* of the high-voltage instrument 50.

The five-way valve 422 can thereby switch circuits, that is, the circuit connecting the outlet side of the cooling water channel 51*a* of the battery 51 with the inlet side of the heating medium channel 20*b* of the chiller 20 and the circuit connecting the outlet side of the cooling water channels 52*a* through 54*a* of the high-voltage instrument 50 with the inlet side of the heating medium channel 20*b* of the chiller 20.

Furthermore, the five-way valve 422 can combine the above-described switching function of the heating medium circuit. For example, it is possible to connect the outlet side of the cooling water channel 51*a* of the battery 51 with the inlet side of the heating medium bypass channel 424. At the same time, it is possible to connect the outlet side of the cooling water channels 52*a* through 54*a* of the high-voltage instrument 50 with the inlet side of the heating medium channel 20*b* of the chiller 20.

For example, it is possible to connect the outlet side of the cooling water channel 51*a* of the battery 51 with the inlet side of the heating medium channel 20*b* of the chiller 20. At the same time, it is possible to connect the outlet side of the cooling water channels 52*a* through 54*a* of the high-voltage instrument 50 with the heating medium inlet side of the low-temperature-side radiator 423.

For example, it is possible to connect the outlet side of the cooling water channel 51*a* of the battery 51 with the inlet side of the heating medium channel 20*b* of the chiller 20. At the same time, it is possible to connect the outlet side of the cooling water channel 51*a* of the battery 51 with the heating medium inlet side of the low-temperature-side radiator 423.

The description below explains the interior air-conditioning unit 30. The interior air-conditioning unit 30 integrates multiple components to blow out the supplied air to appropriate locations in the vehicle compartment under the condition that the supplied air is adjusted to the appropriate temperature for the air conditioning in the vehicle compartment. The interior air-conditioning unit 30 is placed inside an instrument panel in the forefront of the vehicle compartment.

As illustrated in FIG. 1, the interior air-conditioning unit 30 accommodates an interior blower 32, the interior evaporator 18, and the heater core 413, for example, in the air-conditioning case 31 forming an air channel for the supplied air. The air-conditioning case 31 is made of a resin (such as polypropylene) that is elastic to some degree and excels in strength.

An indoor/outdoor air switch 33 is placed in the air-conditioning case 31, most upstream of the flow of the supplied air. The indoor/outdoor air switch 33 selectively introduces indoor air (air inside the vehicle compartment) and outdoor air (air outside the vehicle compartment) into the air-conditioning case 31. Operations of the indoor/outdoor air switch 33 are controlled by the control signal output from the controller 60.

The interior blower 32 is provided for the indoor/outdoor air switch 33 at the downstream side of the flow of the supplied air. The interior blower 32 blows the air, drawn through the indoor/outdoor air switch 33, into the vehicle compartment. The interior blower 32 is an electric blower that uses an electric motor to drive a centrifugal multi-blade fan. The interior blower 32 controls the rotation speed (or blowing capability) based on the control voltage output from the controller 60.

The interior blower 32 is provided with the interior evaporator 18 and the heater core 413, downstream of the flow of the supplied air. The interior evaporator 18 is positioned upstream of the heater core 413 in terms of the flow of the supplied air. A cold air bypass channel 35 is formed in the air-conditioning case 31 to flow the supplied air after passing through the interior evaporator 18 while bypassing the heater core 413.

An air mix door 34 is provided downstream of the supplied air referring to the interior evaporator 18 in the air-conditioning case 31 and upstream of the supplied air referring to the heater core 413 and the cold air bypass channel 35.

In terms of the supplied air after passing through the interior evaporator 18, the air mix door 34 provides an airflow rate adjustment portion that adjusts the airflow rate of the supplied air passing through the heater core 413 and the airflow rate of the supplied air passing through the cold air bypass channel 35. The air mix door 34 is driven by an electric actuator for the air mix door. Operations of the electric actuator for the air mix door are controlled by the control signal output from the controller 60.

A mixing space 36 is provided downstream of the flow of the supplied air, referring to the heater core 413 and the cold air bypass channel 35. The mixing space 36 mixes the supplied air heated by the heater core 413 and the supplied air that passes through the cold air bypass channel 35 and is not heated.

The interior air-conditioning unit 30 allows the air mix door 34 to adjust the airflow rate, making it possible to adjust the temperature of the supplied air (air-conditioned wind) mixed in the mixing space 36.

Multiple holes (not shown) are formed in the air-conditioning case 31 most downstream of the flow of the supplied air to blow out the supplied air mixed in the mixing space 36 into the vehicle compartment.

The opening holes lead to multiple outlets formed in the vehicle compartment. The outlets include a face outlet, a foot outlet, and a defroster outlet. The face outlet blows out the supplied air toward the upper body of an occupant. The foot outlet blows out the supplied air toward the feet of the occupant. The defroster outlet blows out the supplied air toward the front window glass of the vehicle.

A blow-out mode door (not shown) is provided for each of the holes. The blow-out mode door opens and closes each hole. The blow-out mode door is driven by an electric actuator for the blow-out mode door. Operations of the electric actuator for the blow-out mode door are controlled by the control signal output from the controller 60.

The interior air-conditioning unit 30 can change positions to blow the air-conditioned wind by switching the holes opened by the blow-out mode door.

The description below outlines the electric control portion of the present embodiment. The controller 60 is composed of a well-known microcomputer including CPU, ROM, RAM, and peripheral circuits. The controller 60 performs various calculations and processes based on a control program stored in the ROM and controls operations of the control-target devices 11, 14*a* through 14*c*, 15*a*, 15*b*, 32, 33, 34, 44, 411, 412, 421*a*, 421*b*, and 422, for example, connected to the output side.

Figure 5:
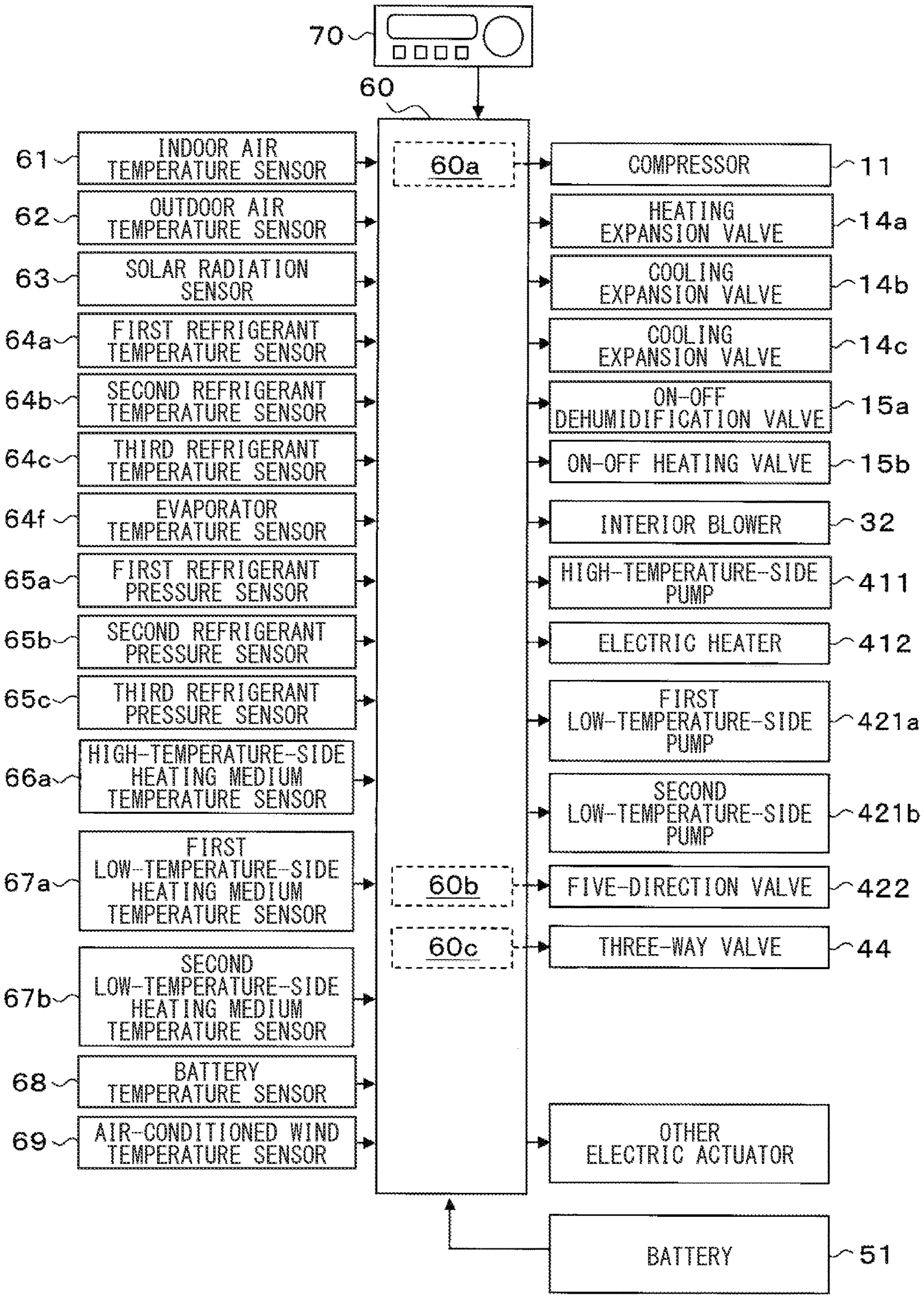
FIG. 5 is a block diagram illustrating an electric control portion of the thermal management system according to the first embodiment.

As illustrated in the block diagram of FIG. 5, the input side of the controller 60 connects with an indoor air temperature sensor 61, an outdoor air temperature sensor 62, a solar radiation sensor 63, a first refrigerant temperature sensor 64*a* through a third refrigerant temperature sensor 64*c*, an evaporator temperature sensor 64*f*, a first refrigerant pressure sensor 65*a* through a third refrigerant pressure sensor 65*c*, a high-temperature-side heating medium temperature sensor 66*a*, a first low-temperature-side heating medium temperature sensor 67*a*, a second low-temperature-side heating medium temperature sensor 67*b*, a battery temperature sensor 68, and an air-conditioned wind temperature sensor 69. The controller 60 is supplied with detection signals from these sensors.

The indoor air temperature sensor 61 is an indoor air temperature detection portion that detects the temperature inside the vehicle compartment (indoor air temperature) Tr. The outdoor air temperature sensor 62 is an outdoor air temperature detection portion that detects the temperature outside the vehicle compartment (outdoor air temperature) Tam. The solar radiation sensor 63 is a solar radiation amount detection portion that detects the amount of solar radiation As irradiated into the vehicle compartment.

The first refrigerant temperature sensor 64*a* is a first refrigerant temperature detection portion that detects first refrigerant temperature TR1, which is the temperature of the refrigerant discharged from the compressor 11. The second refrigerant temperature sensor 64*b* is a second refrigerant temperature detection portion that detects second refrigerant temperature TR2, which is the temperature of the refrigerant flowing from the refrigerant channel 12*a* of the water-refrigerant heat exchanger 12. The third refrigerant temperature sensor 64*c* is a third refrigerant temperature detection portion that detects third refrigerant temperature TR3, which is the temperature of the refrigerant flowing from the outdoor heat exchanger 16.

The evaporator temperature sensor 64*f* is an evaporator temperature detection portion that detects refrigerant evaporation temperature (evaporator temperature) Tefin in the interior evaporator 18. Specifically, the evaporator temperature sensor 64*f* according to the present embodiment detects the temperature of a heat exchange fin of the interior evaporator 18.

The first refrigerant pressure sensor 65*a* is a first refrigerant pressure detection portion to detect a first refrigerant pressure PR1, that is, the pressure of the refrigerant discharged from the compressor 11. The second refrigerant pressure sensor 65*b* is a second refrigerant pressure detection portion to detect a second refrigerant pressure PR2, that is, the pressure of the refrigerant flowing from the refrigerant channel 12*a* of the water-refrigerant heat exchanger 12. The third refrigerant pressure sensor 65*c* is a third refrigerant pressure detection portion to detect a third refrigerant pressure PR3, that is, the pressure of the refrigerant flowing from the outdoor heat exchanger 16.

A high-temperature-side heating medium temperature sensor 66*a* is a high-temperature-side heating medium temperature detection portion that is provided downstream of the electric heater 412 in terms of the flow of the heating medium and detects a high-temperature-side heating medium temperature TWH, that is, the temperature of the heating medium flowing into the three-way valve 44.

The first low-temperature-side heating medium temperature sensor 67*a* is a first low-temperature-side heating medium temperature detection portion to detect a first low-temperature-side heating medium temperature TWL1, that is, the temperature of the heating medium which is pumped from the first low-temperature-side pump 421*a* and flows into the cooling water channel 51*a* of the battery 51.

The second low-temperature-side heating medium temperature sensor 67*b* is a second low-temperature-side heating medium temperature detection portion to detect the second low-temperature-side heating medium temperature TWL2, that is, the temperature of the heating medium which is pumped from the second low-temperature-side pump 421*b* and flows into the cooling water channels 52*a* through 54*a* of the high-voltage instrument 50. More specifically, the second low-temperature-side heating medium temperature TWL2 is the temperature of the heating medium flowing into the cooling water channel 52*a* of the inverter 52.

The battery temperature sensor 68 is a battery temperature detection portion to detect the battery temperature TB (temperature of the battery 51). The battery temperature sensor 68 according to the present embodiment includes multiple temperature sensors and detects temperatures at multiple locations of the battery 51. Therefore, the controller 60 can detect temperature differences among battery cells forming the battery 51. The battery temperature TB uses an average of detection values from the multiple temperature sensors.

The air-conditioned wind temperature sensor 69 is an air-conditioned wind temperature detection portion to detect temperature TAV of the supplied air blown from the mixing space 36 into the vehicle compartment.

As illustrated in FIG. 5, the input side of the controller 60 connects with an air-conditioning operation panel 70. The air-conditioning operation panel 70 is placed near the instrument panel in the front of the vehicle compartment. The controller 60 is supplied with operation signals from various operation switches provided for the air-conditioning operation panel 70.

Specifically, the operation switches provided for the air-conditioning operation panel 70 include an auto switch, an air conditioner switch, an air flow rate setting switch, and a temperature setting switch, for example.

The auto switch is an operation portion that allows the user to enable or disable the automatic control operation of the air conditioning in the vehicle compartment. The air conditioner switch is an operation portion that allows the user to cool the supplied air by using the interior evaporator 18. The air flow rate setting switch is an operation portion that allows the user to manually set the air flow rate of the interior blower 32. The temperature setting switch is an operation portion that allows the user to configure setup temperature Tset in the vehicle compartment.

The controller 60 according to the present embodiment is integrated with a control portion that controls various control-target instruments connected to the output side. The controller 60 configures the hardware and the software as a control portion that controls operations of the control-target instruments.

For example, the configuration of the controller 60 includes a compressor control portion 60*a* configured to control the refrigerant discharge capacity of the compressor 11 (specifically, the rotation speed of the compressor 11). A low-temperature-side heating medium circuit control section 60*b* is configured to control operations of the five-way valve 422. A heat transfer amount control section 60*c* is configured to control operations of the three-way valve 44.

The description below explains the operations of the thermal management system 1 configured as above. As described above, the thermal management system 1 can air-condition the vehicle compartment inside and adjust the temperatures of the in-vehicle units. The thermal management system 1 provides various operation modes by switching the circuit configurations of the refrigeration cycle equipment 10 and the heating medium circuit 40.

The thermal management system 1 includes operation modes such as an operation mode for air conditioning in the vehicle compartment and an operation mode for temperature adjustment of the in-vehicle units. The thermal management system 1 can appropriately combine the operation mode for air conditioning and the operation mode for temperature adjustment.

The thermal management system 1 can only air-condition the vehicle compartment without adjusting the temperatures of the in-vehicle units. It is possible to adjust the temperatures of the in-vehicle units without air conditioning in the vehicle compartment. It is also possible to simultaneously air-condition the vehicle compartment and adjust the temperatures of the in-vehicle units.

The description below explains the operation modes for air conditioning. The operation modes for air conditioning include (A1) cooling mode, (A2) serial dehumidification and heating mode, (A3) parallel dehumidification and heating mode, and (A4) heating mode.

(A1) The cooling mode, as the operation mode, cools the vehicle compartment by cooling and blowing the supplied air into the vehicle compartment.

(A2) The serial dehumidification and heating mode, as the operation mode, dehumidifies and heats the vehicle compartment by reheating the cooled and dehumidified supplied air and blowing it out into the vehicle compartment.

(A3) The parallel dehumidification and heating mode, as the operation mode, heats and dehumidifies the vehicle compartment by reheating the cooled and dehumidified supplied air through the use of a heating capability higher than the serial dehumidification and heating mode and blowing the supplied air out into the vehicle compartment.

(A4) The heating mode, as the operation mode, heats the vehicle compartment by heating the supplied air and blowing it out into the vehicle compartment.

The operation modes for air conditioning are switched by executing a control program for air conditioning stored in the controller 60. The control program for air conditioning is executed when the auto switch of the operation panel 70 is turned on to activate the automatic control operation of air conditioning in the vehicle compartment.

The main routine of the control program for air conditioning reads detection signals from the above-described sensors and operation signals corresponding to the operation switches on the operation panel 70 at predetermined intervals. The main routine calculates target blowout temperature TAO, that is, the target temperature of the air to be blown into the vehicle compartment, based on values of the read detection signals and operation signals.

More specifically, target outlet temperature TAO is calculated through the use of equation F1 as follows.

$$TAO=Kset\times Tset-Kr\times Tr-Kam\times Tam-Ks\times As+C \quad (F1)$$

Tset denotes the setup temperature, in the vehicle compartment, entered by the temperature setting switch on the operation panel 70. Tr denotes the indoor air temperature detected by the indoor air temperature sensor 61. Tam denotes the outdoor air temperature detected by the outdoor air temperature sensor 62. As denotes the amount of solar radiation detected by the solar radiation sensor 63. Kset, Kr, Kam, and Ks denote control gains, and C denotes a correction constant.

The target outlet temperature TAO may be lower than the predetermined cooling reference temperature KTAO1 while the air conditioner switch on the operation panel 70 is turned on. In this case, the operation mode for air conditioning is switched to the cooling mode.

The target air outlet temperature TAO may be higher than or equal to the cooling reference temperature KTAO1 and the outdoor air temperature Tam may be higher than the predetermined dehumidification and heating reference temperature KTAO2 while the air conditioner switch is turned on. In this case, the operation mode for air conditioning is switched to the serial dehumidification and heating mode.

The target outlet temperature TAO may be higher than or equal to the cooling reference temperature KTAO1 and the outdoor air temperature Tam is lower than the dehumidification and heating standard temperature KTAO2 while the air conditioner switch is turned on. In this case, the operation mode for air conditioning is switched to the parallel dehumidification and heating mode.

When the cooling switch as an air conditioner switch is not turned on, the operation mode for air conditioning is switched to the heating mode.

The cooling mode is activated mainly in summer when the outdoor air temperature is relatively high. The serial dehumidification and heating mode is activated mainly in spring or autumn. The parallel dehumidification and heating mode is activated mainly in early spring or late autumn when the supplied air needs to be heated through the use of a heating capability higher than the serial dehumidification and heating mode. The heating mode is activated mainly in winter when the outdoor air temperature is low. The description below explains in detail the operations of the operation modes for air conditioning.

(A1) Cooling Mode

In the cooling mode, the controller 60 fully opens the heating expansion valve 14*a* and throttles the cooling expansion valve 14*b* to reduce the refrigerant pressure. The cooling expansion valve 14*c* is controlled according to the operation mode for temperature adjustment. The same applies to the other operation modes for air conditioning. The controller 60 closes the on-off dehumidification valve 15*a* and the on-off heating valve 15*b*.

The refrigeration cycle equipment 10 in the cooling mode configures a vapor-compression refrigeration cycle where the refrigerant discharged from the compressor 11 circulates through the water-refrigerant heat exchanger 12, the fully open heating expansion valve 14*a*, the outdoor heat exchanger 16, the check valve 17, the cooling expansion valve 14*b*, the interior evaporator 18, the evaporation pressure adjustment valve 19, the accumulator 21, and the suction port of compressor 11 in order.

In addition, the controller 60 accordingly controls the operations of other control-target instruments. For example, the controller 60 controls the rotation speeds of the compressor 11 so that the evaporator temperature Tefin detected by the evaporator temperature sensor 64*f* approximates the target evaporator temperature TEO. The target evaporator temperature TEO is determined by reference to a control map previously stored in the controller 60 based on the target blowout temperature TAO.

The controller 60 controls the throttle opening of the cooling expansion valve 14*b* so that the supercooling degree SC3 of the refrigerant flowing into the cooling expansion valve 14*b* approximates the target supercooling degree SCO3.

The supercooling degree SC3 of the refrigerant flowing into the cooling expansion valve 14*b* is calculated through the use of the third refrigerant temperature TR3 detected by the third refrigerant temperature sensor 64*c* and the third refrigerant pressure PR3 detected by the third refrigerant pressure sensor 65*c*. The target supercooling degree SCO3 is determined by reference to a control map stored in advance in the controller 60 based on the outdoor air temperature Tam so that the performance coefficient (COP) of the cycle approximates the local maximum value.

The controller 60 controls the high-temperature-side pump 411 to provide a predetermined pumping capability. The controller 60 controls the three-way valve 44 so that at least part of the heating medium flowed inside flows out toward the heater core 413. The first low-temperature-side pump 421*a*, the second low-temperature-side pump 421*b*, and the five-way valve 422 are controlled according to the operation mode for temperature adjustment. The same applies to the other operation modes for air conditioning.

The controller 60 operates the electric heater 412 when the high-temperature-side heating medium temperature TWH, detected by the high-temperature-side heating medium temperature sensor 66*a*, is lower than the predetermined reference high-temperature-side heating medium temperature KTWH.

The controller 60 determines the blowing capability of the interior blower 32 based on the target blowout temperature TAO by reference to a control map previously stored in the controller 60. The controller 60 controls the opening of the air mix door 34 so that the supplied air temperature TAV, detected by the air-conditioned wind temperature sensor 69, approximates the target blowout temperature TAO.

The refrigeration cycle equipment 10 in the cooling mode configures a vapor-compression refrigeration cycle that allows the water-refrigerant heat exchanger 12 and the outdoor heat exchanger 16 to function as condensers (or radiators) to radiate and condense the refrigerant and allows the interior evaporator 18 to function as an evaporator to evaporate the refrigerant. As a result, the refrigeration cycle equipment 10 in the cooling mode allows the water-refrigerant heat exchanger 12 to heat the heating medium. The interior evaporator 18 cools the supplied air.

The heating medium circuit 40 in the cooling mode supplies the heater core 413 with the heating medium heated by the water-refrigerant heat exchanger 12.

The interior air-conditioning unit 30 in the cooling mode allows the interior evaporator 18 to cool the supplied air blown from the interior blower 32. The supplied air cooled by the interior evaporator 18 passes through the heater core 413 and the cold air bypass channel 35 according to the opening of the air mix door 34. The temperature is adjusted to approximate the target blowout temperature TAO. The temperature-regulated supplied air is blown out into the vehicle compartment, thereby cooling the inside of the vehicle compartment.

(A2) Serial Dehumidification and Heating Mode

In the serial dehumidification and heating mode, the controller 60 throttles the heating expansion valve 14*a* and the cooling expansion valve 14*b*. The controller 60 closes the on-off dehumidification valve 15*a* and the on-off heating valve 15*b*.

The refrigeration cycle equipment 10 in the serial dehumidification and heating mode configures a vapor-compression refrigeration cycle where the refrigerant discharged from the compressor 11 circulates through the water-refrigerant heat exchanger 12, the heating expansion valve 14*a*, the outdoor heat exchanger 16, the check valve 17, the cooling expansion valve 14*b*, the interior evaporator 18, the evaporation pressure adjustment valve 19, the accumulator 21, and the suction port of compressor 11 in order.

In addition, the controller 60 accordingly controls the operations of other control-target instruments. For example, the controller 60 controls the rotation speed of the compressor 11 similarly to the cooling mode.

The controller 60 determines the throttle opening of the heating expansion valve 14*a* and the throttle opening of the cooling expansion valve 14*b* based on the target blowout temperature TAO by reference to the control map previously stored in the controller 60 so that the COP approximates the local maximum value. The serial dehumidification and heating mode control map is configured to decrease the throttle opening of the heating expansion valve 14*a* and increase the throttle opening of the cooling expansion valve 14*b*, corresponding to an increase in the target blowout temperature TAO.

The controller 60 controls operations of the high-temperature-side pump 411 of the heating medium circuit 40, for example, similarly to the cooling mode. The controller 60 controls operations of the interior blower 32 of the interior air-conditioning unit 30, for example, similarly to the cooling mode.

Therefore, the refrigeration cycle equipment 10 in the serial dehumidification and heating mode configures a vapor-compression refrigeration cycle where the water-refrigerant heat exchanger 12 functions as a condenser and the interior evaporator 18 functions as an evaporator. The outdoor heat exchanger 16 functions as a condenser when the saturation temperature of the refrigerant in the outdoor heat exchanger 16 is higher than the outdoor air temperature Tam. The outdoor heat exchanger 16 functions as an evaporator when the saturation temperature of the refrigerant in the outdoor heat exchanger 16 is lower than the outdoor air temperature Tam.

As a result, the refrigeration cycle equipment 10 in the serial dehumidification and heating mode allows the water-refrigerant heat exchanger 12 to heat the heating medium. The interior evaporator 18 cools the supplied air.

The heating medium circuit 40 in the serial dehumidification and heating mode supplies the heater core 413 with the heating medium heated by the water-refrigerant heat exchanger 12.

The interior air-conditioning unit 30 in the serial dehumidification and heating mode allows the interior evaporator 18 to cool and dehumidify the supplied air from the interior blower 32. The supplied air cooled and dehumidified by the interior evaporator 18 is temperature-regulated to approximate the target blowout temperature TAO according to the adjustment of the opening of the air mix door 34. The temperature-regulated supplied air is blown out into the vehicle compartment to provide dehumidification and heating in the vehicle compartment.

The refrigeration cycle equipment 10 in the serial dehumidification and heating mode decreases the throttle opening of the heating expansion valve 14*a* and increases the throttle opening of the cooling expansion valve 14*b*, corresponding to an increase in the target blowout temperature TAO. It is possible to improve the heating capability of the supplied air in the heater core 413 corresponding to an increase in the target blowout temperature TAO.

More specifically, when the saturation temperature of the refrigerant in the outdoor heat exchanger 16 is higher than the outdoor air temperature Tam, it is possible to decrease a temperature difference between the saturation temperature of the refrigerant in the outdoor heat exchanger 16 and the outdoor air temperature Tam corresponding to an increase in the target blowout temperature TAO. Therefore, as the target blowout temperature TAO increases, it is possible to decrease the amount of heat discharge from the refrigerant in the outdoor heat exchanger 16 to the outdoor air and increase the amount of heat discharge from the refrigerant in the water-refrigerant heat exchanger 12 to the heating medium.

When the saturation temperature of the refrigerant in the outdoor heat exchanger 16 is lower than the outdoor air temperature Tam, it is possible to increase a temperature difference between the outdoor air temperature Tam and the refrigerant in the outdoor heat exchanger 16, corresponding to an increase in the target blowout temperature TAO. It is possible to increase the amount of heat absorbed by the refrigerant in the outdoor heat exchanger 16 from the outdoor air and increase the amount of heat discharged from the refrigerant in the water-refrigerant heat exchanger 12 to the heating medium, corresponding to an increase in the target blowout temperature TAO.

As a result, the serial dehumidification and heating mode can improve the heating capability of the supplied air in the heater core 413, corresponding to an increase in the target blowout temperature TAO.

(A3) Parallel Dehumidification and Heating Mode

In the parallel dehumidification and heating mode, the controller 60 throttles the heating expansion valve 14*a* and the cooling expansion valve 14*b*. The controller 60 opens the on-off dehumidification valve 15*a* and the on-off heating valve 15*b*.

The refrigeration cycle equipment 10 in the parallel dehumidification and heating mode allows the refrigerant discharged from the compressor 11 to circulate through the water-refrigerant heat exchanger 12, the first refrigerant joint portion 13*a*, the heating expansion valve 14*a*, the outdoor heat exchanger 16, the heating channel 22*b*, the accumulator 21, and the suction port of compressor 11 in order. At the same time, a vapor-compression refrigeration cycle is configured to allow the refrigerant discharged from the compressor 11 to circulate through the water-refrigerant heat exchanger 12, the first refrigerant joint portion 13*a*, the dehumidification channel 22*a*, the cooling expansion valve 14*b*, the interior evaporator 18, the evaporation pressure adjustment valve 19, the accumulator 21, and the suction port of compressor 11 in order. In other words, the configured cycle connects the outdoor heat exchanger 16 and the interior evaporator 18 in parallel, referring to the refrigerant flow.

In addition, the controller 60 accordingly controls the operations of other control-target instruments. For example, the controller 60 controls the rotation speed of the compressor 11 so that the first refrigerant pressure PR1 detected by the first refrigerant pressure sensor 65*a* approximates a target condensation pressure PDO. The target condensing pressure PDO is configured so that the high-temperature-side heating medium temperature TWH approximates a predetermined target water temperature TWHO.

The controller 60 determines the throttle opening of the heating expansion valve 14*a* and the throttle opening of the cooling expansion valve 14*b* based on the target blowout temperature TAO by reference to the control map previously stored in the controller 60 so that the COP approximates the local maximum value. The control map in the parallel dehumidification and heating mode is configured to decrease the throttle opening of heating expansion valve 14*a* and increase the opening of the cooling expansion valve 14*b* corresponding to an increase in the target blowout temperature TAO.

The controller 60 controls operations of the high-temperature-side pump 411 of the heating medium circuit 40, for example, similarly to the cooling mode. The controller 60 controls operations of the interior blower 32 of the interior air-conditioning unit 30, for example, similarly to the cooling mode.

The refrigeration cycle equipment 10 in the parallel dehumidification and heating mode configures a vapor-compression refrigeration cycle where the water-refrigerant heat exchanger 12 functions as a condenser, and the outdoor heat exchanger 16 and the interior evaporator 18 function as evaporators. As a result, the refrigeration cycle equipment 10 in the parallel dehumidification and heating mode allows the water-refrigerant heat exchanger 12 to heat the heating medium. The interior evaporator 18 cools the supplied air.

The heating medium circuit 40 in the parallel dehumidification and heating mode supplies the heater core 413 with the heating medium heated by the water-refrigerant heat exchanger 12.

The interior air-conditioning unit 30 in the parallel dehumidification and heating mode allows the interior evaporator 18 to cool and dehumidify the supplied air from the interior blower 32. The supplied air cooled and dehumidified by the interior evaporator 18 is temperature-regulated to approximate the target blowout temperature TAO according to the adjustment of the opening of the air mix door 34. The temperature-regulated supplied air is blown out into the vehicle compartment to provide dehumidification and heating in the vehicle compartment.

Furthermore, the refrigeration cycle equipment 10 in the parallel dehumidification and heating mode can cause the throttle opening of the heating expansion valve 14*a* to be smaller than the throttle opening of the cooling expansion valve 14*b*. It is possible to cause the refrigerant evaporation temperature in the outdoor heat exchanger 16 to be lower than the refrigerant evaporation temperature in the interior evaporator 18.

Compared to the serial dehumidification and heating mode, it is possible to increase the amount of heat absorbed by the refrigerant in the outdoor heat exchanger 16 from the outdoor air and increase the amount of heat discharged from the refrigerant in the water-refrigerant heat exchanger 12 to the heating medium. As a result, the parallel dehumidification and heating mode can improve the heating capability of the supplied air in the heater core 413 more efficiently than the serial dehumidification and heating mode.

(A4) Heating Mode

In the heating mode, the controller 60 throttles the heating expansion valve 14*a* and fully closes the cooling expansion valve 14*b*. The controller 60 closes the on-off dehumidification valve 15*a* and opens the on-off heating valve 15*b*.

Consequently, the refrigeration cycle equipment 10 in the heating mode configures a vapor-compression refrigeration cycle where the refrigerant discharged from the compressor 11 circulates through the water-refrigerant heat exchanger 12, the heating expansion valve 14*a*, the outdoor heat exchanger 16, the heating channel 22*b*, the accumulator 21, and the suction port of the compressor 11 in order.

In addition, the controller 60 accordingly controls the operations of other control-target instruments. For example, the controller 60 controls the rotation speed of the compressor 11 similarly to the parallel dehumidification and heating mode.

The controller 60 controls the throttle opening of the heating expansion valve 14*a* so that the supercooling degree SC2 of the refrigerant flowing into the heating expansion valve 14*a* approximates the target supercooling degree SCO2.

The supercooling degree SC2 of the refrigerant flowing into the heating expansion valve 14*a* is calculated through the use of the second refrigerant temperature TR2 detected by the second refrigerant temperature sensor 64*b* and the second refrigerant pressure PR2 detected by the second refrigerant pressure sensor 65*b*. The target supercooling degree SCO2 is configured based on the first refrigerant temperature TR1 detected by the first refrigerant temperature sensor 64*a* by reference to the control map previously stored in the controller 60 so that COP approximates the local maximum value.

The controller 60 controls operations of the high-temperature-side pump 411 of the heating medium circuit 40, for example, similarly to the cooling mode. The controller 60 controls operations of the interior blower 32 of the interior air-conditioning unit 30, for example, similarly to the cooling mode.

The refrigeration cycle equipment 10 in the heating mode configures a vapor-compression refrigeration cycle where the water-refrigerant heat exchanger 12 functions as a condenser and the outdoor heat exchanger 16 functions as an evaporator. As a result, the refrigeration cycle equipment 10 in the heating mode allows the water-refrigerant heat exchanger 12 to heat the heating medium.

The heating medium circuit 40 in the heating mode supplies the heater core 413 with the heating medium heated by the water-refrigerant heat exchanger 12.

The interior air-conditioning unit 30 in the heating mode allows the supplied air blown from the interior blower 32 to pass through the interior evaporator 18. The opening of the air mix door 34 is adjusted so that the supplied air having passed through the interior evaporator 18 is temperature-regulated to approximate the target blowout temperature TAO. The temperature-regulated supplied air is blown into the vehicle compartment to heat the vehicle compartment.

The description below explains the operation mode for temperature adjustment. The operation mode for temperature adjustment adjusts the temperatures of the battery 51 as a first temperature adjustment target and the high-voltage instrument 50 as a second temperature adjustment target.

According to the present embodiment, as above, the appropriate temperature zone for the battery 51 as the first temperature adjustment target differs from the appropriate temperature zone for the high-voltage instrument 50 as the second temperature adjustment target. For this reason, the operation mode for temperature adjustment combines the operation mode for the battery to adjust the temperature of the battery 51 and the operation mode for the high-voltage instrument to adjust the temperature of the high-voltage instrument 50.

Operation modes for the battery include (B1) battery warming mode, (B2) battery warming mode, and (B3) battery cooling mode.

(B1) The battery warming mode is an operation mode that warms up the battery 51 through the use of a temperature-regulated heating medium.

(B2) The battery-temperature averaging mode is an operation mode that averages the temperatures of battery cells forming the battery 51.

(B3) The battery cooling mode is an operation mode that cools the battery 51 through the use of the heating medium cooled by the chiller 20.

Operation modes for high-voltage instruments include (C1) high-voltage-instrument heat storage mode, (C2) high-voltage-instrument waste heat recovery mode, and (C3) high-voltage-instrument cooling mode.

(C1) The high-voltage-instrument heat storage mode is an operation mode that uses the heat generated by the high-voltage instrument 50 to warm up the high-voltage instrument 50 and heat the heating medium.

(C2) The high-voltage-instrument waste heat recovery mode is an operation mode that uses the heating medium cooled by the chiller 20 to cool the high-voltage instrument 50. In other words, this operation mode is an operation mode in which the chiller 20 allows the low-pressure refrigerant to absorb the waste heat from the high-voltage instrument 50.

(C3) The high-voltage-instrument cooling mode is an operation mode that cools the high-voltage instrument 50 through the use of the heating medium cooled by the low-temperature-side radiator 423.

The operation modes for temperature adjustment are switched in response to the execution of the control program for temperature adjustment stored in the controller 60. The control program for temperature adjustment is executed when the vehicle system starts or when the battery 51 is being charged from an external power source, regardless of whether the user requests air conditioning in the vehicle compartment.

The control program for temperature adjustment reads detection signals from the above-described sensors at predetermined intervals. The operation modes for temperature adjustment are switched based on the read detection signals.

More specifically, the control program for temperature adjustment references the control map previously stored in the controller 60 and switches the operation modes for temperature adjustment based on the battery temperature TB detected by the battery temperature sensor 68 and the second low-temperature-side heating medium temperature TWL2 detected by the second low-temperature-side heating medium temperature sensor 67*b*.

Figure 6:
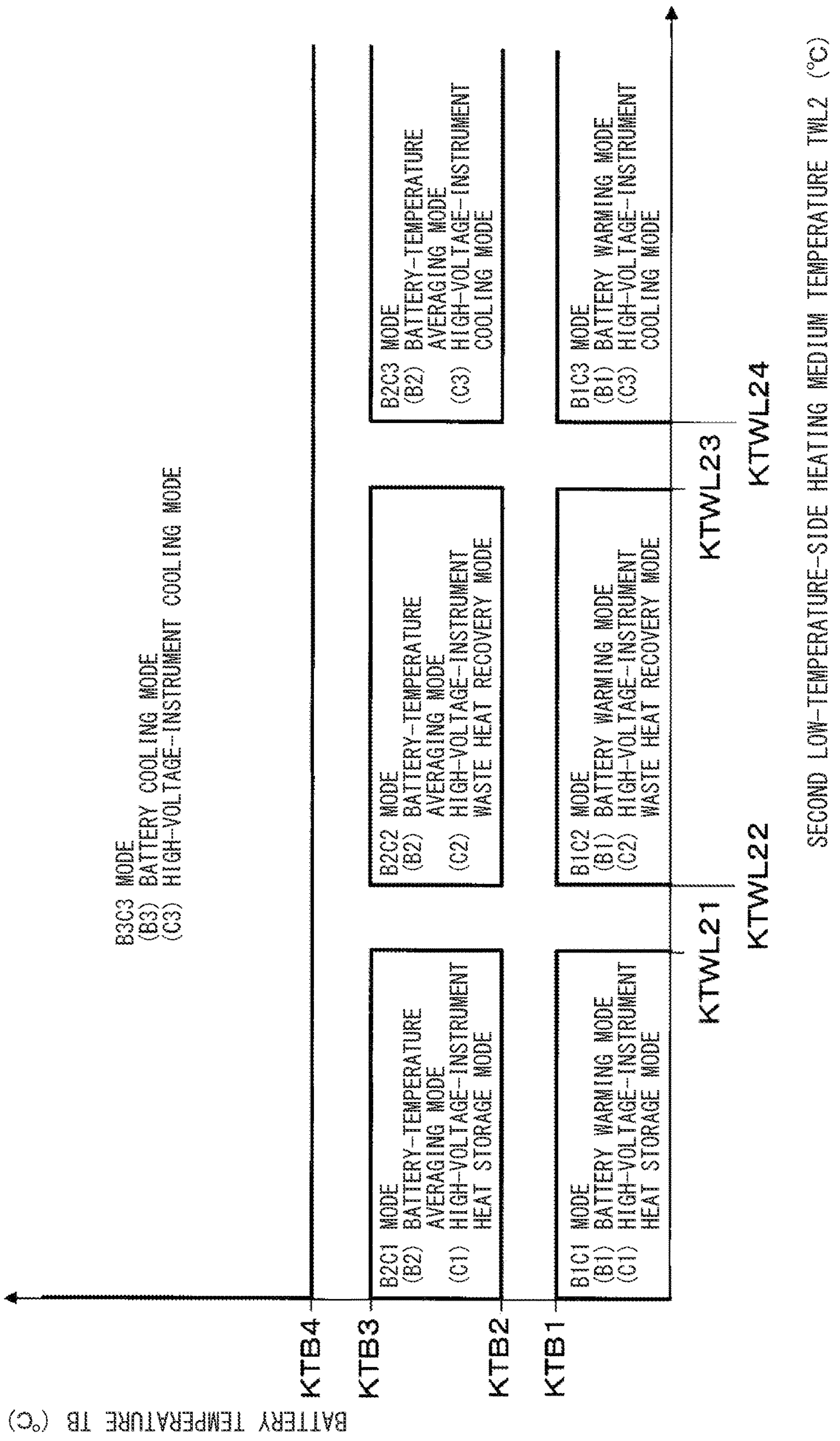
FIG. 6 is a control characteristics diagram illustrating switching among operation modes for temperature adjustment in the thermal management system according to the first embodiment.

As illustrated in the control characteristics diagram in FIG. 6, the control program for temperature adjustment references the control map to switch the operation mode for the battery to the (B1) battery warming mode when the battery temperature TB is lower than the first reference battery temperature KTB1.

The (B1) battery warming mode switches to the (B2) battery-temperature averaging mode when the battery temperature TB increases to be higher than or equal to the second reference battery temperature KTB2. The (B2) battery-temperature averaging mode switches to the (B3) battery cooling mode when the battery temperature TB reaches or exceeds the fourth reference battery temperature KTB4.

The (B3) battery cooling mode switches to the (B2) battery-temperature averaging mode when the battery temperature TB decreases to be lower than or equal to the third reference battery temperature KTB3. The (B2) battery-temperature averaging mode switches to the (B1) battery warming mode when the battery temperature TB decreases to be lower than or equal to the first reference battery temperature KTB1.

As above, there is a temperature difference between the fourth reference battery temperature KTB4 and the third reference battery temperature KTB3. There is a temperature difference between the second reference battery temperature KTB2 and the first reference battery temperature KTB1. These temperature differences are configured as hysteresis widths to prevent control hunting.

As illustrated in the control characteristics diagram in FIG. 6, the second low-temperature side heating medium temperature TWL2 is lower than or equal to the first reference high-voltage instrument side temperature KTWL21. In this case, the operation mode for the high-voltage instrument switches to the (C1) high-voltage-instrument heat storage mode.

The (C1) high-voltage-instrument heat storage mode switches to the (C2) high-voltage-instrument waste heat recovery mode when the second low-temperature side heating medium temperature TWL2 increases to be higher than or equal to the second reference high-voltage instrument side temperature KTWL22, The (C2) high-voltage-instrument waste heat recovery mode switches to the (C3) high-voltage-instrument cooling mode when the second low-temperature side heating medium temperature TWL2 reaches or exceeds the fourth reference high-voltage instrument side temperature KTWL24.

The (C3) high-voltage-instrument cooling mode switches to the (C2) high-voltage-instrument waste heat recovery mode when the second low-temperature side heating medium temperature TWL2 decreases to be lower than or equal to the third reference high-voltage instrument side temperature KTWL23. The (C2) high-voltage-instrument waste heat recovery mode switches to the (C1) high-voltage-instrument heat storage mode when the second low-temperature side heating medium temperature TWL2 decreases to be lower than or equal to the first reference high-voltage instrument side temperature KTWL21.

As illustrated in the control characteristics diagram in FIG. 6, however, the present embodiment cools the battery 51 when the operation mode for the battery is set to the (B3) battery cooling mode. Then, the operation mode for high-voltage instruments switches to the (C3) high-voltage-instrument cooling mode.

The description below explains the detailed operations of each operation mode for temperature adjustment. Each operation mode for temperature adjustment will be described by combining the code attached to the operation mode for the battery and the code attached to the operation mode for the high-voltage instrument. For example, B1C1 mode represents the operation mode that performs the (B1) battery warming mode and the (C1) high-voltage-instrument heat storage mode.

First, the operation mode for temperature adjustment will be explained during air-conditioning such as air-conditioning the vehicle compartment while the vehicle travels, for example.

The operation mode for temperature adjustment during air conditioning assumes activation of any one of the (A1) cooling mode, the (A2) serial dehumidification and heating mode, the (A3) parallel dehumidification and heating mode, and the (A4) heating mode described above. In other words, the operation mode for temperature adjustment during air conditioning assumes active operations of the compressor 11 of the refrigeration cycle equipment 10, the interior blower 32 of the interior air-conditioning unit 30, and the high-temperature-side pump 411 of the high-temperature-side circuit 41 of the heating medium circuit 40, for example.

(B1C1 Mode During Air Conditioning)

The B1C1 mode is an operation mode that performs the (B1) battery warming mode and (C1) the high-voltage-instrument heat storage mode.

In the B1C1 mode, the controller 60 fully closes the cooling expansion valve 14*c* of the refrigeration cycle equipment 10. Therefore, the refrigeration cycle equipment 10 in the B1C1 mode prevents the refrigerant from flowing into the chiller 20.

The controller 60 controls operations of the three-way valve 44 so that the heating medium flowing inside flows out to both the heater core 413 and the inlet-side connection channel 431. The controller 60 operates the first low-temperature-side pump 421*a* and the second low-temperature-side pump 421*b* to provide the predetermined pumping capability.

The controller 60 controls operations of the five-way valve 422 to connect the outlet side of the cooling water channel 51*a* of the battery 51 with the inlet side of the heating medium bypass channel 424. At the same time, the controller 60 switches to the circuit that connects the outlet side of the cooling water channels 52*a* through 54*a* of the high-voltage instrument 50 with the inlet side of the heating medium channel 20*b* of the chiller 20.

Figure 7:
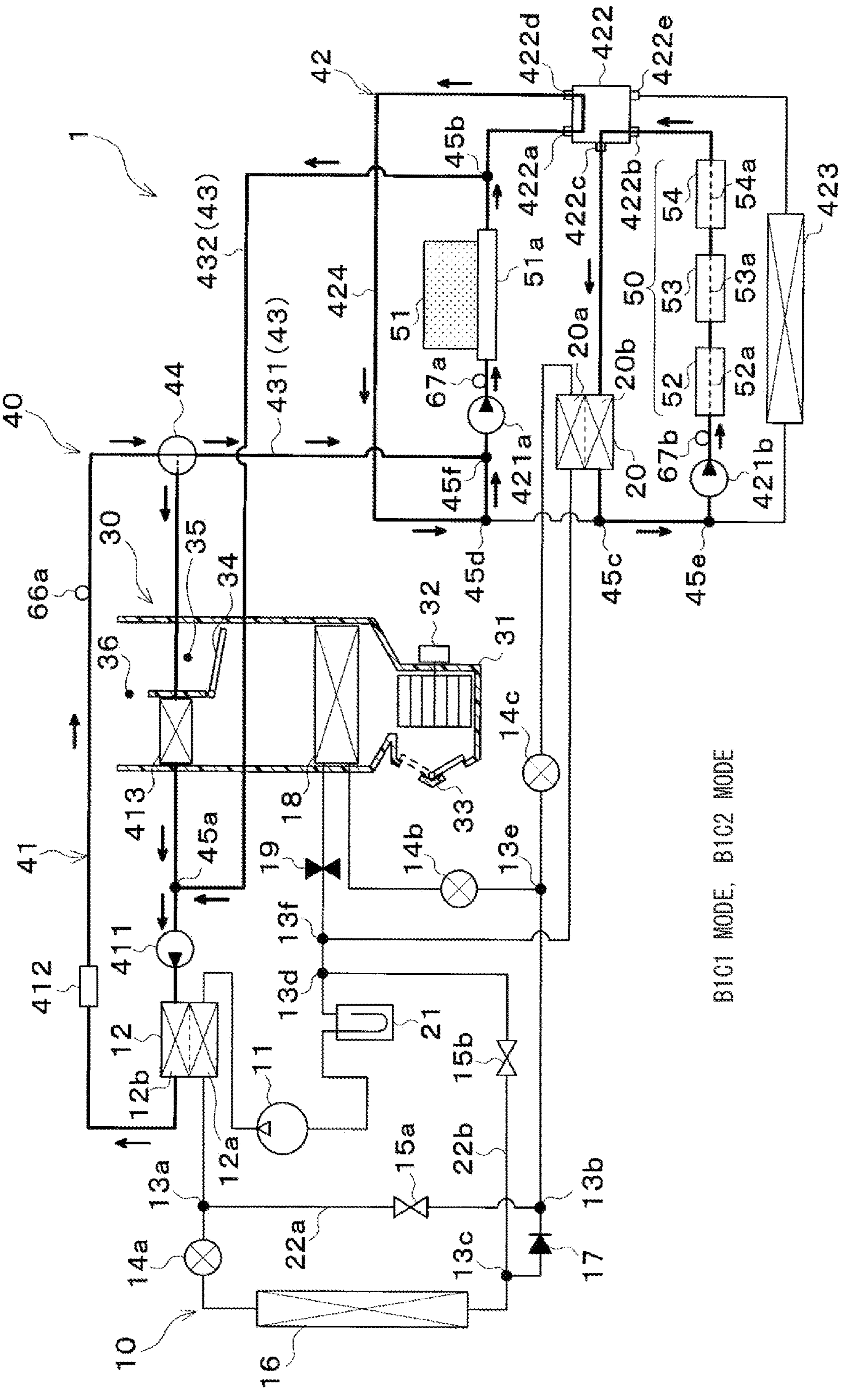
FIG. 7 is an overall schematic configuration diagram illustrating the flow of a heating medium in B1C1 mode, for example, according to the first embodiment.

The heating medium flows through the heating medium circuit 40 of the B1C1 mode as indicated by the arrow in FIG. 7. Specifically, the high-temperature-side circuit 41 in the B1C1 mode circulates the heating medium pumped from the high-temperature-side pump 411 through the heating medium channel 12*b* of the water-refrigerant heat exchanger 12, the electric heater 412, the three-way valve 44, the heater core 413, and the suction port of the high-temperature-side pump 411 in order.

The low-temperature-side circuit 42 in the B1C1 mode allows a heating medium pumped from the first low-temperature-side pump 421*a* to circulate through the cooling water channel 51*a* of the battery 51, the five-way valve 422, the heating medium bypass channel 424, and the suction port of the first low-temperature-side pump 421*a* in order. A heating medium pumped from the second low-temperature-side pump 421*b* circulates through the cooling water channels 52*a* through 54*a* of the high-voltage instrument 50, the five-way valve 422, the heating medium channel 20*b* of the chiller 20, and the suction port of the second low-temperature-side pump 421*b* in order.

The connection channel 43 in the B1C1 mode flows part of the heating medium flowing into the three-way valve 44 to the suction port side of the first low-temperature-side pump 421*a* via the inlet-side connection channel 431. Part of the heating medium flowing from the cooling water channel 51*a* of the battery 51 flows toward the suction port of the high-temperature-side pump 411 via the outlet-side connection channel 432.

In addition, the controller 60 accordingly controls the operations of other control-target instruments. For example, the controller 60 controls operations of three-way valve 44 so that the first low-temperature-side heating medium temperature TWL1 detected by the first low-temperature-side heating medium temperature sensor 67*a* approximates a predetermined targeted warming temperature TWLW1. In other words, the controller 60 controls operations of the three-way valve 44 so that the temperature of the heating medium flowing into the cooling water channel 51*a* of the battery 51 approximates the targeted warming temperature TWLW1. The targeted warming temperature TWLW1 is configured to be able to appropriately warm up the battery 51.

The heating medium circuit 40 in the B1C1 mode flows the heating medium into the three-way valve 44 under the condition that the heating medium is heated by the water-refrigerant heat exchanger 12 or the electric heater 412 for air conditioning in the vehicle compartment. The heating medium flowing into the three-way valve 44 is divided by the three-way valve 44 and flows into the heater core 413 and the inlet-side connection channel 431.

The heating medium flowing into the inlet-side connection channel 431 from the three-way valve 44 flows into the sixth heating medium joint portion 45*f*. The sixth heating medium joint portion 45*f* joins the flow of the heating medium flowing out of the inlet-side connection channel 431 with the flow of the heating medium flowing out of the heating medium bypass channel 424. At this time, the three-way valve 44 adjusts the flow rate of the heating medium flowing through the inlet-side connection channel 431 so that the temperature of the heating medium flowing into the cooling water channel 51*a* of the battery 51 approximates the targeted warming temperature TWLW1 for warming-up.

The heating medium flowing out of the sixth heating medium joint portion 45*f* is drawn into the first low-temperature-side pump 421*a* and is pumped to the cooling water channel 51*a* of the battery 51. The heating medium flowing into the cooling water channel 51*a* of the battery 51 radiates heat to each battery cell of the battery 51. Consequently, the battery 51 warms up.

The second heating medium joint portion 45*b* branches the flow of the heating medium flowing out of the cooling water channel 51*a* of the battery 51. One of the heating media branched at the second heating medium joint portion 45*b* flows into the first heating medium joint portion 45*a* through the outlet-side connection channel 432.

The first heating medium joint portion 45*a* joints the flow of the heating medium flowing out of the outlet-side connection channel 432 with the flow of the heating medium flowing out of the heater core 413. The heating medium joined at the first heating medium joint portion 45*a* is drawn into the high-temperature-side pump 411.

The other heating medium branched at the second heating medium joint portion 45*b* flows into the heating medium bypass channel 424 via the five-way valve 422. The heating medium flowing out of the heating medium bypass channel 424 flows into the sixth heating medium joint portion 45*f* via the fourth heating medium joint portion 45*d*.

The B1C1 mode low-temperature-side circuit 42 allows the heating medium pumped from the second low-temperature-side pump 421*b* to flow into the cooling water channels 52*a* through 54*a* of the high-voltage instrument 50. At this time, the temperature of the heating medium flowing through the cooling water channels 52*a* through 54*a* of the high-voltage instrument 50 may be lower than the temperature of the high-voltage instrument 50. Then, the heating medium absorbs the waste heat of the high-voltage instrument 50.

The heating medium flowing out of the cooling water channels 52*a* through 54*a* of the high-voltage instrument 50 flows into the heating medium channel 20*b* of the chiller 20 via the five-way valve 422. The B1C1 mode fully closes the cooling expansion valve 14*c*. Therefore, the chiller 20 does not perform heat exchange between the heating medium and the refrigerant.

The heating medium flowing out of the heating medium channel 20*b* of the chiller 20 is drawn into the second low-temperature-side pump 421*b* via the third heating medium joint portion 45*c* and the fifth heating medium joint portion 45*e*. The low-temperature-side circuit 42 in the B1C1 mode warms up the high-voltage instrument 50 and heats the heating medium without allowing the waste heat from the high-voltage instrument 50 to be radiated to refrigerant or outdoor air.

(B1C2 Mode During Air Conditioning)

The B1C2 mode is an operation mode that performs the (B1) battery warming mode and the (C2) high-voltage-instrument waste heat recovery mode. The (C2) high-voltage-instrument waste heat recovery mode is not an operation mode to cool the high-voltage instrument 50. In the B1C2 mode, there may be no need to recover waste heat from the high-voltage instrument 50 for air conditioning or warming up the battery 51. In this case, operations similar to those in the B1C1 mode may be performed.

In the B1C2 mode during air conditioning, the controller 60 throttles the cooling expansion valve 14*c* of the refrigeration cycle equipment 10. When the operation mode for air conditioning is set to the (A4) heating mode, the controller 60 opens the on-off dehumidification valve 15*a* and the on-off heating valve 15*b*.

The refrigeration cycle equipment 10 in the B1C2 mode flows the low-pressure refrigerant decompressed by the cooling expansion valve 14*c* into the refrigerant channel 20*a* of the chiller 20. The refrigerant flowing out of the refrigerant channel 20*a* of the chiller 20 flows into the accumulator 21 via the sixth refrigerant joint portion 13*f* and the fourth refrigerant joint portion 13*d*.

When the operation mode for air conditioning is set to the (A4) heating mode, the refrigerant discharged from the compressor 11 circulates through the water-refrigerant heat exchanger 12, the first refrigerant joint portion 13*a*, the heating expansion valve 14*a*, the outdoor heat exchanger 16, the heating channel 22*b*, the accumulator 21, and the suction port of compressor 11 in order. At the same time, a vapor-compression refrigeration cycle is formed so that the refrigerant discharged from the compressor 11 circulates through the water-refrigerant heat exchanger 12, the first refrigerant joint portion 13*a*, the dehumidification channel 22*a*, the cooling expansion valve 14*c*, the chiller 20, the accumulator 21, and the suction port of the compressor 11 in order. That is, the configured cycle parallel connects the outdoor heat exchanger 16 and the chiller 20, referring to the refrigerant flow.

Similar to the B1C1 mode, the controller 60 controls operations of the three-way valve 44, the five-way valve 422, the first low-temperature-side pump 421*a*, and the second low-temperature-side pump 421*b*.

Similar to the B1C1 mode, the heating medium circuit 40 in the B1C2 mode flows the heating medium as indicated by arrows in FIG. 7.

In addition, the controller 60 can accordingly control the operations of other control-target instruments. For example, the controller 60 may control the throttle opening of the cooling expansion valve 14*c* so that the second low-temperature-side heating medium temperature TWL2 approximates the predetermined targeted warming temperature TWLO2 for high-voltage instruments. In other words, the controller 60 controls the throttle opening of the cooling expansion valve 14*c* so that the temperature of the heating medium flowing into the cooling water channel 50*a* of the high-voltage instrument 50 approximates the targeted warming temperature TWLO2 for high-voltage instruments. The targeted warming temperature TWLO2 for high-voltage instruments is configured so that the high-voltage instrument 50 can function properly.

The refrigeration cycle equipment 10 in the B1C2 mode configures a vapor-compression refrigeration cycle where the water-refrigerant heat exchanger 12 functions as a condenser and at least the chiller 20 functions as an evaporator. The water-refrigerant heat exchanger 12 can heat the heating medium circulating through the high-temperature-side circuit 41 by using a heat source, that is, at least the waste heat of the high-voltage instrument 50, recovered by the chiller 20 in the low-pressure refrigerant.

Similar to the B1C1 mode, the heating medium circuit 40 in the B1C2 mode warms up the battery 51.

The low-temperature-side circuit 42 in the B1C2 mode flows the heating medium pumped from the second low-temperature-side pump 421*b* into the cooling water channels 52*a* through 54*a* of the high-voltage instrument 50. The heating medium flowing through the cooling water channels 52*a* through 54*a* of the high-voltage instrument 50 absorbs the waste heat of the high-voltage instrument 50. The high-voltage instrument 50 is thus cooled.

The heating medium flowing out of the cooling water channels 52*a* through 54*a* of the high-voltage instrument 50 flows into the heating medium channel 20*b* of the chiller 20 via the five-way valve 422. In the B1C2 mode, the cooling expansion valve 14*c* is throttled. The heating medium flowing into the chiller 20 is cooled by performing heat exchange with the low-pressure refrigerant decompressed by the cooling expansion valve 14*c*. Consequently, the temperature of the heating medium flowing into the cooling water channel 50*a* of the high-voltage instrument 50 approximates the targeted warming temperature TWLO2 for high-voltage instruments.

The heating medium flowing out of the heating medium channel 20*b* of the chiller 20 is drawn into the second low-temperature-side pump 421*b* via the third heating medium joint portion 45*c* and the fifth heating medium joint portion 45*e*.

The low-pressure refrigerant flowing into the chiller 20 absorbs the heat of the heating medium and evaporates. In other words, the low-pressure refrigerant flowing into the chiller 20 recovers the waste heat of the high-voltage instrument 50.

In the B1C2 mode during air conditioning, the compressor 11 of the refrigeration cycle equipment 10 is operating. When the refrigeration cycle equipment 10 operates in the B1C2 mode during air conditioning, the compressor 11 compresses the refrigerant, recovering the waste heat of the high-voltage instrument 50 in the chiller 20, and discharges the refrigerant toward the refrigerant channel 12*a* of the water-refrigerant heat exchanger 12.

The water-refrigerant heat exchanger 12 radiates at least part of the waste heat of the high-voltage instrument 50, recovered by the chiller 20 in the low-pressure refrigerant, to the heating medium flowing through the high-temperature-side circuit 41. The heating medium flowing through the high-temperature-side circuit 41 is thereby heated. The B1C2 mode heats the heating medium flowing through the high-temperature-side circuit 41 by using a heat source, that is, the waste heat from the high-voltage instrument 50. Furthermore, the heated heating medium is used as a heat source to heat the supplied air and warm up the battery 51.

A possible means of warming up the battery 51 may be to flow the heating medium, flowing out of the cooling water channels 52*a* through 54*a* of the high-voltage instrument 50, directly into the cooling water channel 51*a* of the battery 51.

However, the heating medium flowing out of the cooling water channels 52*a* through 54*a* of the high-voltage instrument 50 may be heated to a relatively high temperature (such as 60° C. or higher). There is a possibility of increasing the temperature of the battery 51 and hastening the deterioration of the battery 51 if the heating medium flowing out of the cooling water channels 52*a* through 54*a* of the high-voltage instrument 50 directly flows into the cooling water channel 51*a* of the battery 51.

Meanwhile, the B1C2 mode allows the refrigerant of refrigeration cycle equipment 10 to recover the waste heat of high-voltage instrument 50 and uses the waste heat as a heat source to heat the heating medium circulating through the high-temperature-side circuit 41. Therefore, it is possible to set the temperature of the heating medium flowing through the high-temperature-side circuit 41 to an intended temperature lower than the temperature of the heating medium immediately after flowing out of the cooling water channels 52*a* through 54*a* of the high-voltage instrument 50.

As a result, the B1C2 mode can appropriately warm up the battery 51 without causing a rapid temperature rise of the battery 51.

(B1C3 Mode During Air Conditioning)

The B1C3 mode is an operation mode that performs the (B1) battery warming mode and the (C3) high-voltage-instrument cooling mode.

In the B1C3 mode, the controller 60 fully closes the cooling expansion valve 14*c* of the refrigeration cycle equipment 10. Therefore, the refrigeration cycle equipment 10 in the B1C3 mode prevents the refrigerant from flowing into the chiller 20.

Similar to the B1C1 mode, the controller 60 controls operations of the three-way valve 44, the first low-temperature-side pump 421*a*, and the second low-temperature-side pump 421*b*. The controller 60 controls operations of the five-way valve 422 to connect the outlet side of the cooling water channel 51*a* of the battery 51 with the inlet side of the heating medium bypass channel 424. At the same time, the controller 60 activates the circuit that connects the outlet side of the cooling water channels 52*a* through 54*a* of the high-voltage instrument 50 with the heating-medium inlet side of the low-temperature-side radiator 423.

Figure 8:
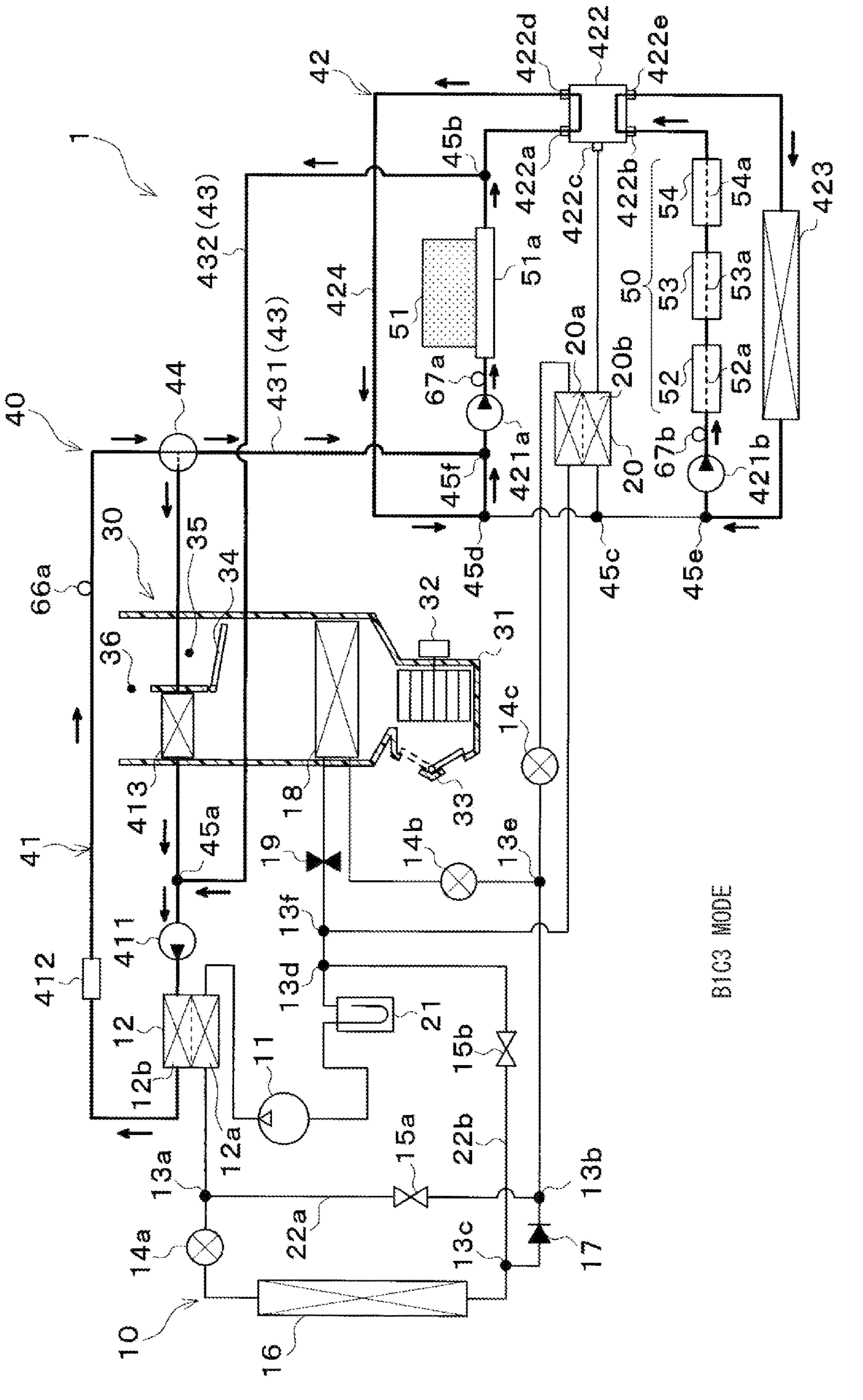
FIG. 8 is an overall schematic configuration diagram illustrating the flow of a heating medium in B1C3 mode according to the first embodiment.

The heating medium circuit 40 in the B1C3 mode allows the heating medium to flow as indicated by the arrows in FIG. 8. Specifically, the high-temperature-side circuit 41 in the B1C3 mode circulates the heating medium pumped from the high-temperature-side pump 411 similarly to the B1C1 mode. The heating medium flows through the connection channel 43 in the B1C3 mode similarly to the B1C1 mode.

The low-temperature-side circuit 42 in the B1C3 mode allows the heating medium pumped from the first low-temperature-side pump 421*a* to circulate through the cooling water channel 51*a* of the battery 51, the five-way valve 422, the heating medium bypass channel 424, and the suction port of the first low-temperature-side pump 421*a* in order. The heating medium pumped from the second low-temperature-side pump 421*b* circulates through the cooling water channels 52*a* through 54*a* of the high-voltage instrument 50, the five-way valve 422, the low-temperature-side radiator 423, and the suction port of the second low-temperature-side pump 421*b* in order.

Similar to the B1C1 mode, the heating medium circuit 40 in the B1C3 mode properly warms up the battery 51.

The low-temperature-side circuit 42 in the B1C3 mode flows the heating medium pumped from the second low-temperature-side pump 421*b* into the cooling water channels 52*a* through 54*a* of the high-voltage instrument 50. The heating medium flowing through the cooling water channels 52*a* through 54*a* of the high-voltage instrument 50 absorbs the waste heat of the high-voltage instrument 50. The high-voltage instrument 50 is thus cooled.

The heating medium flowing out of the cooling water channels 52*a* through 54*a* of the high-voltage instrument 50 flows into low-temperature-side radiator 423 via the five-way valve 422. The heating medium flowing into the low-temperature-side radiator 423 dissipates heat to the outdoor air and is cooled. The heating medium flowing into the cooling water channels 52*a* through 54*a* of the high-voltage instrument 50 is cooled approximately to the outdoor air temperature.

The heating medium flowing out of the low-temperature-side radiator 423 is drawn into the second low-temperature-side pump 421*b* via the fifth heating medium joint portion 45*e*. The low-temperature-side circuit 42 in the B1C3 mode allows the low-temperature-side radiator 423 to dissipate waste heat from the high-voltage instrument 50 to the outdoor air, thus cooling the high-voltage instrument 50.

(B2C1 Mode During Air Conditioning)

The B2C1 mode is an operation mode that performs the (B2) battery-temperature averaging mode and the (C1) high-voltage-instrument heat storage mode.

In the B2C1 mode, the controller 60 fully closes the cooling expansion valve 14*c* of the refrigeration cycle equipment 10. Therefore, the refrigeration cycle equipment 10 in the B1C1 mode prevents the refrigerant from flowing into the chiller 20.

The controller 60 controls operations of the three-way valve 44 to direct the total flow of the heating medium flowing inside to flow toward the heater core 413. Similar to the B1C1 mode, the controller 60 controls operations of the five-way valve 422, the first low-temperature-side pump 421*a*, and the second low-temperature-side pump 421*b*.

Figure 9:
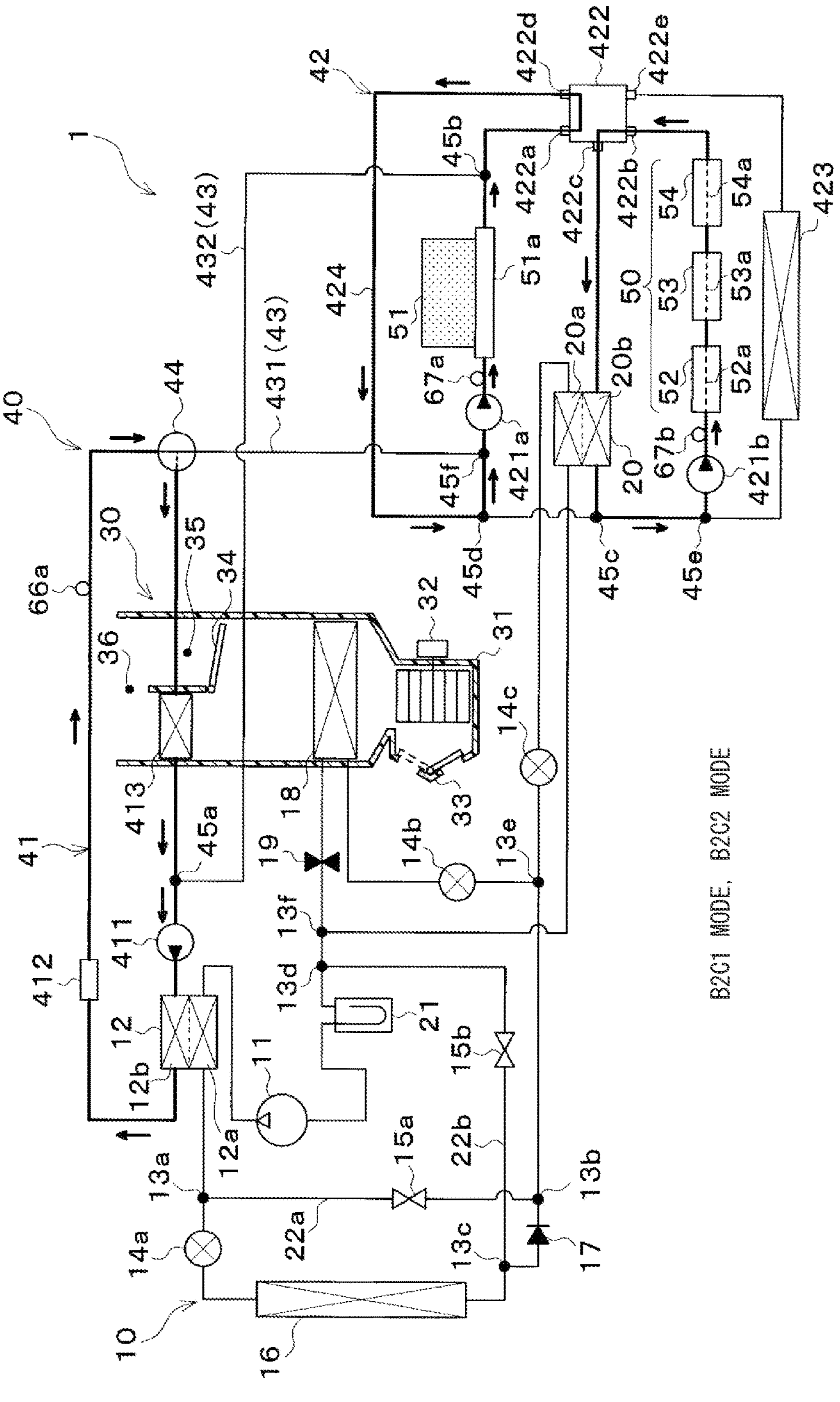
FIG. 9 is an overall schematic configuration diagram illustrating the flow of a heating medium in B2C1 mode, for example, according to the first embodiment.

The heating medium flows through the heating medium circuit 40 of the B2C1 mode as indicated by the arrow in FIG. 9. Specifically, the high-temperature-side circuit 41 in the B2C1 mode circulates the heating medium pumped from a high-temperature-side pump 411 through the heating medium channel 12*b* of the water-refrigerant heat exchanger 12, the electric heater 412, the three-way valve 44, the heater core 413, and the suction port of the high-temperature-side pump 411 in order. The connection channel 43 in the B2C1 mode does not flow the heating medium.

The low-temperature-side circuit 42 in the B2C1 mode circulates the heating medium pumped from the first low-temperature-side pump 421*a* through the cooling water channel 51*a* of the battery 51, the five-way valve 422, the heating medium bypass channel 424, and the suction port of the first low-temperature-side pump 421*a* in order. The heating medium pumped from the second low-temperature-side pump 421*b* circulates through the cooling water channels 52*a* through 54*a* of the high-voltage instrument 50, the five-way valve 422, the heating medium channel 20*b* of the chiller 20, and the suction port of the second low-temperature-side pump 421*b* in order.

The low-temperature-side circuit 42 in the B2C1 mode pumps the heating medium pumped from the first low-temperature-side pump 421*a* to the cooling water channel 51*a* of the battery 51. The heating medium circulates through the cooling water channel 51*a* of the battery 51, thus averaging temperatures of the battery cells forming the battery 51. Similar to the B1C1 mode, the low-temperature-side circuit 42 in the B2C1 mode warms up the high-voltage instrument 50 and heats the heating medium.

In the B2C1 mode, a temperature difference ΔTB between the battery cells may be smaller than or equal to a predetermined reference temperature difference ΔKTB. In such a case, it may be favorable to perform a temperature averaging OFF mode that stops the first low-temperature-side pump 421*a*. The temperature difference ΔTB can be calculated from the detection values of the battery temperature sensor 68. The reference temperature difference ΔKTB needs to be set not to cause the degradation of the battery 51.

(B2C2 Mode During Air Conditioning)

The B2C2 mode is an operation mode that performs the (B2) battery-temperature averaging mode and the (C2) high-voltage-instrument waste heat recovery mode. In the B2C2 mode as well, there may be no need to recover waste heat from the high-voltage instrument 50 for air conditioning or warming up the battery 51. In this case, operations similar to those in the B2C1 mode may be performed.

In the B2C2 mode during air conditioning, the controller 60 throttles the cooling expansion valve 14*c* of the refrigeration cycle equipment 10, similar to the B1C2. When the operation mode for air conditioning is set to the (A4) heating mode, the controller 60 opens the on-off dehumidification valve 15*a* and the on-off heating valve 15*b*.

The refrigeration cycle equipment 10 in the B2C2 mode flows the low-pressure refrigerant decompressed by the cooling expansion valve 14*c* into the refrigerant channel 20*a* of the chiller 20. The refrigerant flowing out of the refrigerant channel 20*a* of the chiller 20 flows into the accumulator 21 via the sixth refrigerant joint portion 13*f* and the fourth refrigerant joint portion 13*d*.

When the operation mode for air conditioning is set to the (A4) heating mode, a cycle is configured to parallel connect the outdoor heat exchanger 16 and the chiller 20, referring to the refrigerant flow, similar to the B1C2 mode.

Similar to the B2C1 mode, the controller 60 controls operations of the three-way valve 44, the five-way valve 422, the first low-temperature-side pump 421*a*, and the second low-temperature-side pump 421*b*.

The B2C2 mode heating medium circuit 40 flows the heating medium similar to the B2C1 mode, as indicated by the arrows in FIG. 9.

Similar to the B1C2 mode, the controller 60 appropriately controls the operations of the other control-target instruments.

Similar to the B2C1 mode, the low-temperature-side circuit 42 in the B2C2 mode averages the temperatures of the battery cells forming the battery 51.

Similar to the B1C2 mode, the low-temperature-side circuit 42 in the B2C2 mode allows the heating medium cooled by the chiller 20 to flow through the cooling water channels 52*a* through 54*a* of the high-voltage instrument 50. The high-voltage instrument 50 is thereby cooled.

The B2C2 mode during air conditioning operates the compressor 11 of the refrigeration cycle equipment 10. Similar to the B1C2 mode, the refrigeration cycle equipment 10 in the B2C2 mode during air conditioning heats the heating medium flowing through the high-temperature-side circuit 41 by using a heat source, that is, the waste heat of the high-voltage instrument 50, recovered by the chiller 20 in the low-pressure refrigerant. Moreover, the heated heating medium is used as a heat source to heat the supplied air.

Similar to the B2C1 mode, the B2C2 mode may also perform the temperature averaging OFF mode.

(B2C3 Mode During Air Conditioning)

The B2C3 mode is an operation mode that performs the (B2) battery-temperature averaging mode and the (C3) high-voltage-instrument cooling mode.

In the B2C3 mode, the controller 60 fully closes the cooling expansion valve 14*c* of the refrigeration cycle equipment 10. Therefore, the refrigeration cycle equipment 10 in the B2C3 mode prevents the refrigerant from flowing into the chiller 20.

Similar to the B2C1 mode, the controller 60 controls operations of the three-way valve 44, the first low-temperature-side pump 421*a*, and the second low-temperature-side pump 421*b*. The controller 60 controls operations of the five-way valve 422 to connect the outlet side of the cooling water channel 51*a* of the battery 51 with the inlet side of the heating medium bypass channel 424. At the same time, the controller 60 activates the circuit that connects the outlet side of the cooling water channels 52*a* through 54*a* of the high-voltage instrument 50 with the heating-medium inlet side of the low-temperature-side radiator 423.

Figure 10:
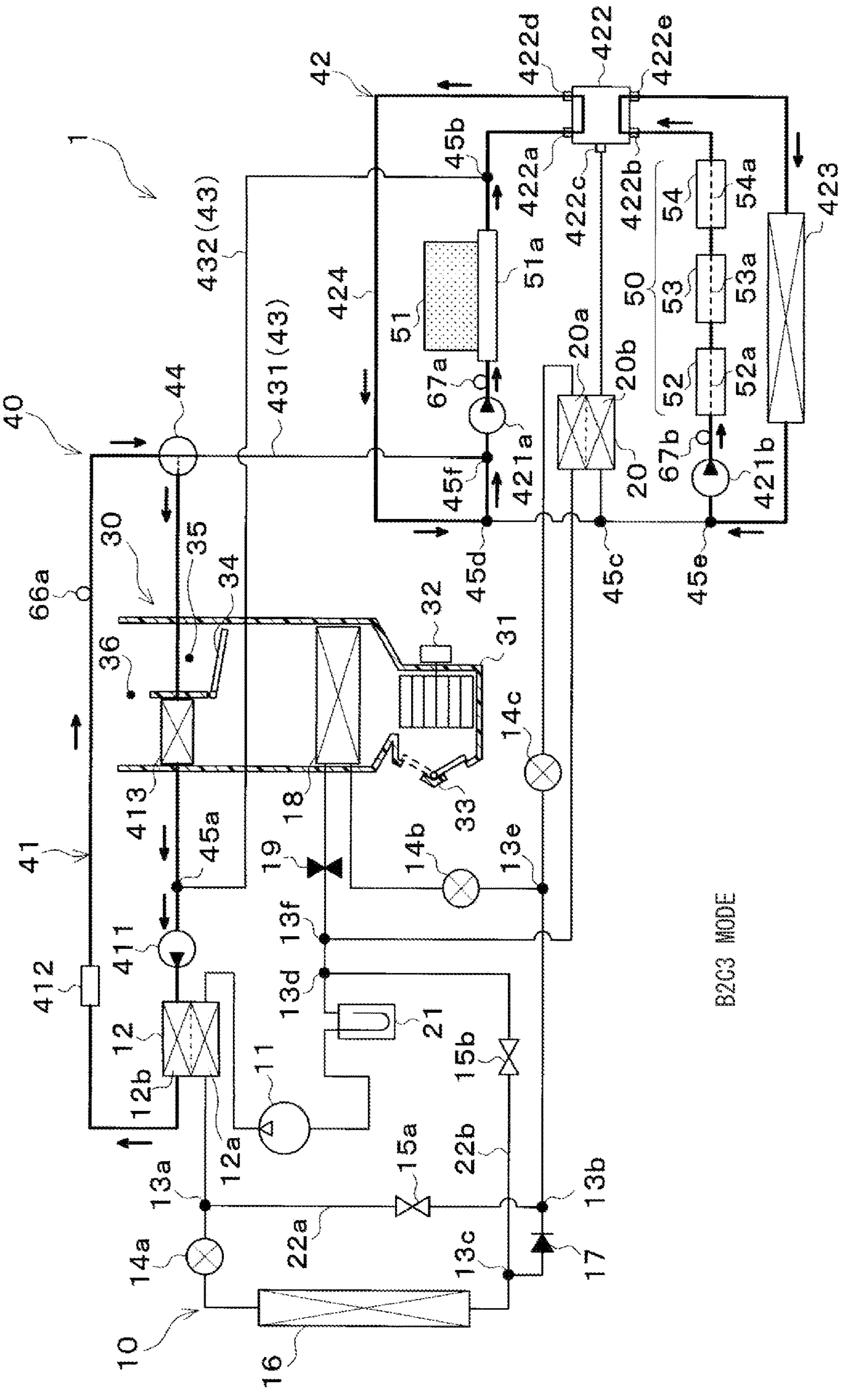
FIG. 10 is an overall schematic configuration diagram illustrating the flow of a heating medium in B2C3 mode according to the first embodiment.

The heating medium circuit 40 in the B2C3 mode allows the heating medium to flow as indicated by the arrows in FIG. 10. Specifically, the high-temperature-side circuit 41 in the B2C3 mode circulates the heating medium pumped from the high-temperature-side pump 411 similarly to the B2C1 mode. The connection channel 43 in the B2C3 mode does not flow the heating medium same as the B2C1 mode.

The low-temperature-side circuit 42 in the B2C3 mode circulates the heating medium pumped from the first low-temperature-side pump 421*a* through the cooling water channel 51*a* of the battery 51, the five-way valve 422, the heating medium bypass channel 424, and the suction port of the first low-temperature-side pump 421*a* in order. The heating medium pumped from the second low-temperature-side pump 421*b* circulates through the cooling water channels 52*a* through 54*a* of the high-voltage instrument 50, the five-way valve 422, the low-temperature-side radiator 423, and the suction port of the second low-temperature-side pump 421*b* in order.

Similar to the B2C1 mode, the low-temperature-side circuit 42 in the B2C3 mode averages the temperatures of the battery cells forming the battery 51. The low-temperature-side circuit 42 in the B2C3 mode allows the low-temperature-side radiator 423 to dissipate waste heat from the high-voltage instrument 50 to the outdoor air, thus cooling the high-voltage instrument 50.

Similar to the B2C1 mode, the B2C3 mode may also perform the temperature averaging OFF mode.

(B3C3 Mode During Air Conditioning)

The B3C3 mode is an operation mode that performs the (B3) battery cooling mode and the (C3) high-voltage-instrument cooling mode.

In the B3C3 mode during air conditioning, the controller 60 throttles the cooling expansion valve 14*c* of the refrigeration cycle equipment 10, similar to the B1C2. When the operation mode for air conditioning is set to the (A4) heating mode, the controller 60 opens the on-off dehumidification valve 15*a* and the on-off heating valve 15*b*.

The refrigeration cycle equipment 10 in the B3C3 mode flows the low-pressure refrigerant decompressed by the cooling expansion valve 14*c* into the refrigerant channel 20*a* of the chiller 20. The refrigerant flowing out of the refrigerant channel 20*a* of the chiller 20 flows into the accumulator 21 via the sixth refrigerant joint portion 13*f* and the fourth refrigerant joint portion 13*d*.

When the operation mode for air conditioning is set to the (A4) heating mode, a cycle is configured to parallel connect the outdoor heat exchanger 16 and the chiller 20, referring to the refrigerant flow, similar to the B1C2 mode.

The controller 60 controls operations of the three-way valve 44 to direct the total flow of the heating medium flowing inside to flow toward the heater core 413. The controller 60 operates the first low-temperature-side pump 421*a* and the second low-temperature-side pump 421*b* to provide the predetermined pumping capability.

The controller 60 controls operations of the five-way valve 422 to connect the outlet side of the cooling water channel 51*a* of the battery 51 and the inlet side of the heating medium channel 20*b* of the chiller 20. At the same time, the controller 60 activates the circuit that connects the outlet side of the cooling water channels 52*a* through 54*a* of the high-voltage instrument 50 with the heating-medium inlet side of the low-temperature-side radiator 423.

Figure 11:
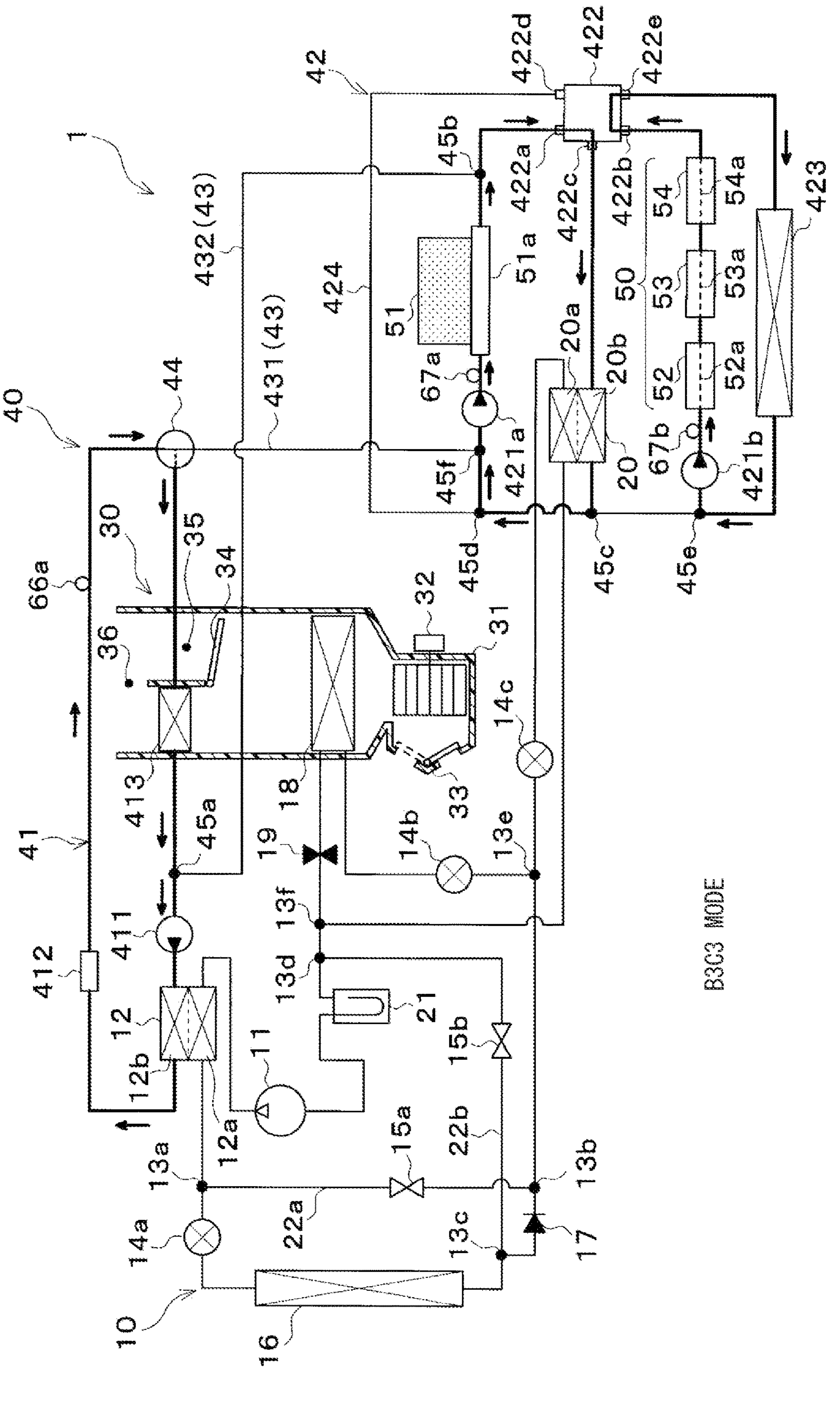
FIG. 11 is an overall schematic configuration diagram illustrating the flow of a heating medium in B3C3 mode according to the first embodiment.

The heating medium circuit 40 in the B3C3 mode allows the heating medium to flow as indicated by the arrows in FIG. 11. Specifically, the high-temperature-side circuit 41 in the B3C3 mode circulates the heating medium pumped from the high-temperature-side pump 411 similarly to the B2C1 mode. The connection channel 43 in the B3C3 mode does not flow the heating medium same as the B2C1 mode.

The low-temperature-side circuit 42 in the B3C3 mode circulates the heating medium pumped from the first low-temperature-side pump 421*a* through the cooling water channel 51*a* of the battery 51, the five-way valve 422, the heating medium channel 20*b* of the chiller 20, and the suction port of the first low-temperature-side pump 421*a* in order. The heating medium pumped from the second low-temperature-side pump 421*b* circulates through the cooling water channels 52*a* through 54*a* of the high-voltage instrument 50, the five-way valve 422, the low-temperature-side radiator 423, and the suction port of the second low-temperature-side pump 421*b* in order.

In addition, the controller 60 accordingly controls the operations of other control-target instruments. For example, the controller 60 controls the throttle opening of the cooling expansion valve 14*c* so that the first cold side heating medium temperature TWL1 approximates the targeted warming temperature TWLO1 for the battery. In other words, the controller 60 controls the throttle opening of the cooling expansion valve 14*c* so that the temperature of the heating medium flowing into the cooling water channel 51*a* of the battery 51 approximates the targeted warming temperature TWLO1 for the battery. The targeted warming temperature TWLO1 for the battery is configured so that the battery 51 can operate appropriately.

The low-temperature-side circuit 42 in the B3C3 mode flows the heating medium pumped from the first low-temperature-side pump 421*a* into the cooling water channel 51*a* of the battery 51. The heating medium flowing through the cooling water channel 51*a* of the battery 51 absorbs the waste heat of the battery 51. The battery 51 is thereby cooled.

The heating medium flowing out of the cooling water channel 51*a* of the battery 51 flows into the heating medium channel 20*b* of the chiller 20 via the five-way valve 422. The heating medium flowing into the chiller 20 is cooled by performing heat exchange with the low-pressure refrigerant decompressed by the cooling expansion valve 14*c*. Consequently, the temperature of the heating medium flowing into the cooling water channel 51*a* of the battery 51 approximates the targeted warming temperature TWLO1 for the battery.

The heating medium flowing out of the heating medium channel 20*b* of the chiller 20 is drawn into the first low-temperature-side pump 421*a* via the third heating medium joint portion 45*c* and the fourth heating medium joint portion 45*d*.

The low-pressure refrigerant flowing into the chiller 20 absorbs the heat of the heating medium and evaporates. In other words, the low-pressure refrigerant flowing into the chiller 20 recovers the waste heat of the battery 51.

The B3C3 mode during air conditioning operates the compressor 11 of the refrigeration cycle equipment 10. When the refrigeration cycle equipment 10 operates in the B3C3 mode during air conditioning, the compressor 11 compresses the refrigerant, recovering the waste heat of the battery 51 in the chiller 20, and discharges the refrigerant toward the refrigerant channel 12*a* of the water-refrigerant heat exchanger 12.

The water-refrigerant heat exchanger 12 radiates at least part of the waste heat of the battery 51, recovered by the chiller 20 in the low-pressure refrigerant, to the heating medium flowing through the high-temperature-side circuit 41. Thereby, the heating medium flowing through the high-temperature-side circuit 41 is heated. Moreover, the heated heating medium is used as a heat source to heat the supplied air.

The low-temperature-side circuit 42 in the B3C3 mode allows the low-temperature-side radiator 423 to dissipate waste heat from the high-voltage instrument 50 to the outdoor air, thus cooling the high-voltage instrument 50.

The description below explains operation modes for temperature adjustment during no air-conditioning, such as a case where the vehicle compartment is not air-conditioned while the battery 51 is being charged.

When the vehicle compartment is not air-conditioned, it is possible to stop the compressor 11 of the refrigeration cycle equipment 10, the interior blower 32 of the interior air-conditioning unit 30, and the high-temperature-side pump 411 of the high-temperature-side circuit 41 of the heating medium circuit 40, for example. The operation mode for temperature adjustment during no air-conditioning operates, for example, the compressor 11 of the refrigeration cycle equipment 10 as necessary to suppress unnecessary energy consumption.

(B1C1 Mode During No Air-Conditioning)

The B1C1 mode needs to heat the heating medium flowing through the high-temperature-side circuit 41 to warm up the battery 51.

In the B1C1 mode during no air-conditioning, the controller 60 throttles the heating expansion valve 14*a* and fully closes the cooling expansion valve 14*b* and the cooling expansion valve 14*c* of the refrigeration cycle equipment 10. The controller 60 closes the on-off dehumidification valve 15*a* and opens the on-off heating valve 15*b*.

The refrigeration cycle equipment 10 in the B1C1 mode during no air-conditioning configures a vapor-compression refrigeration cycle that circulates the refrigerant in the same order as in the (A4) heating mode.

In addition, the controller 60 accordingly controls the operations of other control-target instruments. For example, the controller 60 controls the rotation speed of the compressor 11 to provide a predetermined discharge capability. The controller 60 controls the high-temperature-side pump 411 to provide a predetermined pumping capability. Other operations are the same as those in the B1C1 mode during air conditioning.

Similar to the (A4) heating mode, the refrigeration cycle equipment 10 in the B1C1 mode during no air-conditioning can allow the water-refrigerant heat exchanger 12 to heat the heating medium flowing through the high-temperature-side circuit 41 by using a heat source such as heat absorbed from the outdoor air in the outdoor heat exchanger 16.

The interior air-conditioning unit 30 in the B1C1 mode during no air-conditioning stops the interior blower 32. Therefore, the heater core 413 does not perform heat exchange between the heating medium and the supplied air. No heated supplied air is blown into the vehicle compartment.

The heating medium circuit 40 in the B1C1 mode allows the heating medium to flow as indicated by the arrows in FIG. 7. Similar to the B1C1 mode during air conditioning, the B1C1 mode during no air-conditioning warms up the battery 51 and the high-voltage instrument 50, and heats the heating medium.

(B1C2 Mode During No Air-Conditioning)

The B1C2 mode needs to heat the heating medium flowing through the high-temperature-side circuit 41 to warm up the battery 51. In the B1C2 mode, the chiller 20 needs to absorb the waste heat of the high-voltage instrument 50 into the low-pressure refrigerant. Similar to air conditioning in process, there may be no need to recover waste heat from the high-voltage instrument 50 for warming up the battery 51. In this case, operations similar to those in the B1C1 mode may be performed.

In the B1C2 mode during no air-conditioning, the controller 60 throttles the heating expansion valve 14*a*, fully closes the cooling expansion valve 14*b*, and throttles the cooling expansion valve 14*c* of the refrigeration cycle equipment 10. The controller 60 opens the on-off dehumidification valve 15*a* and the on-off heating valve 15*b*.

The refrigeration cycle equipment 10 in B1C2 mode during no air-conditioning configures a cycle to parallel connect the outdoor heat exchanger 16 and the chiller 20, referring to the refrigerant flow, similar to the B1C2 mode during air conditioning when the operation mode for air conditioning is set to the (A4) heating mode.

In addition, the controller 60 accordingly controls the operations of other control-target instruments. For example, the controller 60 controls the rotation speed of the compressor 11 to provide a predetermined discharge capability. The controller 60 controls the high-temperature-side pump 411 to provide a predetermined pumping capability. Other operations are the same as those in the B1C2 mode during air conditioning.

Therefore, the refrigeration cycle equipment 10 in the B1C2 mode during no air-conditioning configures a vapor-compression refrigeration cycle where the water-refrigerant heat exchanger 12 functions as a condenser and the outdoor heat exchanger 16 and the chiller 20 function as an evaporator. The water-refrigerant heat exchanger 12 can heat the heating medium circulating through the high-temperature-side circuit 41 by using a heat source, that is, waste heat from the high-voltage instrument 50 recovered by the low-pressure refrigerant in the chiller 20 and heat absorbed from outdoor air by the refrigerant in the outdoor heat exchanger 16.

The interior air-conditioning unit 30 in the B1C1 mode during no air-conditioning stops the interior blower 32. Therefore, the heater core 413 does not perform heat exchange between the heating medium and the supplied air. No heated supplied air is blown into the vehicle compartment.

The heating medium circuit 40 in the B1C2 mode allows the heating medium to flow as indicated by the arrows in FIG. 7. Similar to the B1C2 mode during air conditioning, the heating medium circuit 40 during no air-conditioning warms up the battery 51 and recovers the waste heat of the high-voltage instrument 50.

The refrigeration cycle equipment in the B1C2 mode for no air-conditioning 10 can heat the heating medium circulating through the high-temperature-side circuit 41 by using a heat source, that is, waste heat from the high-voltage instrument 50 recovered by the low-pressure refrigerant in the chiller 20 and heat absorbed from outdoor air by the refrigerant in the outdoor heat exchanger 16. There may be a case where the battery 51 can be sufficiently warmed up by using only the waste heat of the high-voltage instrument 50 as a heat source. In such a case, the heating expansion valve 14*a* may be fully closed.

(B1C3 Mode During No Air-Conditioning)

The B1C3 mode needs to heat the heating medium flowing through the high-temperature-side circuit 41 to warm up the battery 51.

In the B1C3 mode during no air-conditioning, similar to the B1C1 mode during no air-conditioning, the controller 60 throttles the heating expansion valve 14*a* and fully closes the cooling expansion valve 14*b* and the cooling expansion valve 14*c* of the refrigeration cycle equipment 10. The controller 60 closes the on-off dehumidification valve 15*a* and opens the on-off heating valve 15*b*.

The refrigeration cycle equipment 10 in the B1C3 mode during no air-conditioning configures a vapor-compression refrigeration cycle that circulates the refrigerant in the same order as in the (A4) heating mode.

In addition, the controller 60 accordingly controls the operations of other control-target instruments. For example, the controller 60 controls the rotation speed of the compressor 11 to provide a predetermined discharge capability. The controller 60 controls the high-temperature-side pump 411 to provide a predetermined pumping capability. Other operations are the same as those in the B1C3 mode during air conditioning.

Similar to the (A4) heating mode, the refrigeration cycle equipment 10 in the B1C3 mode during no air-conditioning can allow the water-refrigerant heat exchanger 12 to heat the heating medium flowing through the high-temperature-side circuit 41 by using a heat source such as heat absorbed from the outdoor air in the outdoor heat exchanger 16.

The interior air-conditioning unit 30 in the B1C3 mode during no air-conditioning stops the interior blower 32. Therefore, the heater core 413 does not perform heat exchange between the heating medium and the supplied air. No heated supplied air is blown into the vehicle compartment.

The heating medium circuit 40 in the B1C3 mode allows the heating medium to flow as indicated by the arrows in FIG. 8. Similar to the B1C3 mode during air conditioning, the B1C3 mode during no air-conditioning warms up the battery 51 and cools down the high-voltage instrument 50.

(B2C1 Mode During No Air-Conditioning)

The B2C1 mode during no air-conditioning need not heat the heating medium flowing through the high-temperature-side circuit 41 or absorb the waste heat of the high-voltage instrument 50 into the low-pressure refrigerant in the chiller 20. In the B2C1 mode during no air-conditioning, the controller 60 stops the compressor 11 of the refrigeration cycle equipment 10 and the interior blower 32 of the interior air-conditioning unit 30, for example. Other operations are the same as those in the B2C1 mode during air conditioning.

The heating medium circuit 40 in the B2C1 mode allows the heating medium to flow as indicated by the arrows in FIG. 9. Similar to the B2C1 mode during air conditioning, the B2C1 mode during no air-conditioning averages the temperatures of the battery cells forming the battery 51, warms up the high-voltage instrument 50, and heats the heating medium.

FIG. 9 illustrates an example where the heating medium pumped from the high-temperature-side pump 411 circulates through the high-temperature-side circuit 41. However, the high-temperature-side pump 411 may be stopped in the B2C1 mode during no air-conditioning. The temperature averaging OFF mode may be performed also in the B2C1 mode during no air-conditioning.

(B2C2 Mode During No Air-Conditioning)

In the B2C2 mode, the chiller 20 needs to absorb the waste heat of the high-voltage instrument 50 into the low-pressure refrigerant. Similar to air conditioning in process, there may be no need to recover waste heat from the high-voltage instrument 50 for warming up the battery 51. In this case, operations similar to those in the B2C1 mode may be performed.

In the B2C2 mode during no air-conditioning, the controller 60 fully opens the heating expansion valve 14*a*, fully closes the cooling expansion valve 14*b*, and throttles the cooling expansion valve 14*c* of the refrigeration cycle equipment 10. The controller 60 closes the on-off dehumidification valve 15*a* and the on-off heating valve 15*b*.

Consequently, the refrigeration cycle equipment 10 in the B2C2 mode during no air-conditioning configures a vapor-compression refrigeration cycle where the refrigerant discharged from the compressor 11 circulates through the water-refrigerant heat exchanger 12, the fully opened heating expansion valve 14*a*, the outdoor heat exchanger 16, the check valve 17, the cooling expansion valve 14*c*, the chiller 20, the accumulator 21, and the suction port of the compressor 11 in order.

In addition, the controller 60 accordingly controls the operations of other control-target instruments. For example, the controller 60 controls the rotation speed of the compressor 11 to provide a predetermined discharge capability. The controller 60 controls the high-temperature-side pump 411 similarly to the B1C1 mode during no air-conditioning. Other operations are the same as those in the B2C2 mode during air conditioning.

Therefore, the refrigeration cycle equipment 10 in the B2C2 mode during no air-conditioning configures a vapor-compression refrigeration cycle where the outdoor heat exchanger 16 functions as a condenser and the chiller 20 function as an evaporator. As a result, it is possible to radiate the waste heat of the high-voltage instrument 50, recovered by the low-pressure refrigerant in the chiller 20, to the outdoor air.

The temperature of the heating medium flowing through the high-temperature-side circuit 41 may be lower than the high-pressure refrigerant. Then, the water-refrigerant heat exchanger 12 can function as a condenser. In this case, the water-refrigerant heat exchanger 12 can dissipate waste heat from the high-voltage instrument 50 to the heating medium.

The interior air-conditioning unit 30 in the B2C2 mode during no air-conditioning stops the interior blower 32. The heater core 413 does not perform heat exchange between the heating medium and the supplied air. No heated supplied air is blown into the vehicle compartment.

The heating medium circuit 40 in the B2C2 mode allows the heating medium to flow as indicated by the arrows in FIG. 9. Similar to the B2C2 mode during air conditioning, the B2C2 mode during no air-conditioning averages the temperatures of the battery cells forming the battery 51 and recovers the waste heat of the high-voltage instrument 50.

FIG. 9 illustrates an example where the heating medium pumped from the high-temperature-side pump 411 circulates through the high-temperature-side circuit 41. However, the high-temperature-side pump 411 may be stopped in the B2C2 mode for no air-conditioning. The temperature averaging OFF mode may be performed also in the B2C2 mode during no air-conditioning.

(B2C3 Mode During No Air-Conditioning)

The B2C3 mode during no air-conditioning need not heat the heating medium flowing through the high-temperature-side circuit 41 or absorb the waste heat of the high-voltage instrument 50 into the low-pressure refrigerant in the chiller 20. In the B2C3 mode during no air-conditioning, the controller 60 stops the compressor 11 of the refrigeration cycle equipment 10 and the interior blower 32 of the interior air-conditioning unit 30, for example. Other operations are the same as those in the B2C3 mode during air conditioning.

The heating medium circuit 40 in the B2C3 mode allows the heating medium to flow as indicated by the arrows in FIG. 10. Similar to the B2C3 mode during air conditioning, the B2C3 mode during no air-conditioning averages the temperatures of the battery cells forming the battery 51 and cools the high-voltage instrument 50.

FIG. 10 illustrates an example where the heating medium pumped from the high-temperature-side pump 411 circulates through the high-temperature-side circuit 41. However, the high-temperature-side pump 411 may be stopped in the B2C3 mode during no air-conditioning. The temperature averaging OFF mode may be performed also in the B2C3 mode during no air-conditioning.

(B3C3 Mode During No Air-Conditioning)

In the B3C3 mode, the chiller 20 needs to absorb the waste heat of the battery 51 into the low-pressure refrigerant.

In the B3C3 mode during no air-conditioning, similar to the B2C2 mode during no air-conditioning, the controller 60 fully opens the heating expansion valve 14*a*, fully closes the cooling expansion valve 14*b*, and throttles the cooling expansion valve 14*c* of the refrigeration cycle equipment 10. The controller 60 closes the on-off dehumidification valve 15*a* and the on-off heating valve 15*b*.

The B3C3 mode during no air-conditioning configures a vapor-compression refrigeration cycle that circulates the refrigerant in the same order as in the B2C2 mode during no air-conditioning.

In addition, the controller 60 accordingly controls the operations of other control-target instruments. For example, the controller 60 controls the rotation speed of the compressor 11 to provide a predetermined discharge capability. The controller 60 controls the high-temperature-side pump 411 to provide a predetermined pumping capability. Other operations are the same as those in the B3C3 mode during air conditioning.

Therefore, the refrigeration cycle equipment 10 in the B3C3 mode during no air-conditioning configures a vapor-compression refrigeration cycle where the outdoor heat exchanger 16 functions as a condenser and the chiller 20 function as an evaporator. As a result, it is possible to radiate the waste heat of the battery 51, recovered by the low-pressure refrigerant in the chiller 20, to the outdoor air.

The temperature of the heating medium flowing through the high-temperature-side circuit 41 may be lower than the high-pressure refrigerant. Then, the water-refrigerant heat exchanger 12 can function as a condenser. In this case, the water-refrigerant heat exchanger 12 can dissipate waste heat from the battery 51 to the heating medium.

The interior air-conditioning unit 30 in the B3C3 mode during no air-conditioning stops the interior blower 32. The heater core 413 does not perform heat exchange between the heating medium and the supplied air. No heated supplied air is blown into the vehicle compartment.

The heating medium circuit 40 in the B3C3 mode allows the heating medium to flow as indicated by the arrows in FIG. 11. Similar to the B3C3 mode during air conditioning, the B3C3 mode during no air-conditioning cools the battery 51 and the high-voltage instrument 50.

FIG. 11 illustrates an example where the heating medium pumped from the high-temperature-side pump 411 circulates through the high-temperature-side circuit 41. However, the high-temperature-side pump 411 may be stopped in the B3C3 mode during no air-conditioning.

The B3C3 mode during no air-conditioning described above is an operation mode that cools the battery 51 when the battery temperature TB reaches a relatively high temperature higher than or equal to the fourth reference battery temperature KTB4. Therefore, the B3C3 mode during no air-conditioning may be performed when the battery 51 generates an increased amount of heat during charging.

The battery 51 generates more heat during quick charging than during normal charging while quick charging charges the battery 51 in a shorter time than normal charging. During quick charging, the battery 51 may be insufficiently cooled even if the thermal management system 1 activates the B3B3 mode.

According to the present embodiment, the thermal management system 1 can perform the (D) quick charging and cooling mode that cools the battery 51 based on a cooling capability higher than that of the B3B3 mode. The (D) quick charging and cooling mode is performed when the quick charging of the battery 51 starts. The description below explains in detail the operations of the (D) quick charging and cooling mode.

(D) Quick Charging and Cooling Mode

In the quick charging and cooling mode, similar to the B3C3 mode during no air-conditioning, the controller 60 fully opens the heating expansion valve 14*a*, fully closes the cooling expansion valve 14*b*, and throttles the cooling expansion valve 14*c* of the refrigeration cycle equipment 10. The controller 60 closes the on-off dehumidification valve 15*a* and the on-off heating valve 15*b*.

The quick charging and cooling mode configures a vapor-compression refrigeration cycle that circulates the refrigerant in the same order as in the B3C3 mode during no air-conditioning.

In addition, the controller 60 accordingly controls the operations of other control-target instruments. For example, the controller 60 controls the rotation speed of the compressor 11 to provide a predetermined discharge capability.

The controller 60 controls operations of the five-way valve 422 to connect the outlet side of the cooling water channel 51*a* of the battery 51 with the inlet side of the heating medium channel 20*b* of the chiller 20. At the same time, the controller 60 activates the circuit that connects the outlet side of the cooling water channel 51*a* of the battery 51 with the heating medium inlet side of the low-temperature-side radiator 423.

Figure 12:
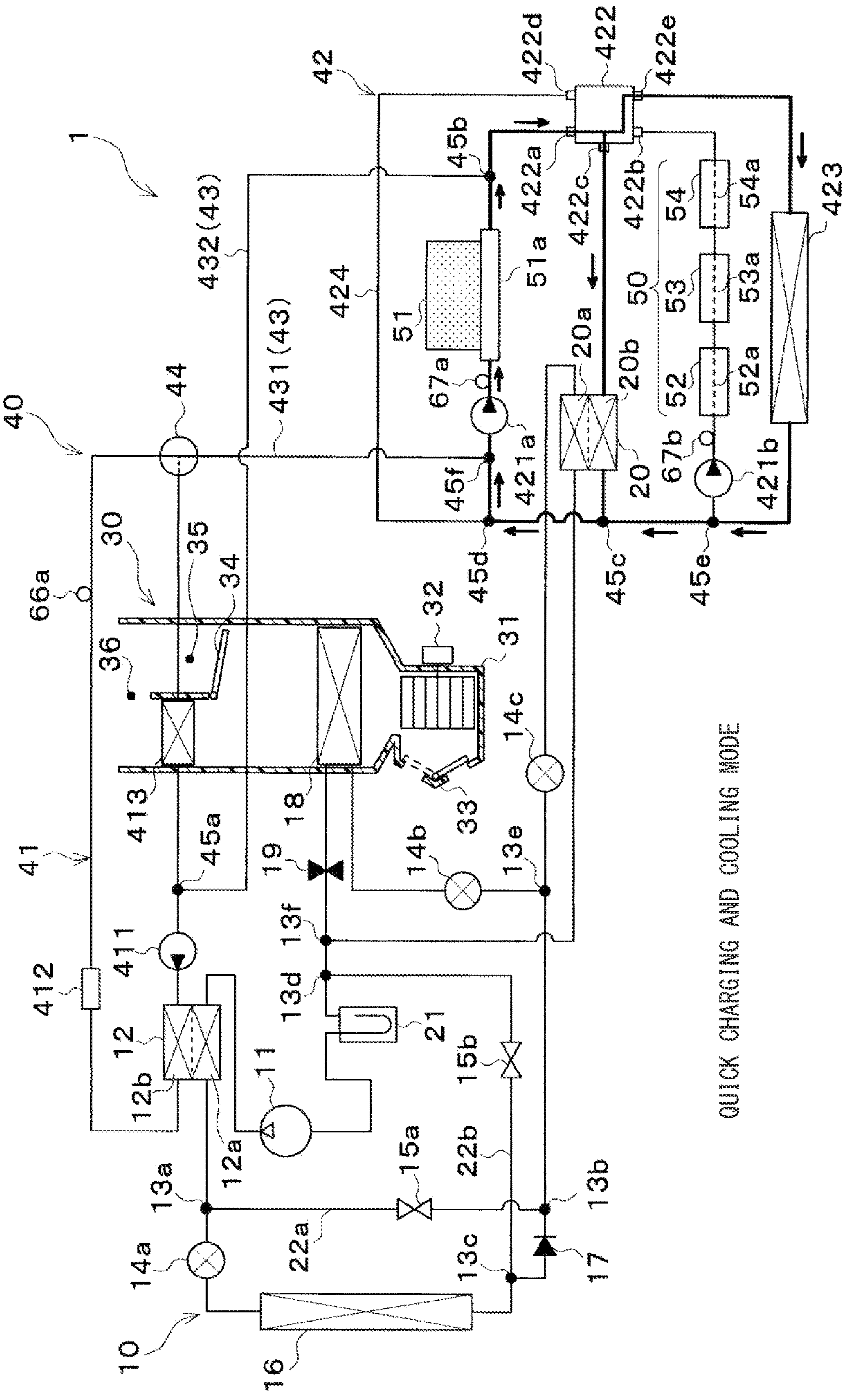
FIG. 12 is an overall schematic configuration diagram illustrating the flow of a heating medium in quick charging and cooling mode according to the first embodiment.

In the quick charging and cooling mode, the low-temperature-side circuit 42 of the heating medium circuit 40 flows the heating medium as indicated by the arrows in FIG. 12.

Specifically, the low-temperature-side circuit 42 in the quick charging and cooling mode circulates the heating medium, pumped from the first low-temperature-side pump 421*a*, through the cooling water channel 51*a* of the battery 51, the five-way valve 422, the heating medium channel 20*b* of the chiller 20, and the suction port of the first low-temperature-side pump 421*a* in order. At the same time, the heating medium pumped from the first low-temperature-side pump 421*a* circulates through the cooling water channel 51*a* of the battery 51, the five-way valve 422, the low-temperature-side radiator 423, and the suction port of the first low-temperature-side pump 421*a* in order. Other operations are the same as those in the B3C3 mode during air conditioning.

Therefore, the refrigeration cycle equipment 10 in the quick charging and cooling mode configures a vapor-compression refrigeration cycle where the outdoor heat exchanger 16 functions as a condenser and the chiller 20 function as an evaporator. It is possible to radiate the waste heat of the battery 51 recovered by the low-pressure refrigerant in the chiller 20 to the outdoor air.

The interior air-conditioning unit 30 in the quick charging and cooling mode stops the interior blower 32. The heater core 413 does not perform heat exchange between the heating medium and the supplied air. No heated supplied air is blown into the vehicle compartment.

The low-temperature-side circuit 42 in the quick charging and cooling mode flows the heating medium pumped from the first low-temperature-side pump 421*a* into the cooling water channel 51*a* of the battery 51. The heating medium flowing through the cooling water channel 51*a* of the battery 51 absorbs the waste heat of the battery 51. The battery 51 is thereby cooled.

The five-way valve 422 branches the flow of the heating medium flowing out of the cooling water channels 52*a* through 54*a* of the high-voltage instrument 50. One heating medium branched at the five-way valve 422 flows into the heating medium channel 20*b* of the chiller 20. The heating medium flowing into the heating medium channel 20*b* of the chiller 20 is cooled by the heat exchange with the low-pressure refrigerant. The heating medium flowing out of the heating medium channel 20*b* of the chiller 20 flows into one inlet/outlet of the third heating medium joint portion 45*c*.

The low-pressure refrigerant flowing into the chiller 20 absorbs the heat of the heating medium and evaporates. In other words, the low-pressure refrigerant absorbs the heat of the heating medium and evaporates.

The other heating medium branched at the five-way valve 422 flows into the low-temperature-side radiator 423. The heating medium flowing into the low-temperature-side radiator 423 dissipates heat to the outdoor air and is cooled. The heating medium flowing out of the low-temperature-side radiator 423 flows into another inlet/outlet of the third heating medium joint portion 45*c*.

The third heating medium joint portion 45*c* allows the flow of the heating medium flowing out of the heating medium channel 20*b* of the chiller 20 to join the flow of the heating medium flowing out of low-temperature-side radiator 423. The heating medium joined at the third heating medium joint portion 45*c* is drawn into the first low-temperature-side pump 421*a* via the fourth heating medium joint portion 45*d* and the sixth heating medium joint portion 45*f*.

The quick charging and cooling mode can not only allow the chiller 20 to absorb the waste heat of the battery 51 into the low-pressure refrigerant but also allow the low-temperature-side radiator 423 to dissipate heat to the outdoor air. The quick charging and cooling mode can improve the ability to cool the battery 51 more efficiently than the B3C3 mode.

As a result, the quick charging and cooling mode can cool the temperature of the battery 51 to an appropriate temperature zone even during quick charging which increases the amount of heat generated by the battery 51 compared to normal charging.

As above, the thermal management system 1 according to the present embodiment can provide comfortable air conditioning in the vehicle compartment and appropriate temperature adjustment of multiple in-vehicle units.

The thermal management system 1 according to the present embodiment makes a difference between an appropriate temperature zone for the battery 51 as the first temperature adjustment target and an appropriate temperature zone for the high-voltage instrument 50 as the second temperature adjustment target. Therefore, the thermal management system 1 according to the present embodiment involves an operating condition that requires warming up the battery 51 and concurrently cooling the high-voltage instrument 50.

The thermal management system 1 according to the present embodiment includes the connection channel 43 as a heat transfer portion. As described in the B1C2 mode, for example, the heat of the heating medium heated by the water-refrigerant heat exchanger 12 can be transferred to the heating medium flowing into the cooling water channel 51*a* of the battery 51. It is possible to heat and warm up the battery 51.

While the heating medium flows to the connection channel 43 to transfer heat, the five-way valve 422 activates the circuit configuration in which the heating medium circulates between the cooling water channel 51*a* of the battery 51 and the heating medium bypass channel 424 and concurrently circulates between the cooling water channel 50*a* of the high-voltage instrument 50 and the heating medium channel 20*b* of the chiller 20.

The heating medium can circulate between the cooling water channel 50*a* of the high-voltage instrument 50 and the heating medium channel 20*b* of the chiller 20, being unaffected by the temperature of the heating medium circulating between the cooling water channel 51*a* of the battery 51 and the heating medium bypass channel 424.

The chiller 20 performs heat exchange between the heating medium flowing out of the cooling water channel 50*a* of the high-voltage instrument 50 and the low-pressure refrigerant decompressed by the cooling expansion valve 14*c*. The low-pressure refrigerant can thereby absorb the waste heat of the high-voltage instrument 50. It is possible to cool the heating medium flowing into the cooling water channel 50*a* of the high-voltage instrument 50.

The refrigeration cycle equipment 10 can allow the water-refrigerant heat exchanger 12 to heat A heating medium flowing through the high-temperature-side circuit 41 by using the heat source of waste heat recovered by the low-pressure refrigerant in the chiller 20. As described in the B1C2 mode, the battery 51 can be warmed up by using, as a heat source, the heating medium flowing through the high-temperature-side circuit 41.

The thermal management system 1 according to the present embodiment can warm up the battery 51, meanwhile, recover the waste heat of the high-voltage instrument 50, and use the waste heat, as a heat source, to heat the heating medium flowing through the high-temperature-side circuit 41. The thermal management system 1 according to the present embodiment can fully effectively use the heat generated from the temperature adjustment target, despite the difference between the proper temperature zone of the first temperature adjustment target and the proper temperature zone of the second temperature adjustment target.

The high-temperature-side circuit 41 of the thermal management system 1 of the present embodiment includes the heater core 413. The heater core 413 is a heating heat exchange portion that performs heat exchange between the heating medium flowing through the high-temperature-side circuit 41 and the supplied air as a fluid to be heated. As explained in the B1C2 mode during air conditioning, for example, the waste heat of the high-voltage instrument 50 can be recovered and fully effectively used as a heat source for the supplied air.

The thermal management system 1 according to the present embodiment uses the connection channel 43 as a heat transfer portion. The inlet-side connection channel 431 of connection channel 43 is connected to guide the heating medium flowing out of water-refrigerant heat exchanger 12 to the inlet side of cooling water channel 51*a* of battery 51. The heat of the heating medium circulating through the high-temperature-side circuit 41 can be used to warm up the battery 51.

The inlet-side connection channel 431 guides the heating medium flowing out of the water-refrigerant heat exchanger 12 to the suction port side of the first low-temperature-side pump 421*a* that pumps the heating medium to the cooling water channel 51*a* of the battery 51. The heating medium flowing out of the water-refrigerant heat exchanger 12 can be reliably supplied to the cooling water channel 51*a* of the battery 51. The heat in the heating medium flowing through the high-temperature-side circuit 41 can be reliably used to warm up the battery 51.

The outlet-side connection channel 432 of the connection channel 43 is connected to guide the heating medium flowing out of the cooling water channel 51*a* of the battery 51 to the suction port side of the high-temperature-side pump 411. The heater core 413 is placed between the three-way valve 44 and the first heating medium joint portion 45*a*. The heater core 413 is placed between the three-way valve 44 and the first heating medium joint portion 45*a*.

The heating medium flowing through the connection channel 43 hardly affects the temperature of the heating medium flowing into the heater core 413. Warming up the battery 51 hardly affects the air conditioning in the vehicle compartment.

In the thermal management system 1 according to the present embodiment, the five-way valve 422 activates the circuit configuration to circulate the heating medium between the cooling water channel 51*a* of the battery 51 and the heating medium bypass channel 424. Meanwhile, the heat transfer amount controller 60*c* controls operations of the three-way valve 44 so that the first low-temperature side heating medium temperature TWL1 approximates the targeted warming temperature TWLW1 for warm-up.

It is possible to mix the heating medium circulating through the inlet-side connection channel 431 with the heating medium circulating through the heating medium bypass channel 424 and flow the heating medium into the cooling water channel 51*a* of the battery 51. Therefore, it is possible to inhibit a sudden change in the temperature of the heating medium flowing into the cooling water channel 51*a* of the battery 51 and more effectively inhibit the battery 51 from being degraded.

The high-temperature-side circuit 41 of the thermal management system 1 according to the present embodiment includes the electric heater 412 as a heating portion. It is possible to increase the temperature of the heating medium flowing through the high-temperature-side circuit 41 and warm up the battery 51 and heat the supplied air even if the refrigeration cycle equipment 10 results in a shortage in the capability of heating the heating medium.

The five-way valve 422 according to the thermal management system 1 of the present embodiment can allow the heating medium flowing out of the cooling water channel 51*a* of the battery 51 to flow into at least the heating medium bypass channel 424 or the heating medium channel 20*b* of the chiller 20. It is possible to switch between the circuit configurations that differ in cooling or not cooling the heating medium flowing out of the cooling water channel 51*a* of the battery 51.

The five-way valve 422 of the thermal management system 1 according to the present embodiment can allow the heating medium flowing out of cooling water channel 50*a* of high-voltage instrument 50 to flow into at least the low-temperature-side radiator 423 or the heating medium channel 20*b* in the chiller 20. It is possible to switch between the circuit configurations that differ in performing heat exchange with the low-pressure refrigerant or the outdoor air to cool the heating medium flowing out of the cooling water channel 50*a* of the high-voltage instrument 50.

The waste heat from the high-voltage instrument 50 may not be needed to heat the heating medium flowing through the high-temperature-side circuit 41. In such a case, the waste heat from the high-voltage instrument 50 can be dissipated into the outdoor air. The thermal management system 1 according to the present embodiment can effectively use the heat generated from the temperature adjustment target as needed.

The five-way valve 422 of the thermal management system 1 according to the present embodiment can allow the heating medium flowing out of the cooling water channel 51*a* of the battery 51 or the heating medium flowing out of the cooling water channel 50*a* of the high-voltage instrument 50 to flow into the heating medium channel 20*b* of the chiller 20.

The common chiller 20 in common can cool the heating medium flowing out of the cooling water channel 51*a* of the battery 51 and the heating medium flowing out of the cooling water channel 50*a* of the high-voltage instrument 50.

The five-way valve 422 of the thermal management system 1 according to the present embodiment can allow the heating medium flowing out of the cooling water channel 51*a* of the battery 51 to flow into both the low-temperature-side radiator 423 and the heating medium channel 20*b* of the chiller 20. Like in the quick charging and cooling mode, it is possible to activate the circuit configuration where the chiller 20 absorbs the waste heat of the battery 51 in the low-pressure refrigerant, and the low-temperature-side radiator 423 dissipates heat to outdoor air. Therefore, the battery 51 can be effectively cooled.

Second Embodiment

Figure 13:
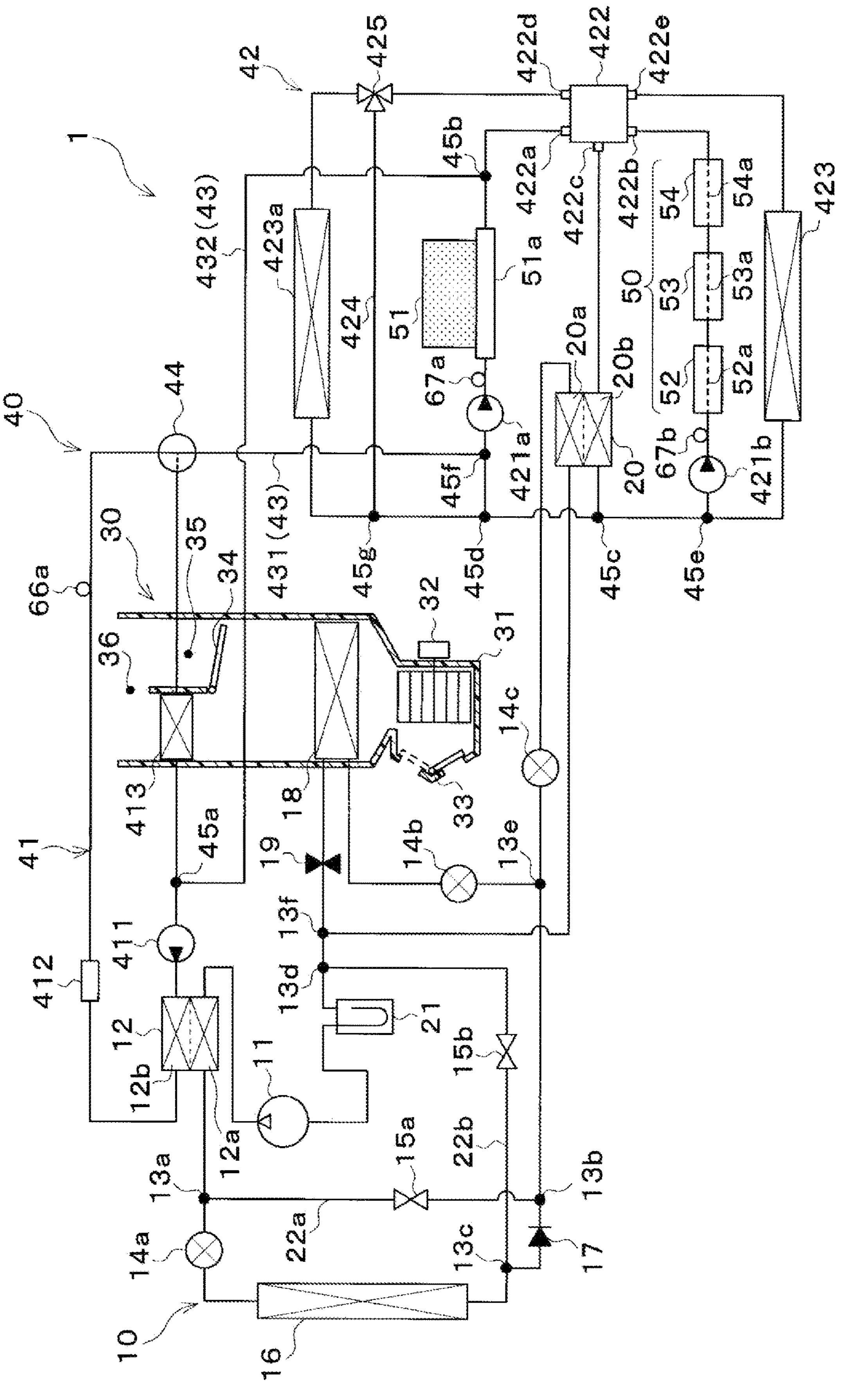
FIG. 13 is an overall schematic configuration diagram illustrating the thermal management system according to a second embodiment.

The present embodiment will describe an example where a battery-side radiator 423*a* and a three-way switching valve 425 are added to the low-temperature-side circuit 42 of the heating medium circuit 40 in the thermal management system 1 described in the first embodiment, by reference to an overall configuration diagram in FIG. 13.

The battery-side radiator 423*a* is a battery-side outdoor air heat-exchange portion that performs heat exchange between the outdoor air and the heating medium flowing out of the bypass-channel-side outlet 422*d* of the five-way valve 422. The basic configuration of the battery-side radiator 423*a* is similar to that of the low-temperature-side radiator 423. The outlet of the battery-side radiator 423*a* is connected to the outlet of the heating medium bypass channel 424 via a seventh heating medium joint portion 45*g*.

The three-way switching valve 425 allows the heating medium flowing out of the bypass-channel-side outlet 422*d* of the five-way valve 422 to flow toward either the heating medium bypass channel 424 or the battery-side radiator 423*a*. The three-way switching valve 425 is a low-temperature-side circuit switching portion that switches circuit configurations of the low-temperature-side circuit 42. Operations of the three-way switching valve 425 are controlled by a control signal output from the controller 60. Other configurations of the thermal management system 1 are similar to those of the first embodiment.

The description below explains the operations of the thermal management system 1 according to the present embodiment based on the above-described configuration. The thermal management system 1 according to the present embodiment can perform operation modes for battery such as (B4) battery outdoor-air cooling mode in addition to the (B1) battery warming mode, the (B2) battery-temperature averaging mode, and the (B3) battery cooling mode.

The (B4) battery outdoor-air cooling mode is an operation mode that cools the battery 51 through the use of the heating medium cooled by the battery-side radiator 423*a*.

Figure 14:
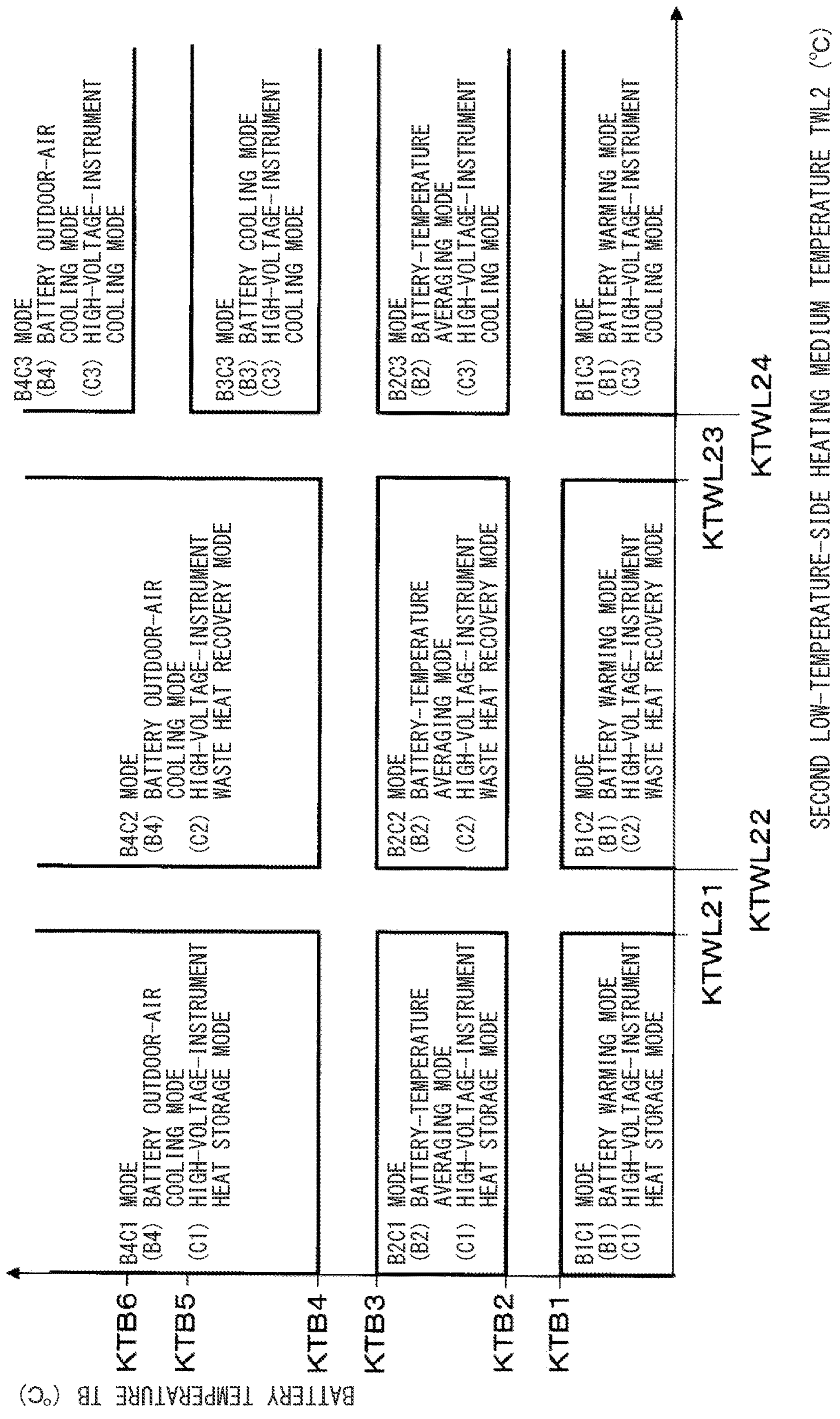
FIG. 14 is a control characteristics diagram illustrating switching among operation modes for temperature adjustment in the thermal management system according to the second embodiment.

The control program for temperature adjustment according to the present embodiment references the control map illustrated in the control characteristics diagram of FIG. 14 and switches the operation modes for temperature adjustment.

Specifically, suppose the operation mode for high-voltage instruments is set to the (C1) high-voltage-instrument heat storage mode or the (C2) high-voltage-instrument waste heat recovery mode. In this case, the battery temperature TB may increase to reach or exceed the fourth reference battery temperature KTB4. Then, the (B2) battery-temperature averaging mode switches to the (B4) battery outdoor-air cooling mode.

Meanwhile, suppose the operation mode for high-voltage instruments is set to the (C1) high-voltage-instrument heat storage mode or the (C2) high-voltage-instrument waste heat recovery mode. In this case, the battery temperature TB may decrease to be lower than or equal to the third reference battery temperature KTB3. Then, the (B4) battery outdoor-air cooling mode switches to the (B2) battery-temperature averaging mode.

Suppose the operation mode for the high-voltage instrument is set to the (C3) high-voltage-instrument cooling mode. In this case, the battery temperature TB may increase to reach or exceed the fourth reference battery temperature KTB4. Then, the (B2) battery-temperature averaging mode switches to the (B3) battery cooling mode. When the battery temperature TB reaches or exceeds the sixth reference battery temperature KTB6, the (B3) battery cooling mode switches to the (B4) battery outdoor-air cooling mode.

Suppose the operation mode for the high-voltage instrument is set to the (C3) high-voltage-instrument cooling mode. In this case, the battery temperature TB may decrease to be lower than or equal to the fifth reference battery temperature KTB5. Then, the (B4) battery outdoor-air cooling mode switches to the (B3) battery cooling mode. When the battery temperature TB decreases to be lower than or equal to the third reference battery temperature KTB3, the (B3) battery cooling mode switches to the (B2) battery-temperature averaging mode.

The thermal management system 1 according to the present embodiment can perform the B4C1 mode, the B4C2 mode, and the B4C3 mode. The description below explains detailed operations of the operation modes for temperature adjustment.

(B4C1 Mode)

The B4C1 mode is an operation mode that performs the (B4) battery outdoor-air cooling mode and the (C1) high-voltage-instrument heat storage mode.

In the B4C1 mode, the controller 60 fully closes the cooling expansion valve 14*c* of the refrigeration cycle equipment 10. Therefore, the refrigeration cycle equipment 10 in the B4C1 mode prevents the refrigerant from flowing into the chiller 20. During no air-conditioning, it may be possible to stop the compressor 11 of the refrigeration cycle equipment 10, the interior blower 32 of the interior air-conditioning unit 30, and the high-temperature-side pump 411 of the high-temperature-side circuit 41, for example.

The controller 60 controls operations of the five-way valve 422 to connect the outlet side of the cooling water channel 51*a* of the battery 51 with the inlet side of the heating medium bypass channel 424. At the same time, the controller 60 activates the circuit that connects the outlet side of the cooling water channels 52*a* through 54*a* of the high-voltage instrument 50 with the inlet side of the heating medium channel 20*b* of the chiller 20.

The controller 60 controls operations of the three-way switching valve 425 to activate the circuit that allows the heating medium flowing out of the bypass-channel-side outlet 422*d* of the five-way valve 422 to flow out toward the battery-side radiator 423*a*.

Figure 15:
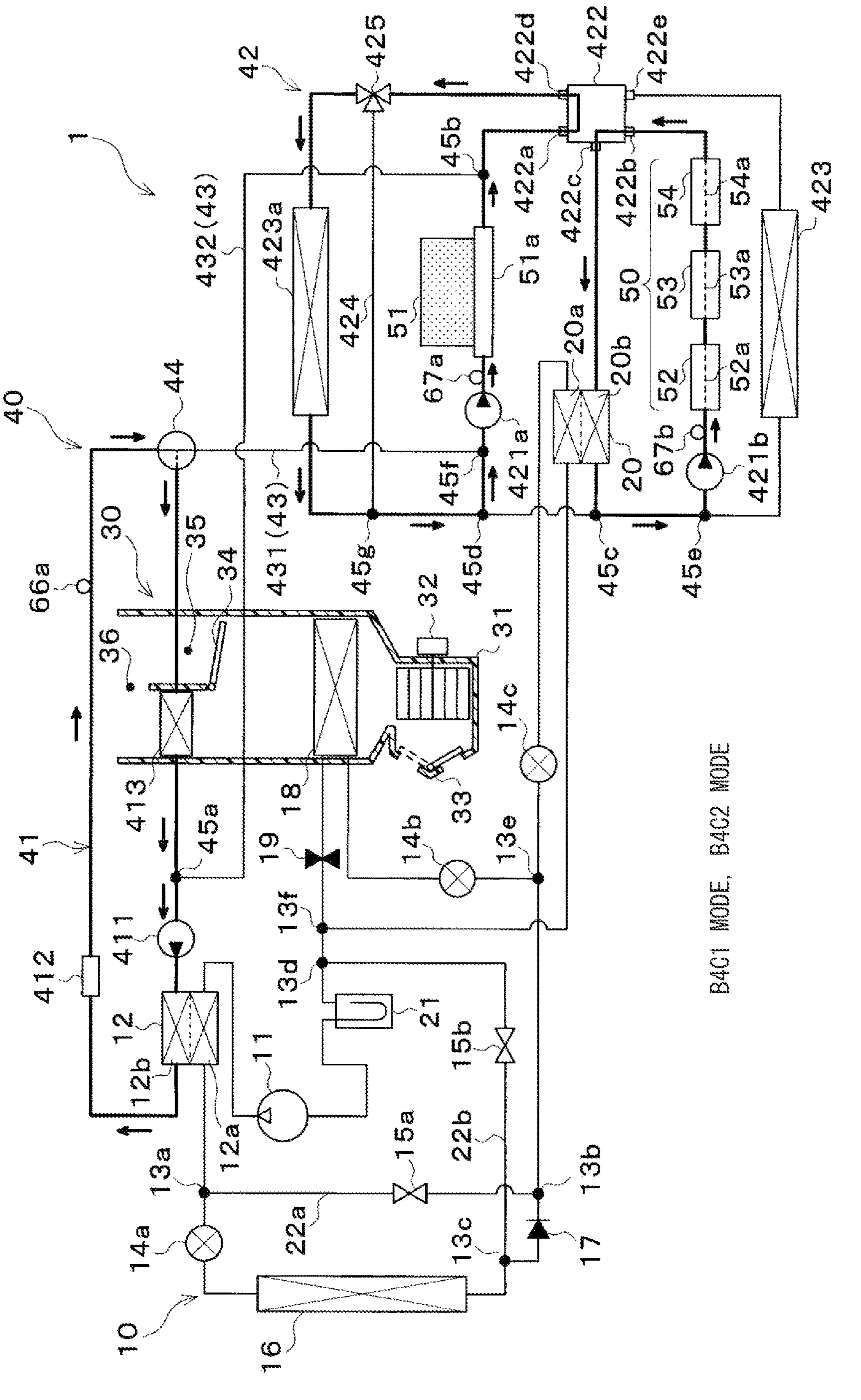
FIG. 15 is an overall schematic configuration diagram illustrating the flow of a heating medium in B4C1 mode, for example, according to the second embodiment.

The heating medium circuit 40 in the B4C1 mode allows the heating medium to flow as indicated by the arrows in FIG. 15.

Specifically, the low-temperature-side circuit 42 in B4C1 mode allows the heating medium pumped from the first low-temperature-side pump 421*a* to circulate through the cooling water channel 51*a* of the battery 51, the five-way valve 422, the battery-side radiator 423*a*, and the suction port of the first low-temperature-side pump 421*a* in order. The heating medium pumped from the second low-temperature-side pump 421*b* circulates through the cooling water channels 52*a* through 54*a* of the high-voltage instrument 50, the five-way valve 422, the heating medium channel 20*b* of the chiller 20, and the suction port of the second low-temperature-side pump 421*b* in order.

In addition, the controller 60 accordingly controls the operations of other control-target instruments. For example, the controller 60 operates the first low-temperature-side pump 421*a* and the second low-temperature-side pump 421*b* to provide a predetermined pumping capability.

The B4C1 mode heating medium circuit 40 absorbs waste heat from the battery 51 when the heating medium pumped from the first low-temperature-side pump 421*a* flows through the cooling water channel 51*a* of the battery 51. The battery 51 is thereby cooled. The heating medium flowing out of the cooling water channel 51*a* of the battery 51 flows through the battery-side radiator 423*a* and is cooled by dissipating heat to the outdoor air.

The heating medium circuit 40 in the B4C1 mode allows the battery-side radiator 423*a* to dissipate the waste heat of the battery 51 to the outdoor air, thereby cooling the battery 51.

Similar to the B1C1 mode described in the first embodiment, for example, the heating medium circuit 40 in the B4C1 mode warms up the high-voltage instrument 50 and heats the heating medium.

FIG. 15 illustrates an example, where the heating medium pumped from the high-temperature-side pump 411 circulates through the high-temperature-side circuit 41. Meanwhile, the B4C1 mode during no air-conditioning may stop the high-temperature-side pump 411.

(B4C2 Mode During Air Conditioning)

The B4C2 mode is an operation mode that performs the (B4) battery outdoor-air cooling mode and the (C2) high-voltage-instrument waste heat recovery mode.

Similar to the B2C2 mode during air conditioning, the B4C1 mode during air conditioning allows the controller 60 to throttle the cooling expansion valve 14*c* of the refrigeration cycle equipment 10.

Similar to the B4C1 mode, the controller 60 controls operations of the five-way valve 422, the three-way switching valve 425, the first low-temperature-side pump 421*a*, and the second low-temperature-side pump 421*b*.

The heating medium circuit 40 in the B4C2 mode flows the heating medium flows similarly to the B4C1 mode, as indicated by the arrows in FIG. 15.

The controller 60 controls operations of the other control-target instruments similarly to the B2C2 mode during air conditioning.

The heating medium circuit 40 in the B4C2 mode during air conditioning cools the battery 51 similarly to the B4C1 mode. The high-voltage instrument 50 is cooled similarly to the B2C2 mode during air conditioning.

(B4C2 Mode During No Air-Conditioning)

In the B4C2 mode during no air-conditioning, the chiller 20 needs to absorb the waste heat of the high-voltage instrument 50 into the low-pressure refrigerant.

In the B4C2 mode without air-conditioning, similar to the B2C2 mode during no air-conditioning, the controller 60 fully opens the heating expansion valve 14*a*, fully closes the cooling expansion valve 14*b*, and throttles the cooling expansion valve 14*c* of the refrigeration cycle equipment 10. The controller 60 closes the on-off dehumidification valve 15*a* and the on-off heating valve 15*b*.

The refrigeration cycle equipment 10 in the B4C2 mode during no air-conditioning configures the vapor-compression refrigeration cycle in which the refrigerant circulates similarly to the B2C2 mode during no air-conditioning.

The controller 60 controls operations of the five-way valve 422, the three-way switching valve 425, the first low-temperature-side pump 421*a*, and the second low-temperature-side pump 421*b* similarly to the B4C1 mode.

The heating medium circuit 40 in the B4C2 mode flows the heating medium flows similarly to the B4C1 mode, as indicated by the arrows in FIG. 15.

The controller 60 controls operations of the other control-target instruments similarly to the B2C2 mode during no air-conditioning.

The heating medium circuit 40 in the B4C2 mode during no air-conditioning cools the battery 51 similarly to the B4C1 mode. The high-voltage instrument 50 is cooled similarly to the B2C2 mode during air conditioning.

(B4C3 Mode)

The B4C3 mode is an operation mode that performs the (B4) battery outdoor-air cooling mode and the (C3) high-voltage-instrument cooling mode.

In the B4C3 mode, the controller 60 fully closes the cooling expansion valve 14*c* of the refrigeration cycle equipment 10. Therefore, the refrigeration cycle equipment 10 in the B4C3 mode prevents the refrigerant from flowing into the chiller 20. During no air-conditioning, it may be possible to stop the compressor 11 of the refrigeration cycle equipment 10, the interior blower 32 of the interior air-conditioning unit 30, and the high-temperature-side pump 411 of the high-temperature-side circuit 41, for example.

The controller 60 controls operations of the five-way valve 422, the three-way switching valve 425, the first low-temperature-side pump 421*a*, and the second low-temperature-side pump 421*b*, similarly to the B4C1 mode.

Figure 16:
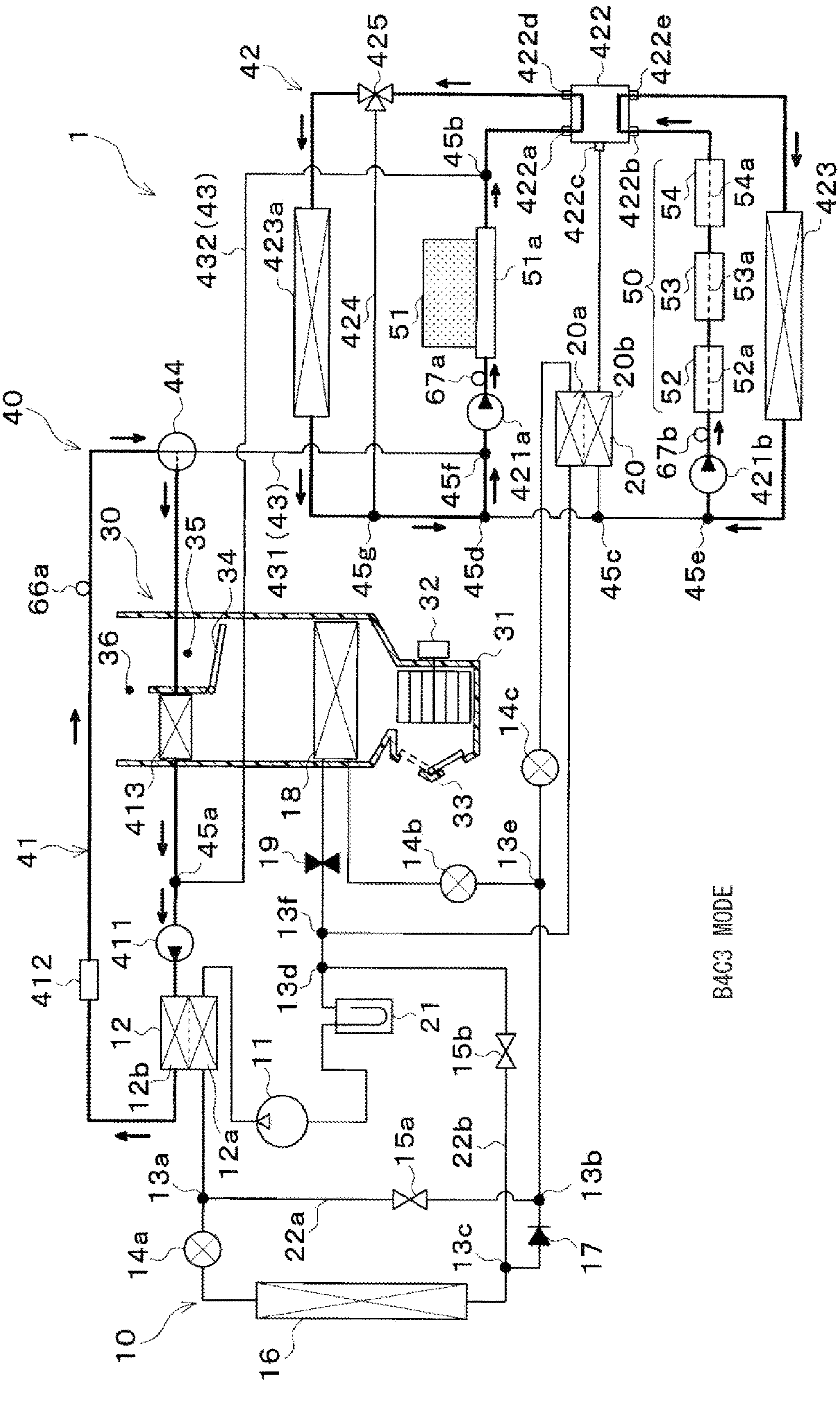
FIG. 16 is an overall schematic configuration diagram illustrating the flow of a heating medium in B4C3 mode, for according to the first embodiment.

The heating medium flows through the heating medium circuit 40 of the B4C3 mode as indicated by the arrow in FIG. 16.

Specifically, the low-temperature-side circuit 42 in the B4C3 mode allows the heating medium pumped from the first low-temperature-side pump 421*a* to flow through the cooling water channel 51*a* of the battery 51, the five-way valve 422, the battery-side radiator 423*a*, and the suction port of the first low-temperature-side pump 421*a* in order. The heating medium pumped from the second low-temperature-side pump 421*b* circulates through the cooling water channels 52*a* through 54*a* of the high-voltage instrument 50, the five-way valve 422, the low-temperature-side radiator 423, and the suction port of the second low-temperature-side pump 421*b* in order.

The controller 60 controls operations of the other control-target instruments similarly to the B4C1 mode.

In the B4C3 mode, the battery 51 is cooled similarly to the B4C1 mode. The high-voltage instrument 50 is cooled similarly to the B3C3 mode.

The other operations are similar to those in the first embodiment. As above, the thermal management system 1 according to the present embodiment can comfortably air-condition the vehicle compartment and appropriately adjust the temperatures of multiple in-vehicle units. The thermal management system 1 according to the present embodiment can also fully effectively use the heat generated from the temperature adjustment target despite the difference between the proper temperature zone of the first temperature adjustment target and the proper temperature zone of the second temperature adjustment target.

The thermal management system 1 according to the present embodiment can perform the B4C1 mode, the B4C2 mode, and the B4C3 mode. It is possible to adjust the temperatures of the battery 51 as the first temperature adjustment target and the high-voltage instrument 50 as the second temperature adjustment target more appropriately than the first embodiment.

Third Embodiment

Figure 17:
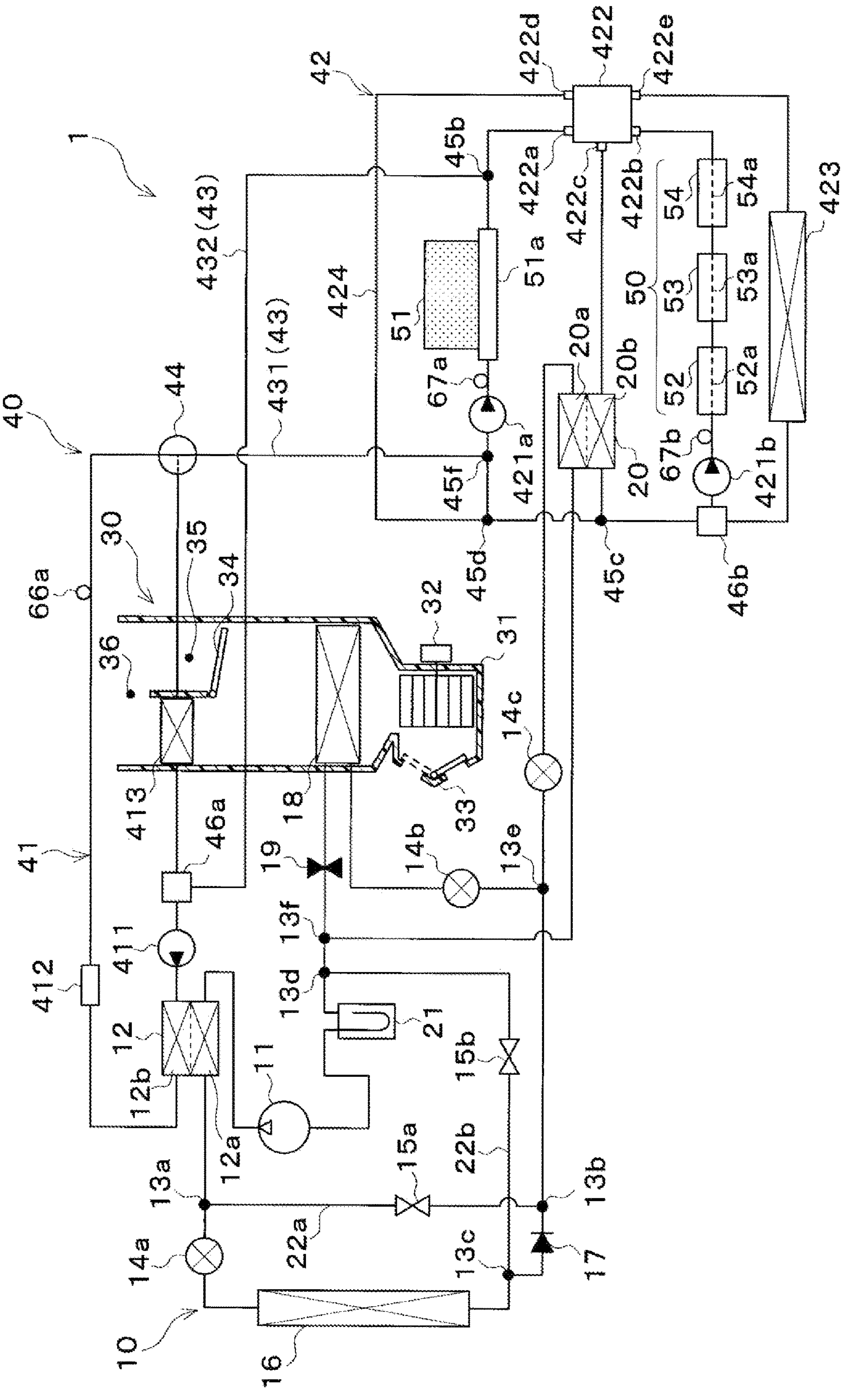
FIG. 17 is an overall schematic configuration diagram illustrating the thermal management system according to a third embodiment.

According to the present embodiment, as illustrated in the overall configuration diagram of FIG. 17, the thermal management system 1 described in the first embodiment uses a high-temperature-side reserve tank 46*a* instead of the first heating medium joint portion 45*a* on the side of the high-temperature-side circuit 41. The fifth heating medium joint portion 45*e* at the low-temperature-side circuit 42 is replaced by a low-temperature-side reserve tank 46*b*.

The high-temperature-side reserve tank 46*a* and the low-temperature-side reserve tank 46*b* are heating medium reservation portions that reserve an excess heating medium in the heating medium circuit 40.

More specifically, the inlet of the high-temperature-side reserve tank 46*a* connects with the heating medium outlet side of the heater core 413 and the outlet side of the outlet-side connection channel 432 of the connection channel 43. The outlet of the high-temperature-side reserve tank 46*a* connects with the suction port side of the high-temperature-side pump 411.

The inlet of the low-temperature-side reserve tank 46*b* connects with the outlet side of the heating medium channel 20*b* of the chiller 20 and the heating medium outlet side of the low-temperature-side radiator 423, The outlet of the low-temperature-side reserve tank 46*b* connects with the suction port side of the second low-temperature-side pump 421*b*. The other configurations and operations of the thermal management system 1 are similar to those in the first embodiment.

The thermal management system 1 according to the present embodiment can also provide effects similar to those of the first embodiment. It is possible to comfortably air-condition the vehicle compartment and appropriately adjust the temperatures of multiple in-vehicle units. The heat generated from the temperature adjustment target can be fully used effectively despite the difference between the appropriate temperature zone for the first temperature adjustment target and the appropriate temperature zone for the second temperature adjustment target.

The thermal management system 1 of the present embodiment stores the heating medium in the high-temperature-side reserve tank 46*a* and the low-temperature-side reserve tank 46*b*, thereby making it possible to inhibit a decrease in the fluid measure of the heating medium circulating through the heating medium circuit 40. The outlet of the high-temperature-side reserve tank 46*a* and the outlet of the low-temperature-side reserve tank 46*b* are connected to the suction port side of the high-temperature-side pump 411 and the suction port side of the second low-temperature-side pump 421*b*, respectively.

It is possible to inhibit fluctuations on the liquid level of the heating medium during the configuration switchover of the heating medium circuit 40, for example, and inhibit the air from entering the high-temperature-side pump 411 and the second low-temperature-side pump 421*b*. Consequently, it is possible to inhibit a decrease in the pumping capability of the high-temperature-side pump 411 and the second low-temperature-side pump 421*b* and allow the heating medium to more effectively use the heat generated from the temperature adjustment target.

The present disclosure is not limited to the above-mentioned embodiments but may be variously modified within the spirit and scope of the disclosure, as will be described below.

The above-described embodiments have explained examples of applying the thermal management system 1 according to the present disclosure to a vehicle. However, the application of the thermal management system 1 is not limited thereto. For example, the thermal management system 1 according to the present disclosure may be applied to a stationary air conditioner with a temperature adjustment function that air-conditions the room and, meanwhile, adjusts temperatures of multiple temperature adjustment targets (such as computer systems and electrical equipment) that differ in the appropriate temperature zones.

The above-described embodiments have explained the examples where the inverter 52, the motor generator 53, and the ADAS controller 54 are assumed to be the high-voltage instrument 50. However, the present disclosure is not limited thereto. For example, the high-voltage instrument 50 may represent a charger or a power control unit (PCU).

The configurations of the refrigeration cycle equipment 10 are not limited to those disclosed in the above-described embodiment.

Multiple cycle components may be integrated under the condition that the above-described effects can be provided. For example, it may be favorable to use a four-way-structured joint portion that integrates the fourth refrigerant joint portion 13*d* and the sixth refrigerant joint portion 13*f*. The same also applies to the heating medium circuit 40. For example, it may be favorable to use a four-way-structured joint portion that integrates the fourth heating medium joint portion 45*d* and the sixth heating medium joint portion 45*f*.

The above-described embodiments have explained the examples where R1234yf is used as the refrigerant. However, the refrigerant is not limited thereto. For example, it may be favorable to use R134a, R600a, R410A, R404A, R32, or R407C. Alternatively, it may be favorable to use a mixed refrigerant, that is, a mixture of multiple types of these refrigerants, for example. Carbon dioxide may be used as the refrigerant to configure a supercritical refrigeration cycle in which the refrigerant pressure at the high-pressure side is higher than or equal to the critical pressure of the refrigerant.

The configurations of the heating medium circuit 40 are not limited to those disclosed in the above-described embodiments.

The above-described embodiments have explained the examples of using the five-way valve 422 formed by combining multiple three-way flow control valves. However, the present disclosure is not limited thereto.

For example, the five-way valve may include a first body and a second body forming multiple spaces inside, a slide valve intervening between the first body and the second body, and an electric actuator to displace the slide valve.

More specifically, the multiple spaces formed in the first body and the second body communicate with any of the inlets and outlets. A groove portion is formed in the slide valve to communicate the space at the first body with the space at the second body and the spaces at the first body with each other, or the spaces at the second body side with each other. It just needs to be able to switch the circuit configurations of the low-temperature-side circuit 42 similar to the five-way valve 422 by allowing the electric actuator to displace the slide valve.

The five-way valve 422 may not need to perfectly switch the circuit configurations. For example, the heating medium may partially circulate through the cooling water channel 50*a* of the high-voltage instrument 50 or the heating medium bypass channel 424 in the (D) quick charging and cooling mode described above.

The above-described embodiments have explained the examples where the connection channel 43 is used as the heat transfer portion. However, the present disclosure is not limited thereto.

For example, the inlet-side connection channel 431 may be replaced by an inlet-side heat transfer portion that performs heat exchange between the heating medium flowing out of the three-way valve 44 and the heating medium flowing into the cooling water channel 51*a* of the battery 51. The outlet-side connection channel 432 may be replaced by an outlet-side heat transfer portion that performs heat exchange between the heating medium flowing out of the cooling water channel 51*a* of the battery 51 and the heating medium flowing into the heating medium channel 12*b* of the water-refrigerant heat exchanger 12.

The above-described embodiments have explained the examples where a PTC heater is used as the electric heater 412, that is, the heating portion. However, the present disclosure is not limited thereto. For example, it may be favorable to use a nichrome wire or a carbon fiber heater. As the heating portion, it may be favorable to use a hot water pipe that flows hot water heated by another heat source.

The third embodiment has explained the example of replacing the first heating medium joint portion 45*a* with the high-temperature-side reserve tank 46*a* and the example of replacing the third heating medium joint portion 45*c* with the low-temperature-side reserve tank 46*b*. However, the present disclosure is not limited thereto. For example, the fifth heating medium joint portion 45*e* or the sixth heating medium joint portion 45*f* may be replaced by the low-temperature-side reserve tank 46*b*. Either the high-temperature-side reserve tank 46*a* or the low-temperature-side reserve tank 46*b* may be used.

The above-described embodiments have explained the examples where an ethylene glycol aqueous solution is used as the heating medium for the heating medium circuit 40. However, the present disclosure is not limited thereto. As the heating medium, it may be favorable to use a solution containing dimethylpolysiloxane or nanofluid, an antifreeze solution, a water-based liquid refrigerant containing alcohol, for example, or a liquid medium containing oil.

The operations of the thermal management system 1 in the corresponding operation modes are not limited to those disclosed in the above-described embodiments.

For example, the B1C1 mode during no air-conditioning and the B1C3 mode during no air-conditioning may stop the compressor 11 of the refrigeration cycle equipment 10 and allow the electric heater 412 to heat the heating medium flowing through the high-temperature-side circuit 41.

The operation mode for temperature adjustment during air conditioning may be performed even if the battery 51 is charged when an occupant stays in the vehicle compartment.

The technical means disclosed in the above-described embodiments may be combined as appropriate within a practicable range. For example, the high-temperature-side reserve tank 46*a* and the low-temperature-side reserve tank 46*b* described in the third embodiment may be applied to the thermal management system 1 according to the second embodiment.

While there have been described the specific preferred embodiments of the present disclosure, it is to be distinctly understood that the disclosure is not limited to the embodiments and structures. The disclosure covers various modified examples and modifications within a commensurate scope. In addition, the category or the scope of the idea of the disclosure covers various combinations or forms as well as the other combinations or forms including only one element or more or fewer elements in the various combinations or forms described in the disclosure.

What is claimed is:

1. A thermal management system comprising:
a refrigeration cycle equipment including
a high-temperature-side water-refrigerant heat exchanger configured to perform heat exchange between high-pressure refrigerant and heating medium and
a low-temperature-side water-refrigerant heat exchanger configured to perform heat exchange between low-pressure refrigerant and the heating medium; and
a heating medium circuit configured to circulate the heating medium, wherein
the heating medium circuit includes
a high-temperature-side circuit connecting with a heating medium channel of the high-temperature-side water-refrigerant heat exchanger,
a low-temperature-side circuit connecting with a heating medium channel of the low-temperature-side water-refrigerant heat exchanger, and
a heat transfer portion configured to transfer heat between the heating medium, which flows through the high-temperature-side circuit, and the heating medium, which flows through the low-temperature-side circuit,
the low-temperature-side circuit includes
a first heat exchanger configured to perform heat exchange between a first temperature adjustment target and the heating medium,
a second heat exchanger configured to perform heat exchange between a second temperature adjustment target and the heating medium,
a heating medium bypass channel configured to
cause the heating medium, which flows out of one of the first heat exchanger and the second heat exchanger, to bypass the low-temperature-side water-refrigerant heat exchanger and
return the heating medium toward a heating medium inlet of one of the first heat exchanger and the second heat exchanger, and
a low-temperature-side circuit switching valve configured to switch a circuit configuration of the low-temperature-side circuit,
when the first temperature adjustment target is heated,
the heat transfer portion is configured to transfer heat of the heating medium, which is heated by the high-temperature-side water-refrigerant heat exchanger, to the heating medium, which flows into the first heat exchanger,
the low-temperature-side circuit switching valve is configured to switch a circuit configuration of the low-temperature-side circuit to a circuit configuration that returns the heating medium, which flows out of the first heat exchanger, toward the heating medium inlet of the first heat exchanger via the heating medium bypass channel, and the low-temperature-side circuit switching valve is configured to concurrently connect an outlet of a channel of the first heat exchanger directly with an inlet of the heating medium bypass channel and connect an outlet of a channel of the second heat exchanger directly with an inlet of the heating medium channel of the low-temperature-side water-refrigerant heat exchanger.

2. The thermal management system according to claim 1, wherein when the first temperature adjustment target is heated, the heat transfer portion is configured to transfer heat of the heating medium, which is heated by the high-temperature-side water-refrigerant heat exchanger, to the heating medium, which flows into the first heat exchanger, and the low-temperature-side circuit switching valve is configured to switch a circuit configuration of the low-temperature-side circuit to a circuit configuration that returns the heating medium, which flows out of the first heat exchanger, toward the heating medium inlet of the first heat exchanger via the heating medium bypass channel and causes the heating medium, which flows out of the second heat exchanger, toward the low-temperature-side water-refrigerant heat exchanger.

3. The thermal management system according to claim 1, wherein the heat transfer portion is a connection channel that connects the high-temperature-side circuit with the low-temperature-side circuit, and the connection channel includes an inlet-side connection channel configured to guide the heating medium, which flows out of the high-temperature-side water-refrigerant heat exchanger, toward a heating medium inlet of the first heat exchanger.

4. The thermal management system according to claim 3, wherein the low-temperature-side circuit includes a first low-temperature-side pump configured to draw and pump the heating medium to the first heat exchanger, and the inlet-side connection channel is connected to guide the heating medium, which flows out of the high-temperature-side water-refrigerant heat exchanger, toward a suction port of the first low-temperature-side pump.

5. The thermal management system according to claim 3, wherein the high-temperature-side circuit includes a high-temperature-side pump configured to draw and pump the heating medium toward the high-temperature-side water-refrigerant heat exchanger, and the connection channel includes an outlet-side connection channel configured to guide the heating medium, which flows out of the first heat exchanger, toward a suction port of the high-temperature-side pump.

6. The thermal management system according to claim 1, wherein the heating medium circuit includes a heat transfer amount adjusting valve configured to adjust a heat transfer amount of the heat transfer portion, the thermal management system further comprising:

a heat transfer amount control unit configured to control an operation of the heat transfer amount adjusting valve, wherein the heat transfer amount control unit is configured to, when the low-temperature-side circuit switching valve activates a circuit configuration that returns the heating medium, which flows out of the first heat exchanger, to the first heat exchanger via the heating medium bypass channel, control the operation of the heat transfer amount adjusting valve so that a temperature of the heating medium, which flows into the first heat exchanger, approximates a predetermined targeted warming temperature.

7. The thermal management system according to claim 1, wherein the high-temperature-side circuit includes a heating heat exchanger configured to perform heat exchange between a fluid to be heated and the heating medium.

8. The thermal management system according to claim 1, wherein the high-temperature-side circuit includes a heater configured to heat the heating medium.

9. The thermal management system according to claim 1, wherein the low-temperature-side circuit switching valve is configured to cause the heating medium, which flows out of the first heat exchanger, to flow into at least one of the heating medium bypass channel or the low-temperature-side water-refrigerant heat exchanger.

10. The thermal management system according to claim 1, wherein the low-temperature-side circuit includes a low-temperature-side outdoor air heat exchanger configured to perform heat exchange between outdoor air and the heating medium, and the low-temperature-side circuit switching valve is configured to cause the heating medium, which flows out of the second heat exchanger, to flow toward at least one of the low-temperature-side outdoor air heat exchanger or the low-temperature-side water-refrigerant heat exchanger.

11. The thermal management system according to claim 1, wherein the low-temperature-side circuit switching valve is configured to switch the heating medium, which is to flow into the heating medium channel of the low-temperature-side water-refrigerant heat exchanger, to one of the heating medium, which flows out of the first heat exchanger, and the heating medium, which flows out of the second heat exchanger.

12. The thermal management system according to claim 1, wherein the low-temperature-side circuit includes a low-temperature-side outdoor air heat exchanger configured to perform heat exchange between outdoor air and the heating medium, and the low-temperature-side circuit switching valve is configured to cause the heating medium, which flows out of the first heat exchanger, to flow toward at least one of the low-temperature-side outdoor air heat exchanger or the low-temperature-side water-refrigerant heat exchanger.

13. The thermal management system according to claim 1, wherein the low-temperature-side circuit switching valve is configured to concurrently enable to allow a total flow of the heating medium flowing from the outlet of the channel of the first heat exchanger to flow into the inlet of the heating medium bypass channel, enable to allow a total flow of the heating medium flowing from the outlet of the channel of the second heat exchanger to flow into the inlet of the heating medium channel of the low-temperature-side water-refrigerant heat exchanger, and enable to allow a total flow of the heating medium flowing from an outlet of the heating medium channel of the low-temperature-side water-refrigerant heat exchanger to further flow into an inlet of the channel of the second heat exchanger, without passing through the heating medium bypass channel.

14. The thermal management system according to claim 1, wherein the low-temperature-side circuit switching valve is configured to concurrently connect an outlet of a channel of the first heat exchanger directly with an inlet of the heating medium bypass channel, connect an outlet of a channel of the second heat exchanger directly with an inlet of the heating medium channel of the low-temperature-side water-refrigerant heat exchanger, and enable to isolate the channel of the first heat exchanger and the heating medium bypass channel from the channel of the second heat exchanger and the heating medium channel of the low-temperature-side water-refrigerant heat exchanger.

* * * * *